United States Patent [19]
Colwell et al.

[11] Patent Number: 5,826,094
[45] Date of Patent: Oct. 20, 1998

[54] REGISTER ALIAS TABLE UPDATE TO INDICATE ARCHITECTURALLY VISIBLE STATE

[75] Inventors: Robert P. Colwell, Portland; David B. Papworth, Beaverton; Michael A. Fetterman; Andrew F. Glew, both of Hillsboro; Glenn J. Hinton, Portland, all of Oreg.

[73] Assignee: Intel Corporation, Santa Clara, Calif.

[21] Appl. No.: 676,887

[22] Filed: Jul. 8, 1996

Related U.S. Application Data

[63] Continuation of Ser. No. 563,359, Nov. 28, 1995, abandoned, which is a continuation of Ser. No. 201,566, Feb. 25, 1994, abandoned, which is a continuation-in-part of Ser. No. 129,867, Sep. 30, 1993, Pat. No. 5,548,776.

[51] Int. Cl.$^6$ ........................................... G06F 9/30
[52] U.S. Cl. ................... 395/800; 395/375; 364/DIG. 1; 364/247; 364/239; 364/259; 364/259.2; 364/243
[58] Field of Search .................. 395/800, 375, 395/500

[56] References Cited

U.S. PATENT DOCUMENTS

| | | | |
|---|---|---|---|
| 4,574,349 | 3/1986 | Rechtschaffen | 395/425 |
| 5,136,697 | 8/1992 | Johnson | 395/375 |
| 5,345,569 | 9/1994 | Tran | 395/375 |
| 5,355,457 | 10/1994 | Shebanow et al. | 395/375 |
| 5,392,441 | 2/1995 | Brasher et al. | 395/725 |
| 5,404,476 | 4/1995 | Kadaira | 395/400 |
| 5,497,480 | 3/1996 | Hayes et al. | 395/493 |
| 5,526,509 | 6/1996 | Doi et al. | 395/449 |

OTHER PUBLICATIONS

Author, Mike Johnson, entitled *Superscalar Microprocessor Design,* Advance Micro Devices, Prentice Hall Series in Innovative Technolgoy, 1991, pp. 1–289.

Val Popescu, et al. entitled, "The Metaflow Architecture," IEEE Micro, Jun. 1991, pp. 10–13, 63–73.

*Primary Examiner*—Mehmet B. Geckil
*Attorney, Agent, or Firm*—Blakely, Sokoloff, Taylor & Zafman

[57] ABSTRACT

A mechanism for indicating within a register alias table (RAT) that certain data has become architecturally visible so that the RAT contains the most recent location of the certain data. Upon receiving the indication that data associated with a particular register is architecturally visible, if a subsequent operation uses the particular register as a source, the data will be supplied from the architecturally visible buffer instead of from an internal buffer (not architecturally visible). The internal buffer is implemented by a reorder buffer (ROB) which contains information associated with instructions that have not yet retired. The architecturally visible buffer is a retirement register file (RRF) which contains information associated with retired instructions. When an instruction retires, the register alias table is searched for the retiring physical register and will indicate within the register alias table that the data associated with the retiring physical register is located within the RRF only if the register alias table has not already (or concurrently) reassigned a new physical register to the logical register associated with the retiring physical register. If the logical register associated with the retiring physical register as been reassigned by subsequent instructions, then no update of the register alias table is required. Also provided is an embodiment for providing the above features in a system wherein the register ordering of the buffers can be altered via register exchange operations.

40 Claims, 19 Drawing Sheets

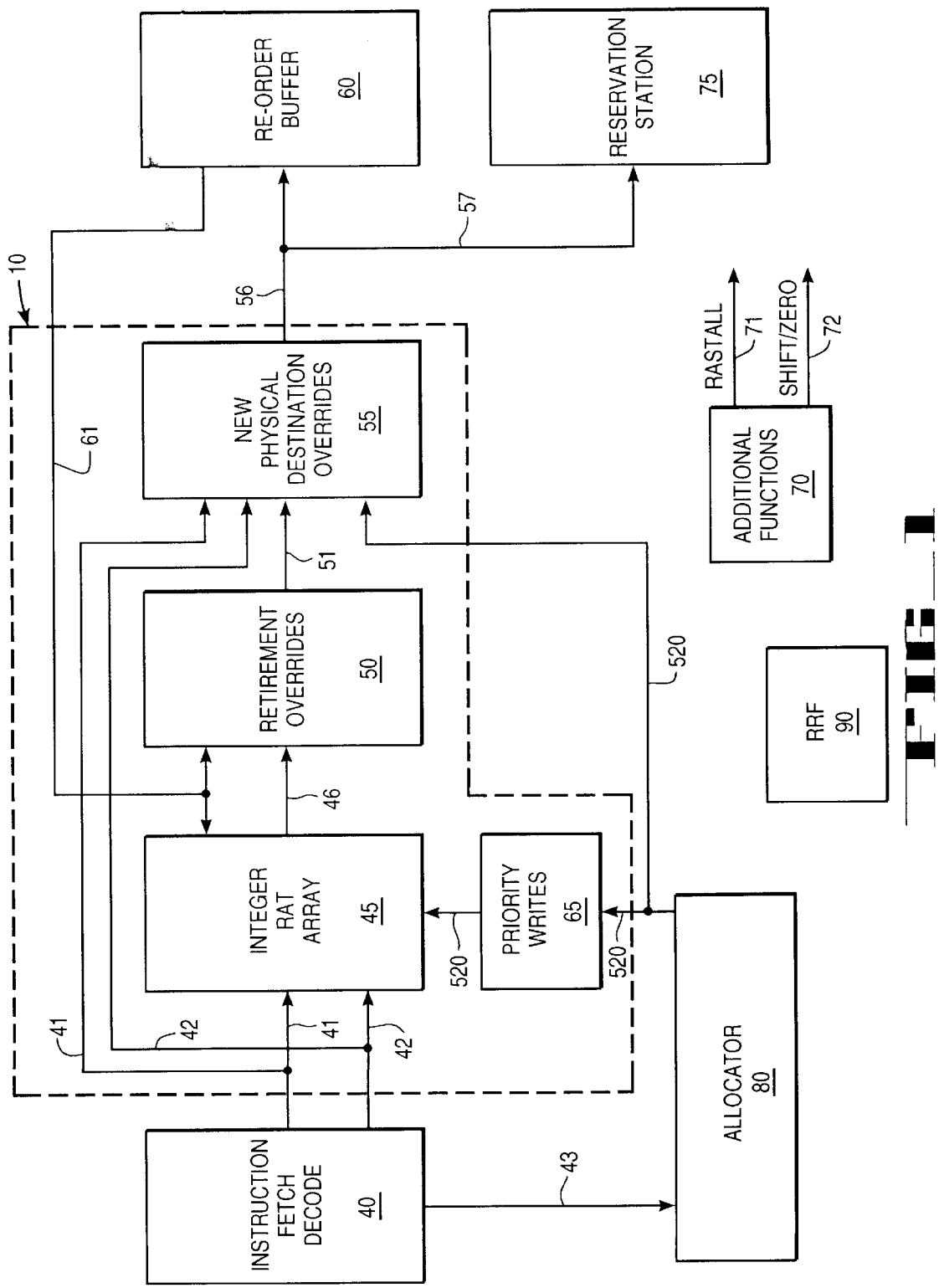

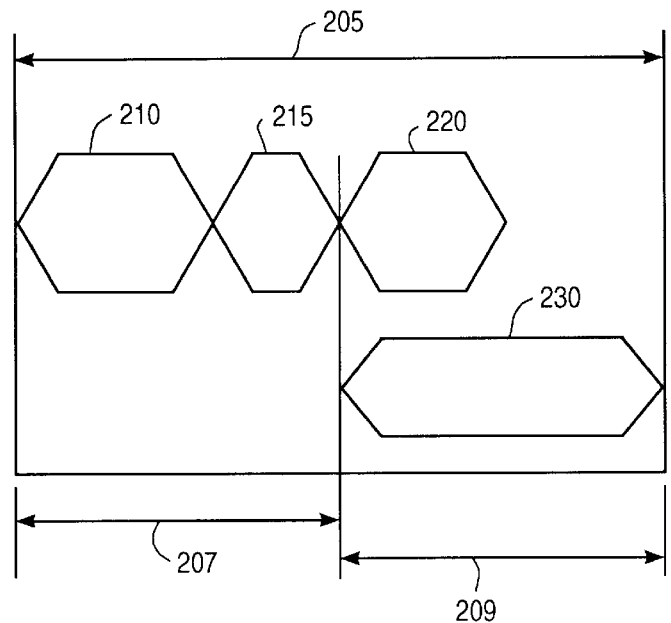
FIG_2
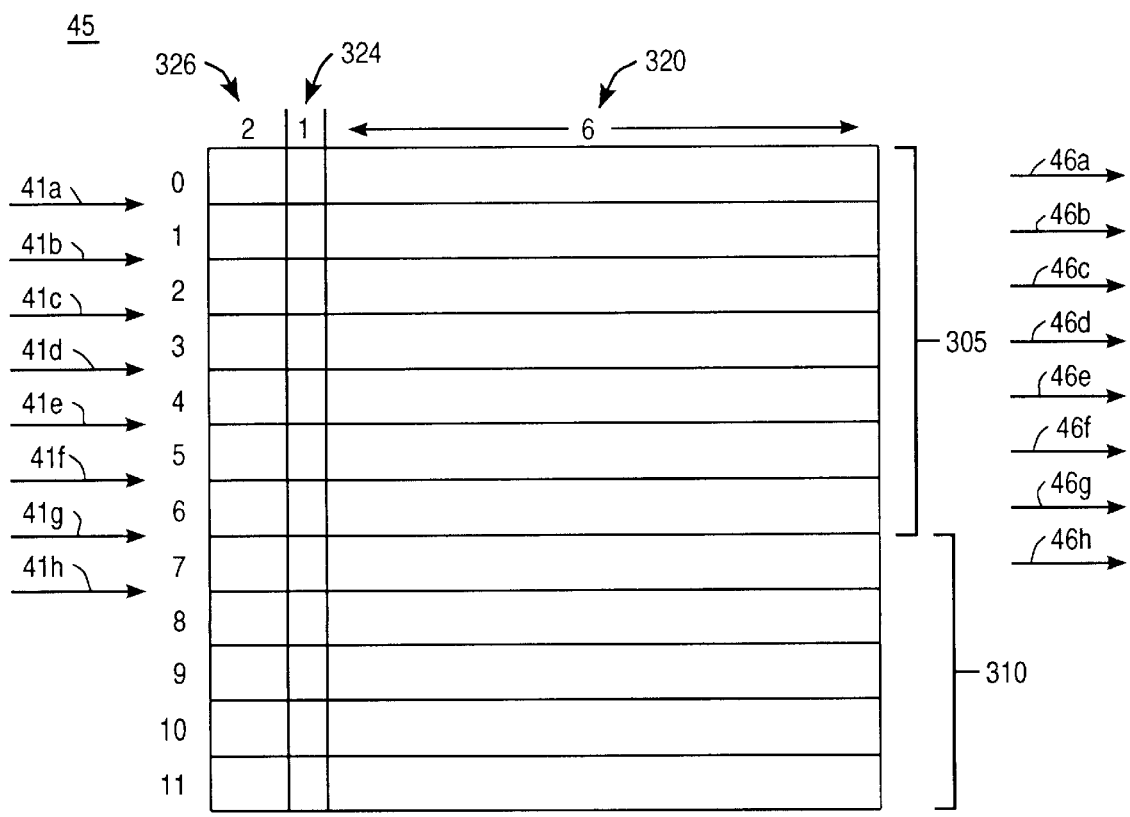
FIG_3

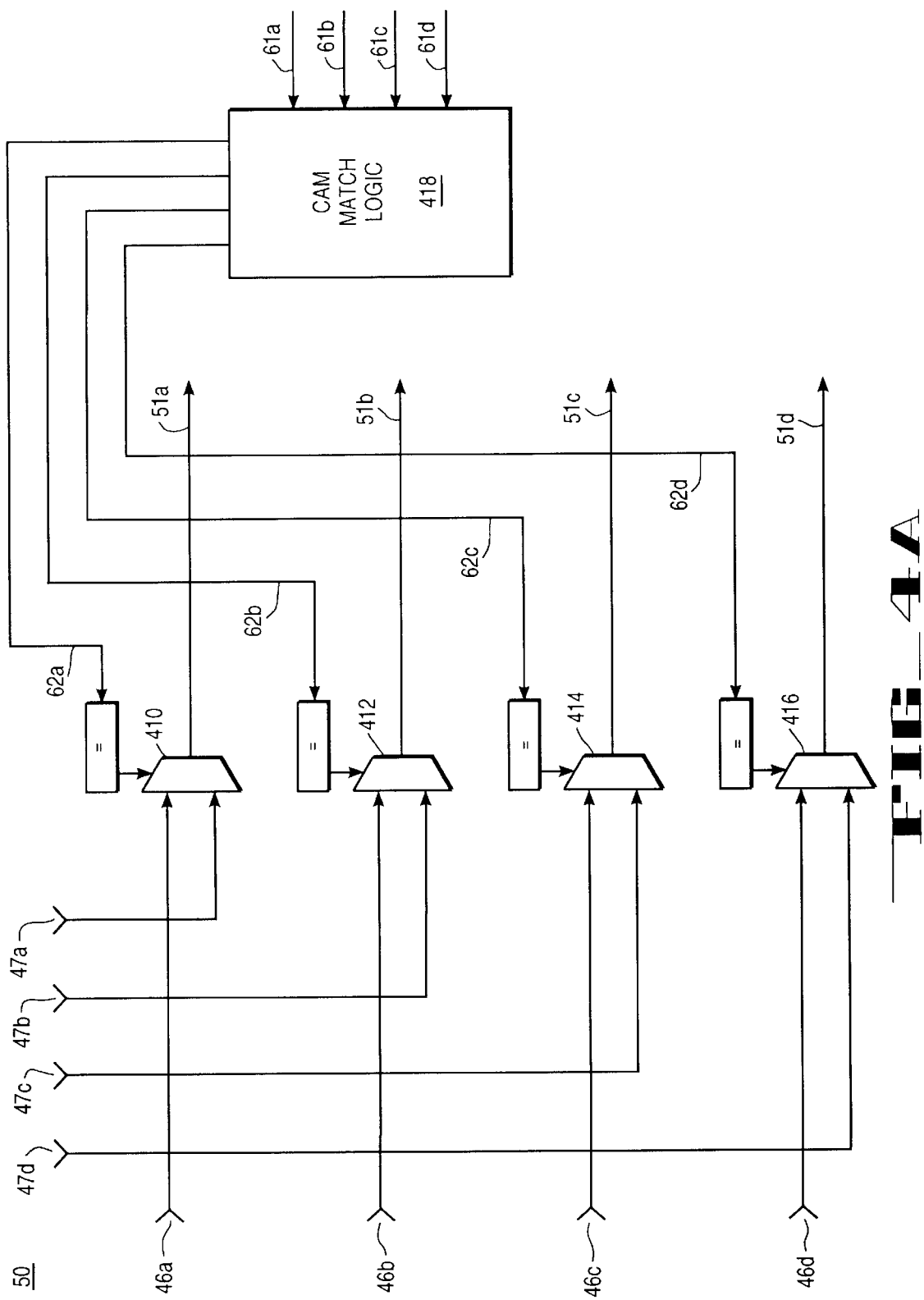
FIG_4A

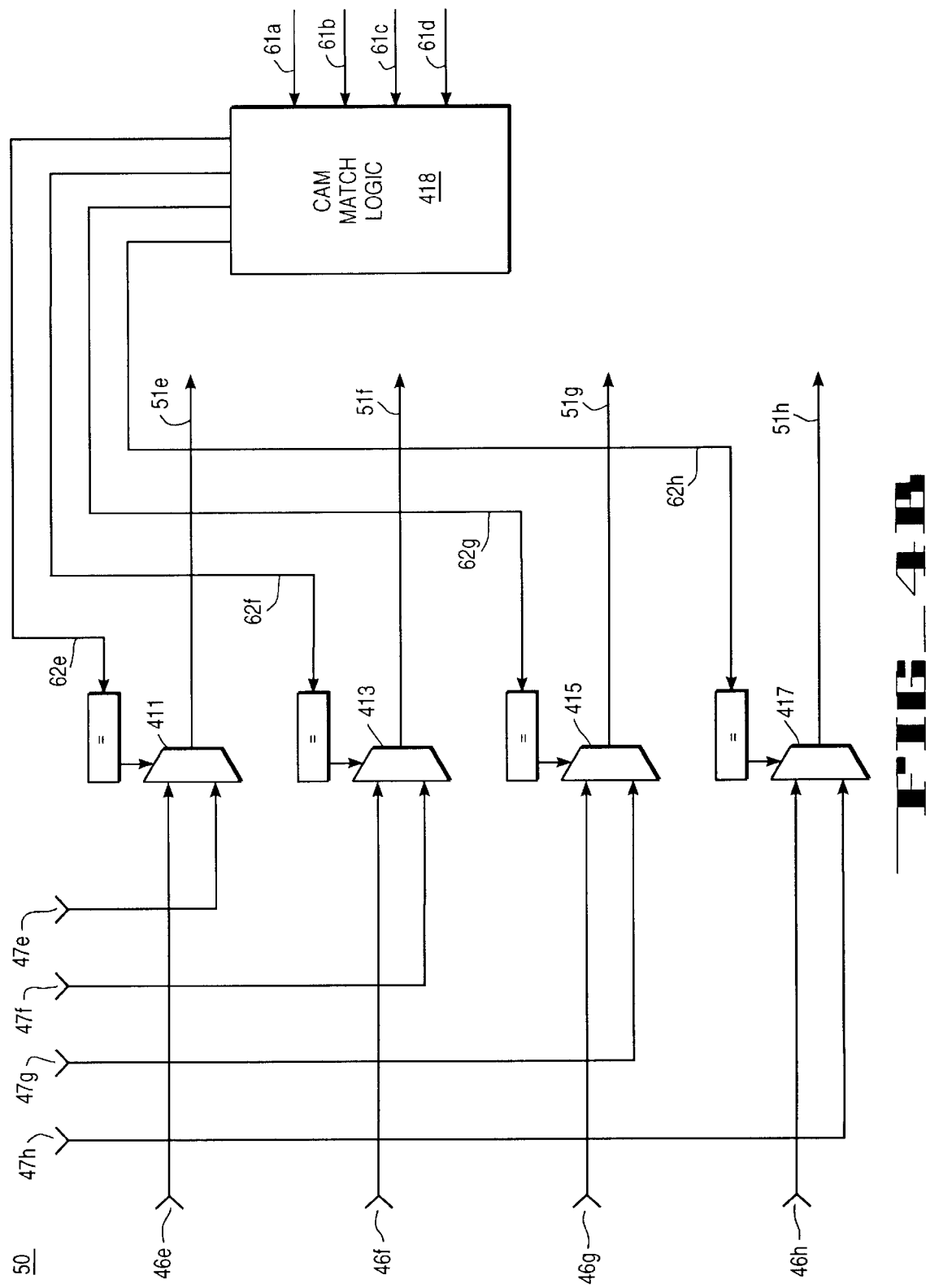
FIG_4B

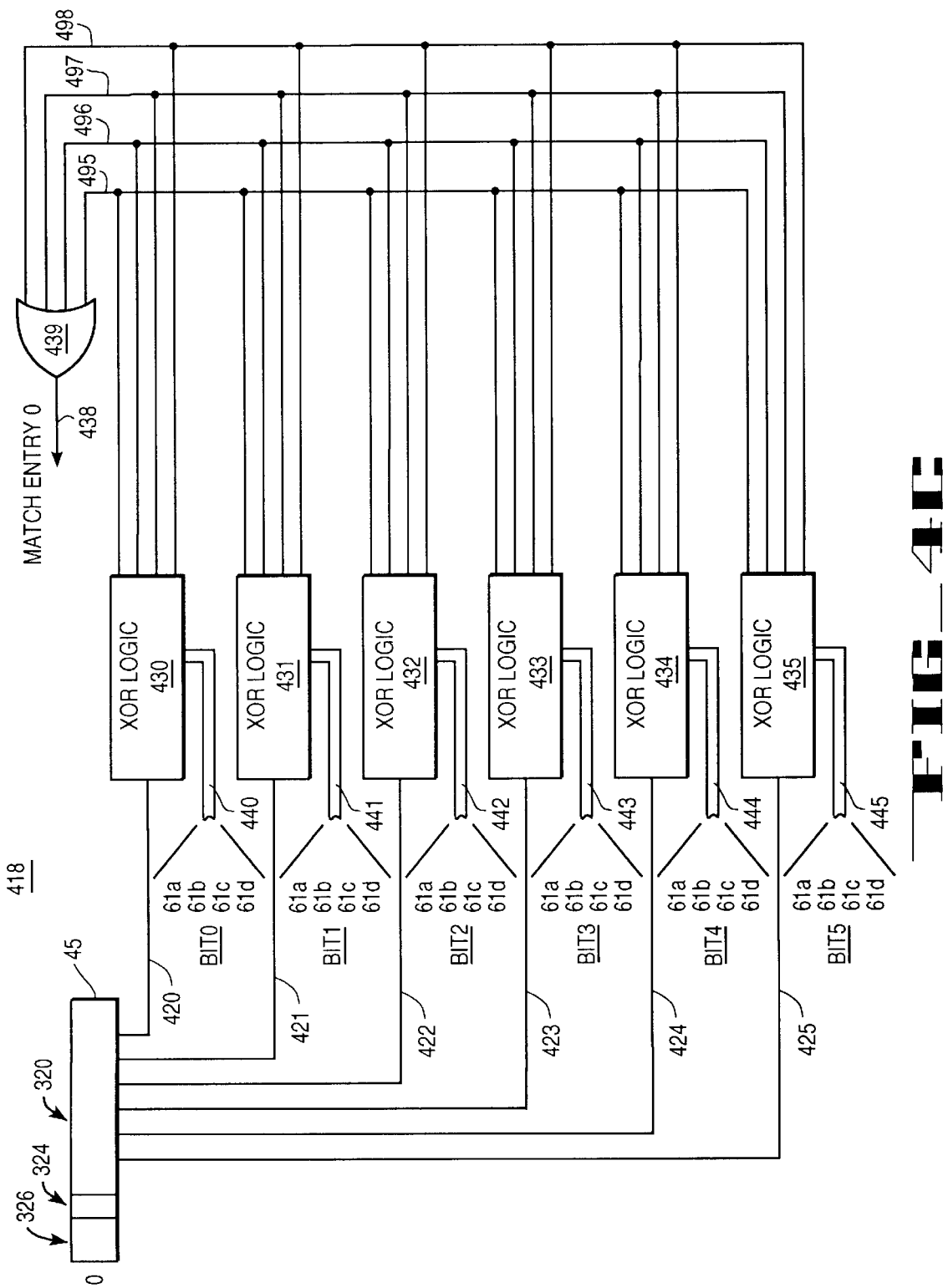
FIG._4C

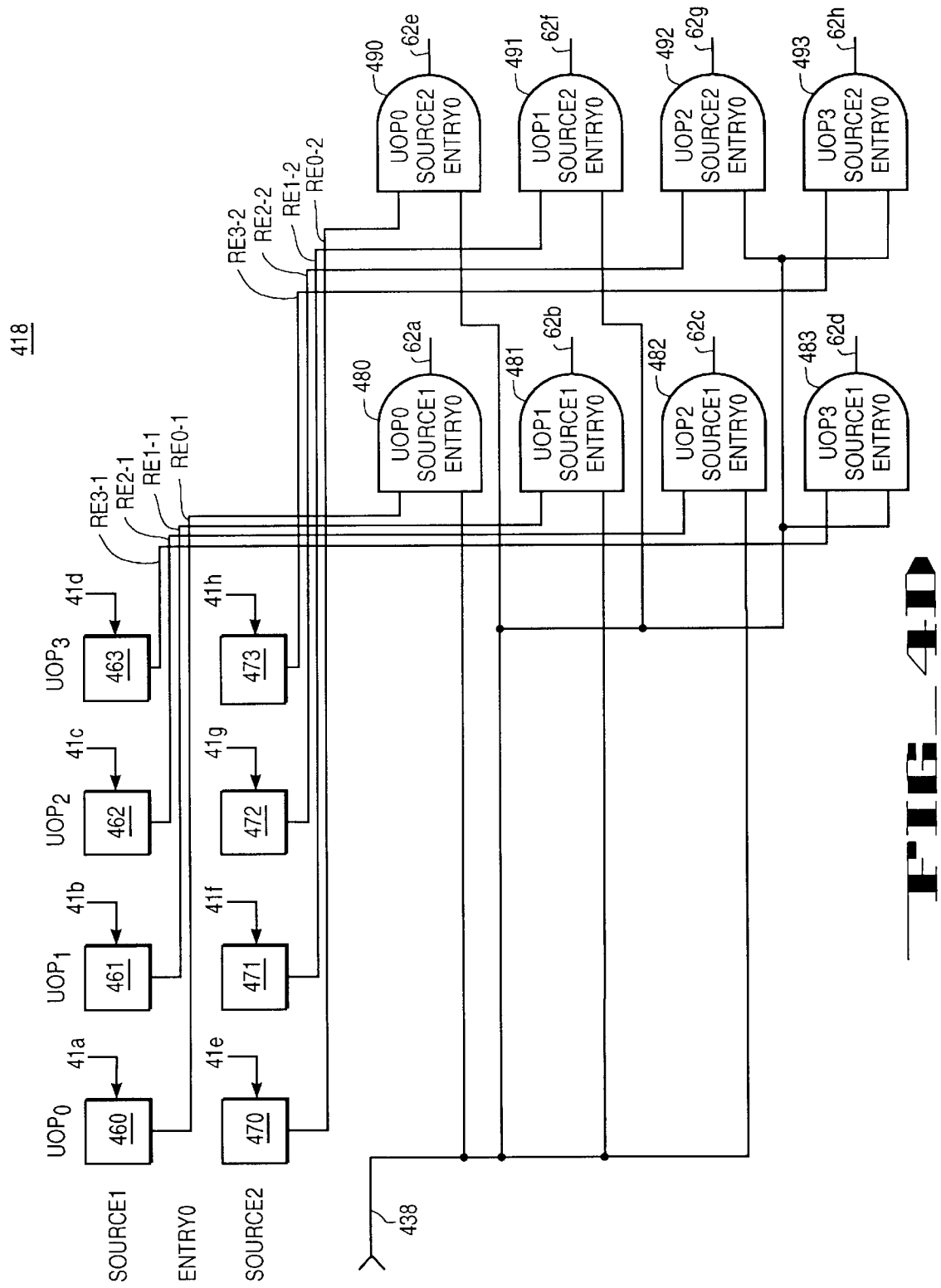
FIG._4D

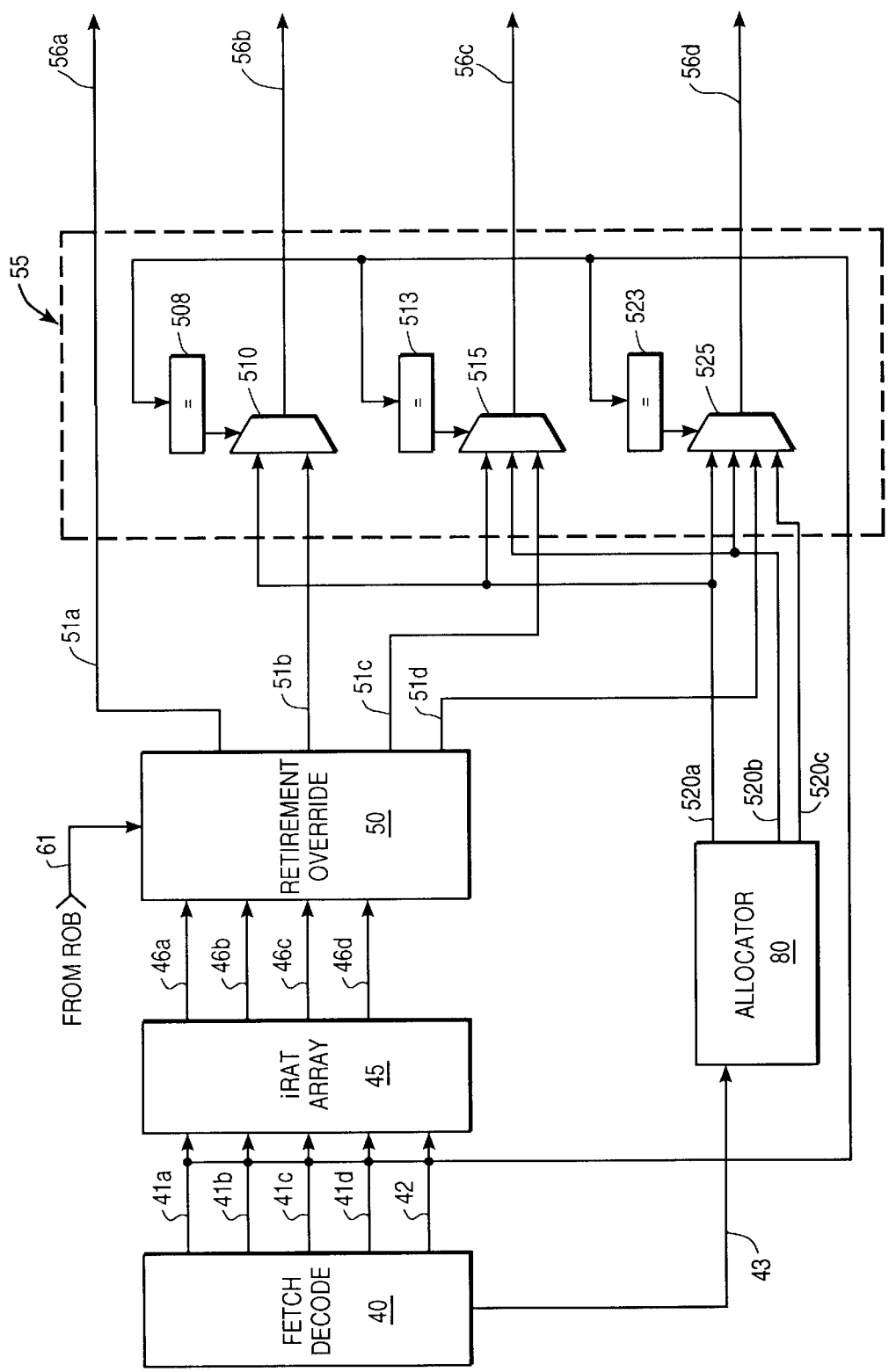
FIG_5A

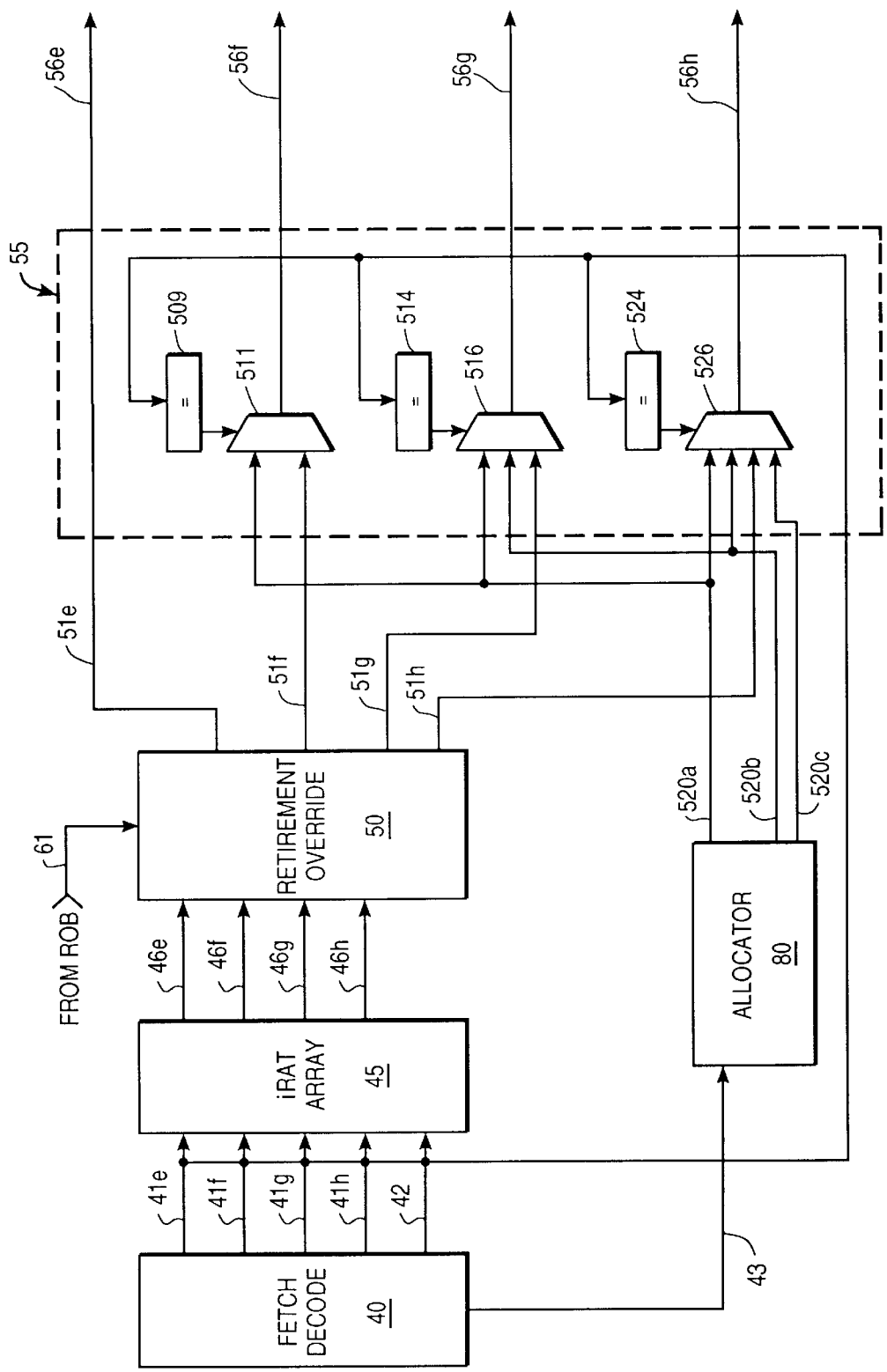
FIG_5B

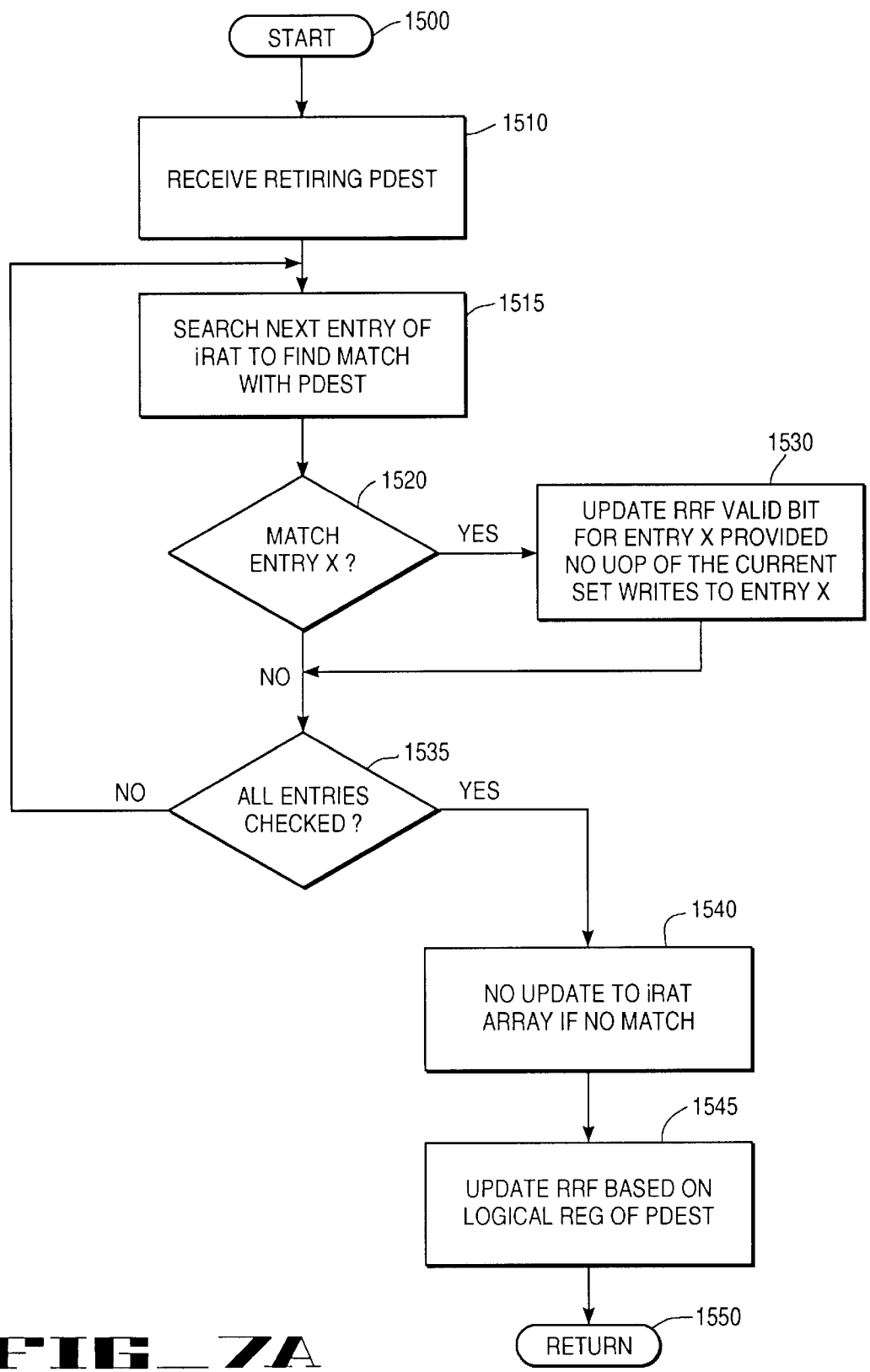
FIG_7A

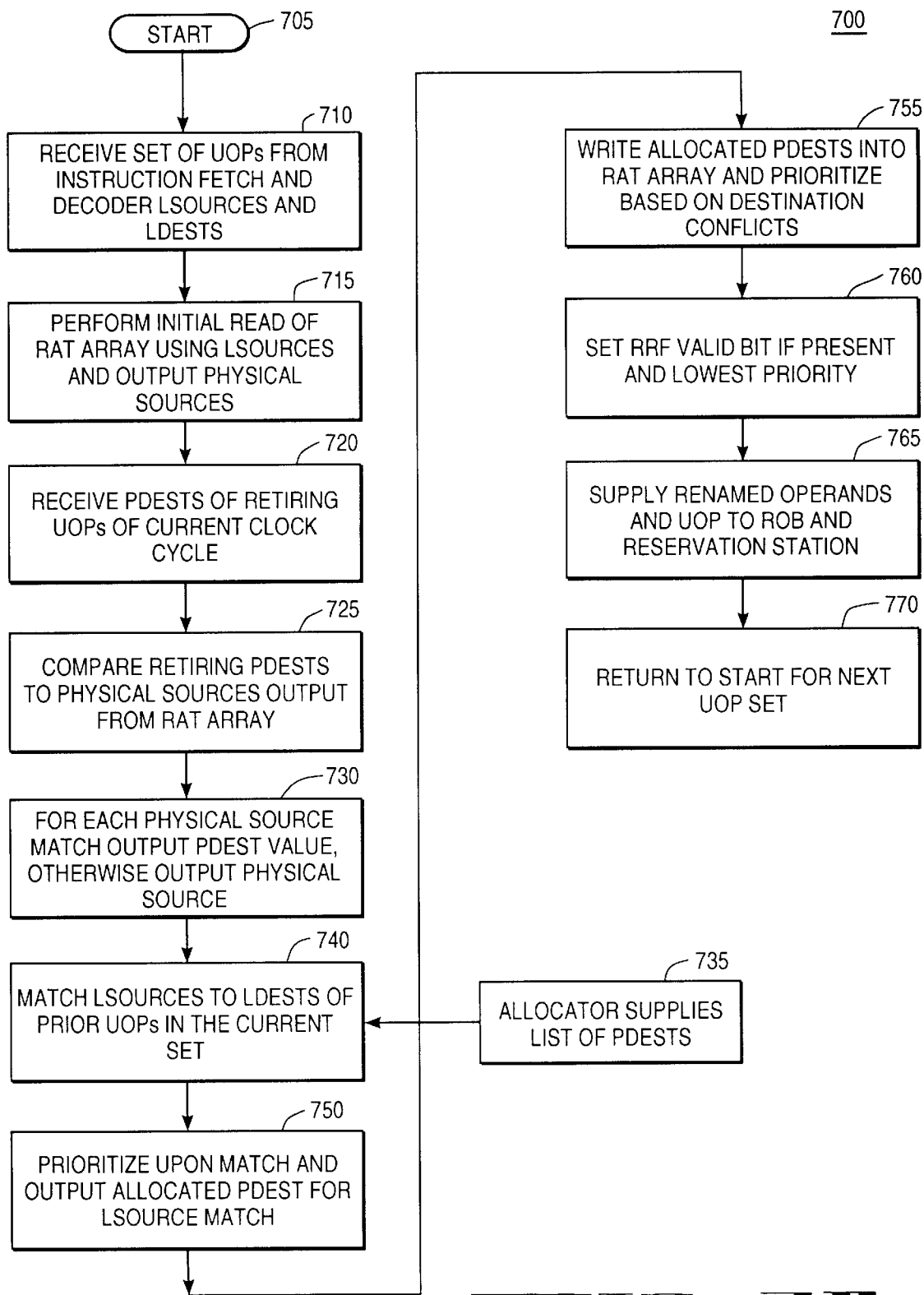
FIG_7B

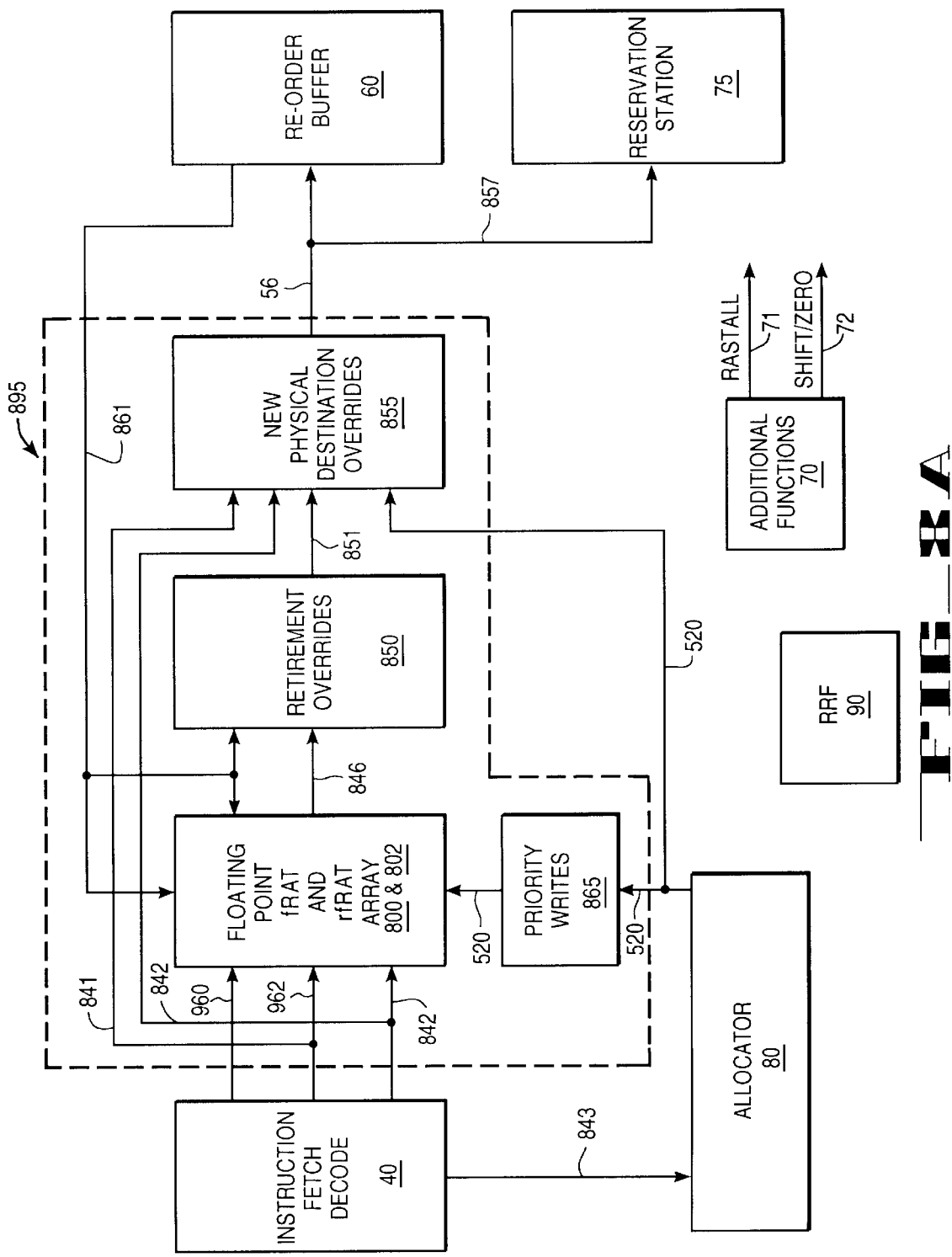

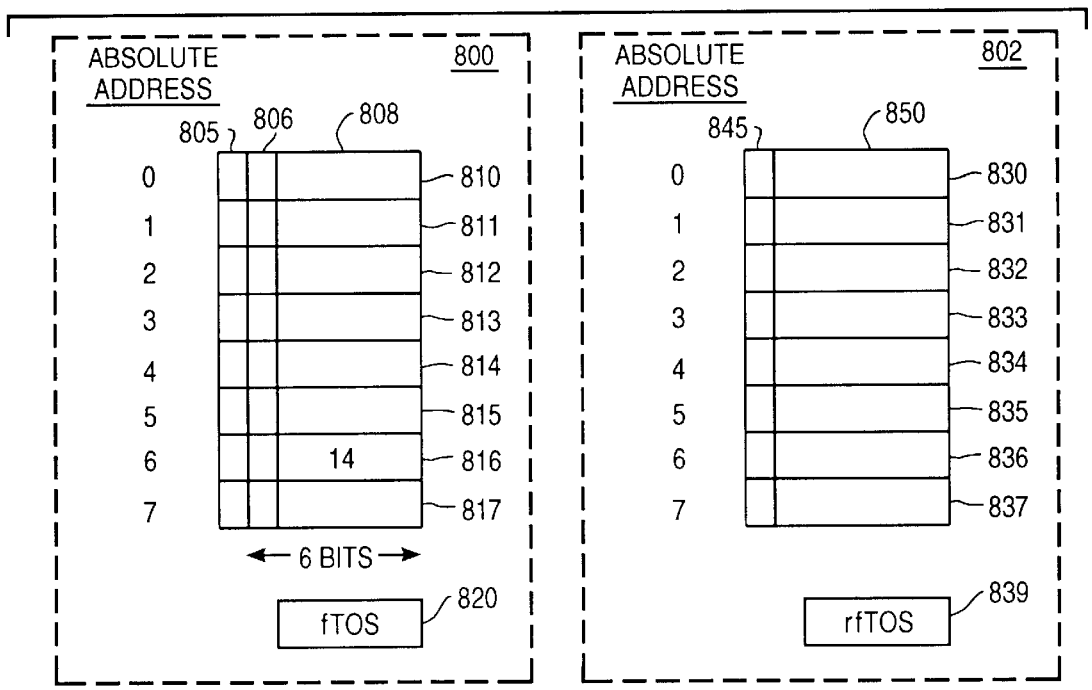
FIG_8B
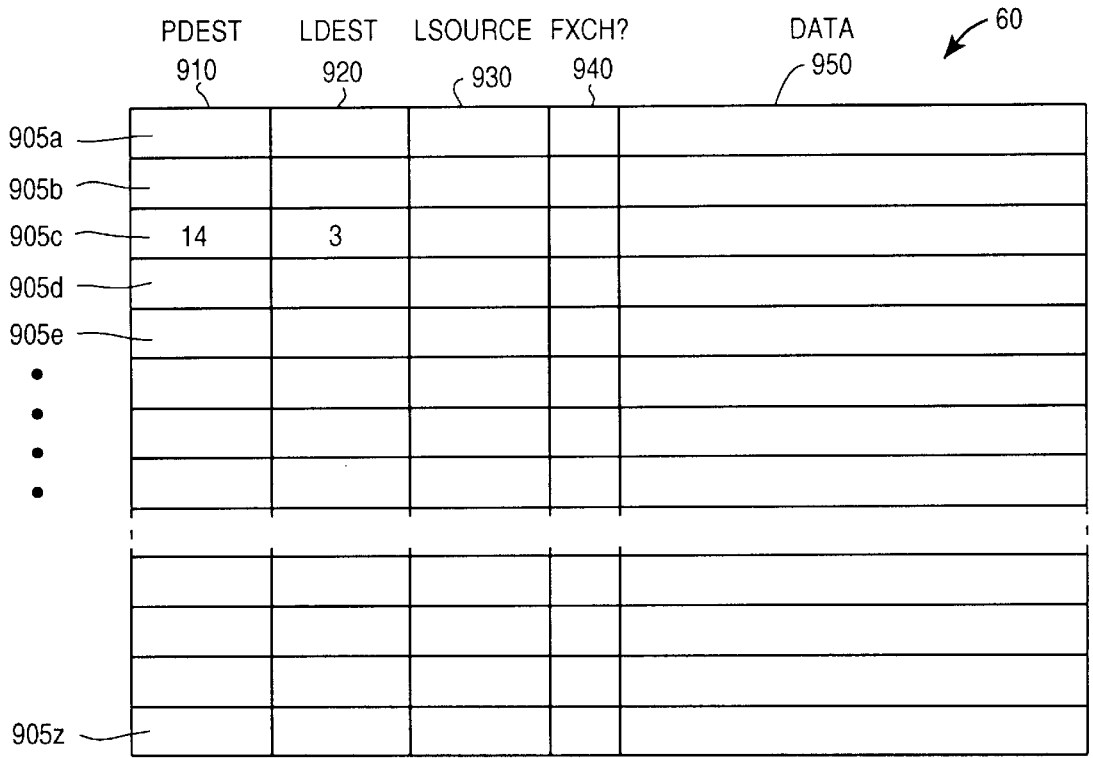
FIG_8C

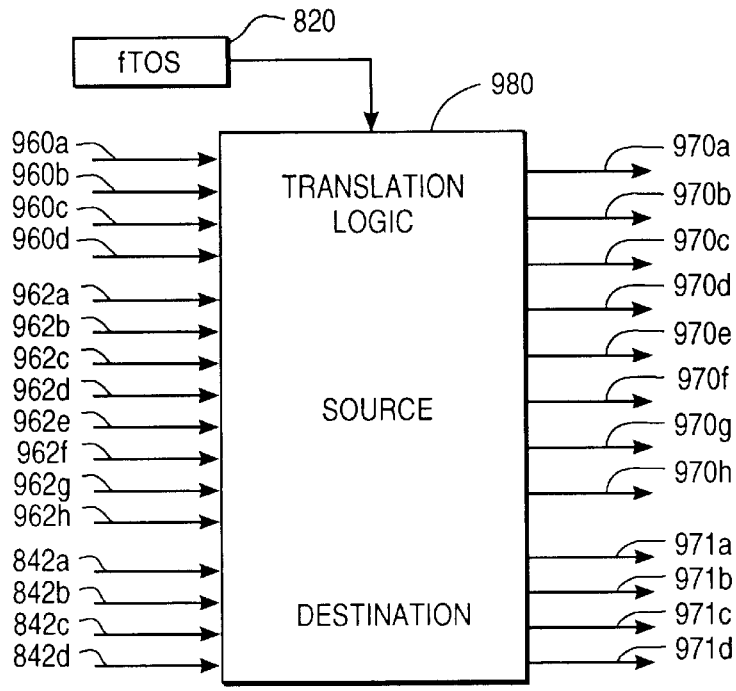
FIG_9
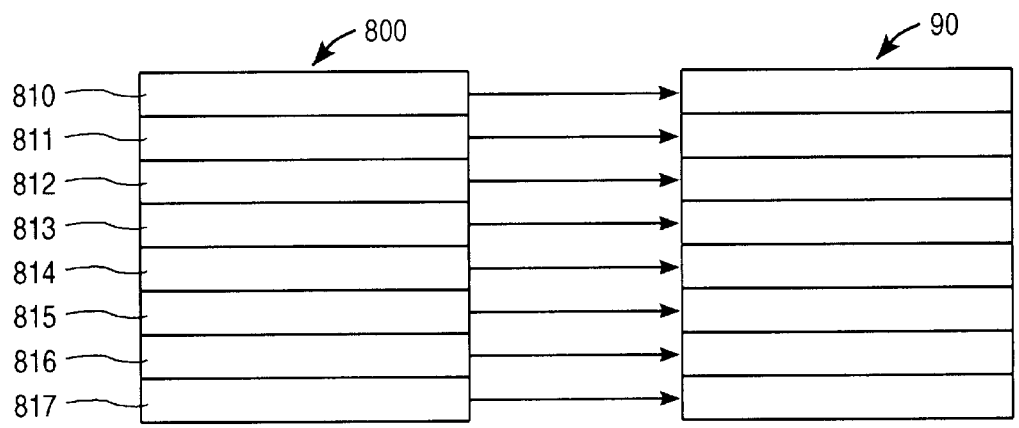
FIG_10A
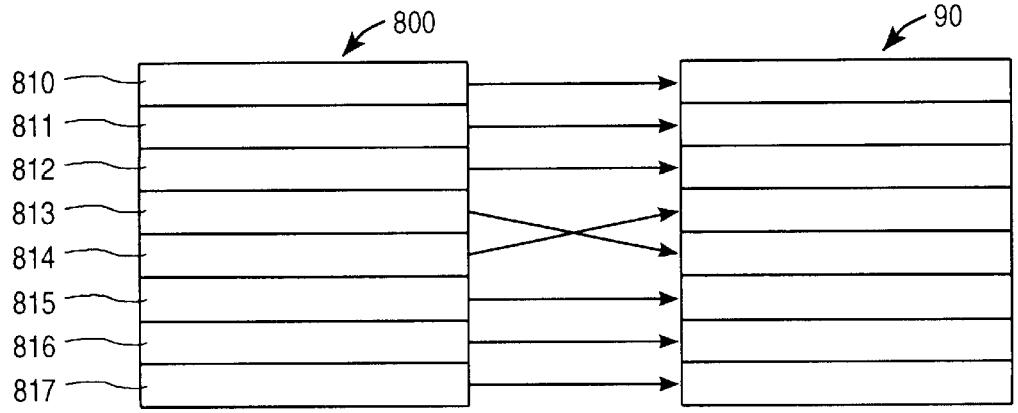
FIG_10B

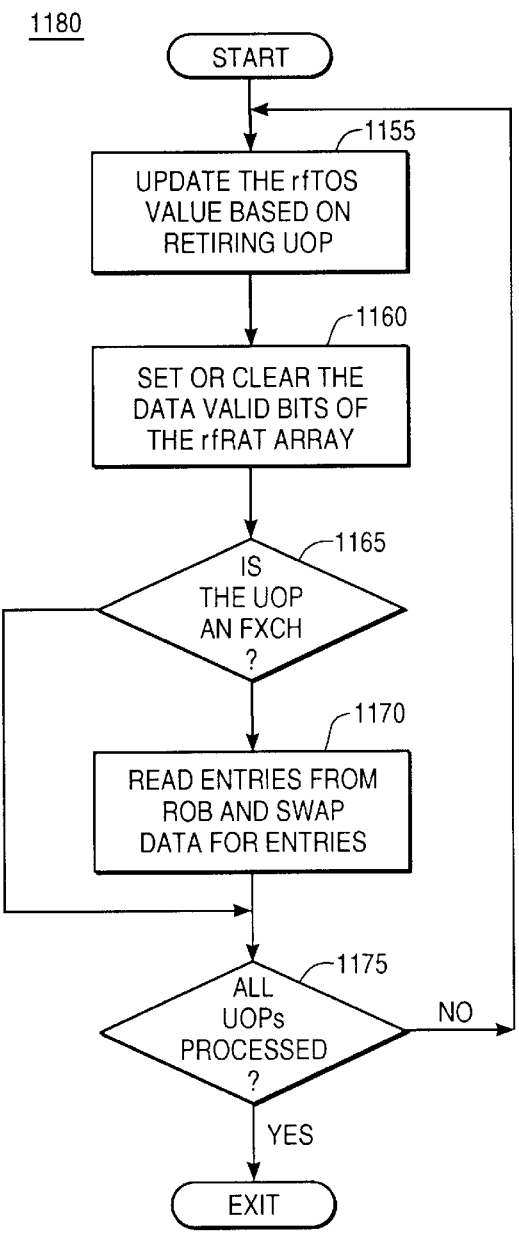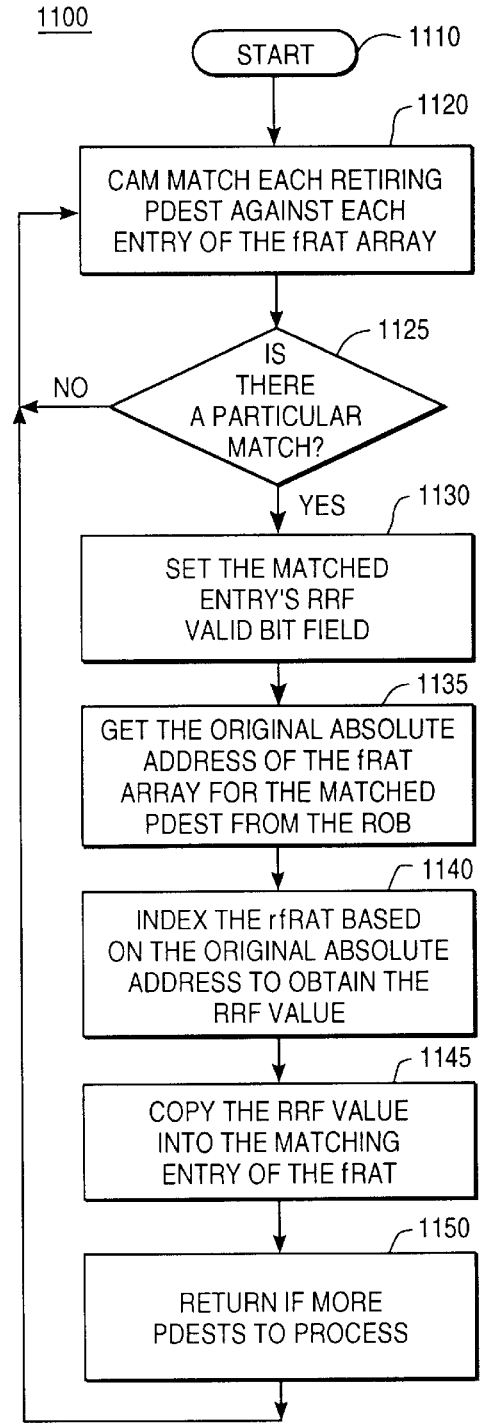
FIG_11A
FIG_11B

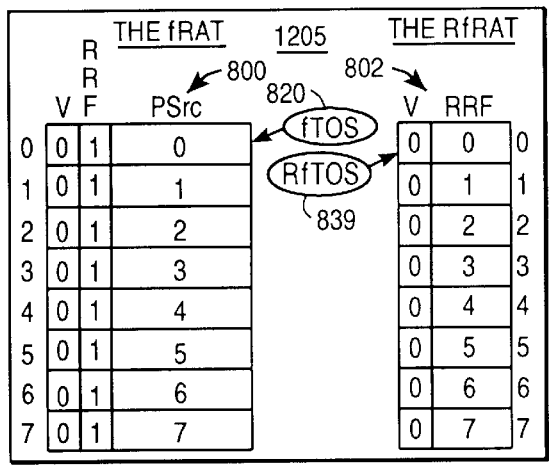
FIG_12A
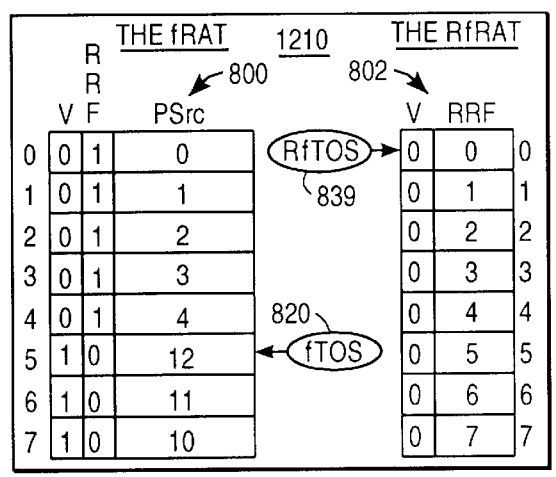
FIG_12B
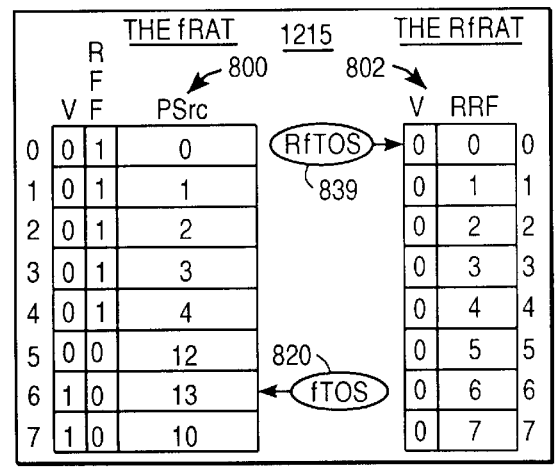
FIG_12C
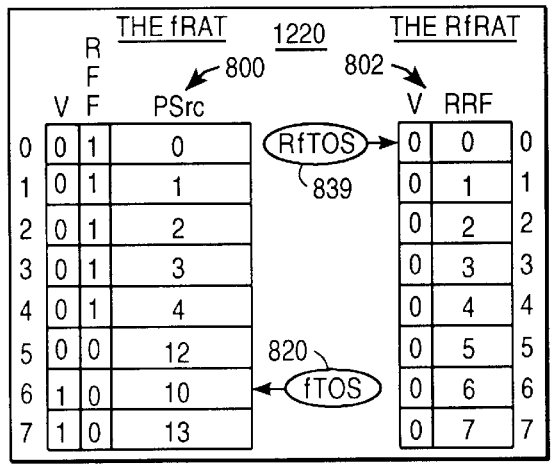
FIG_12D
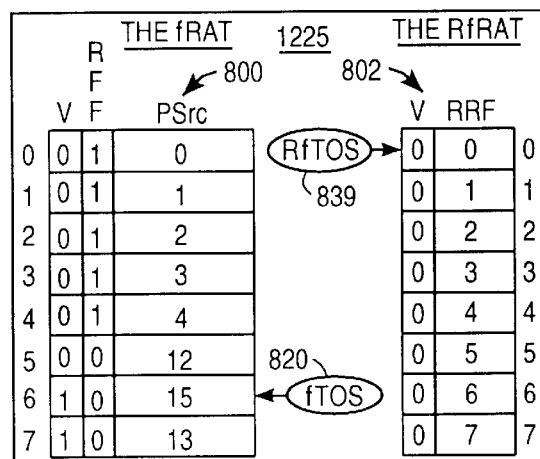
FIG_12E

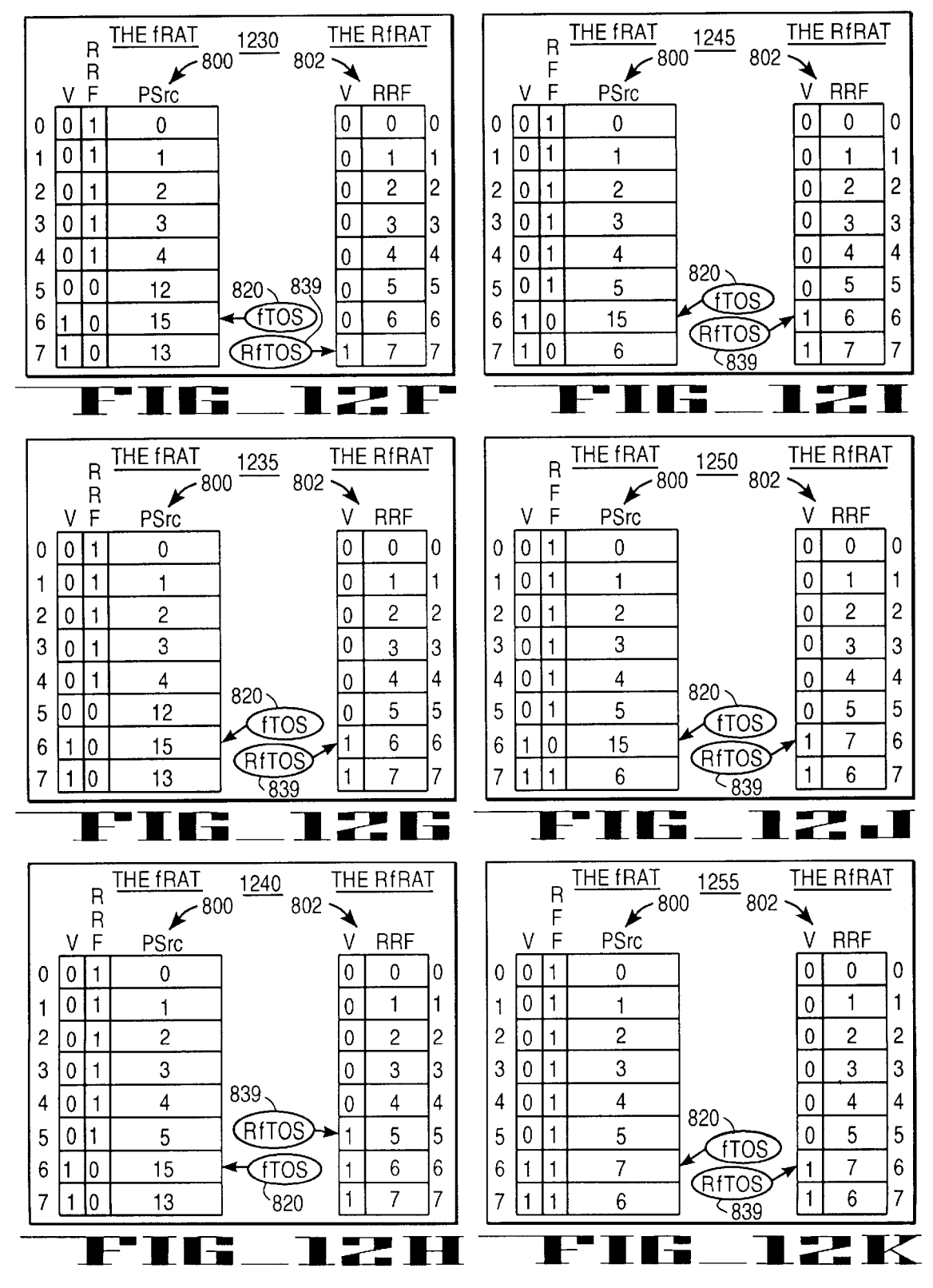

FIG_12F

FIG_12I

FIG_12G

FIG_12J

FIG_12H

FIG_12K

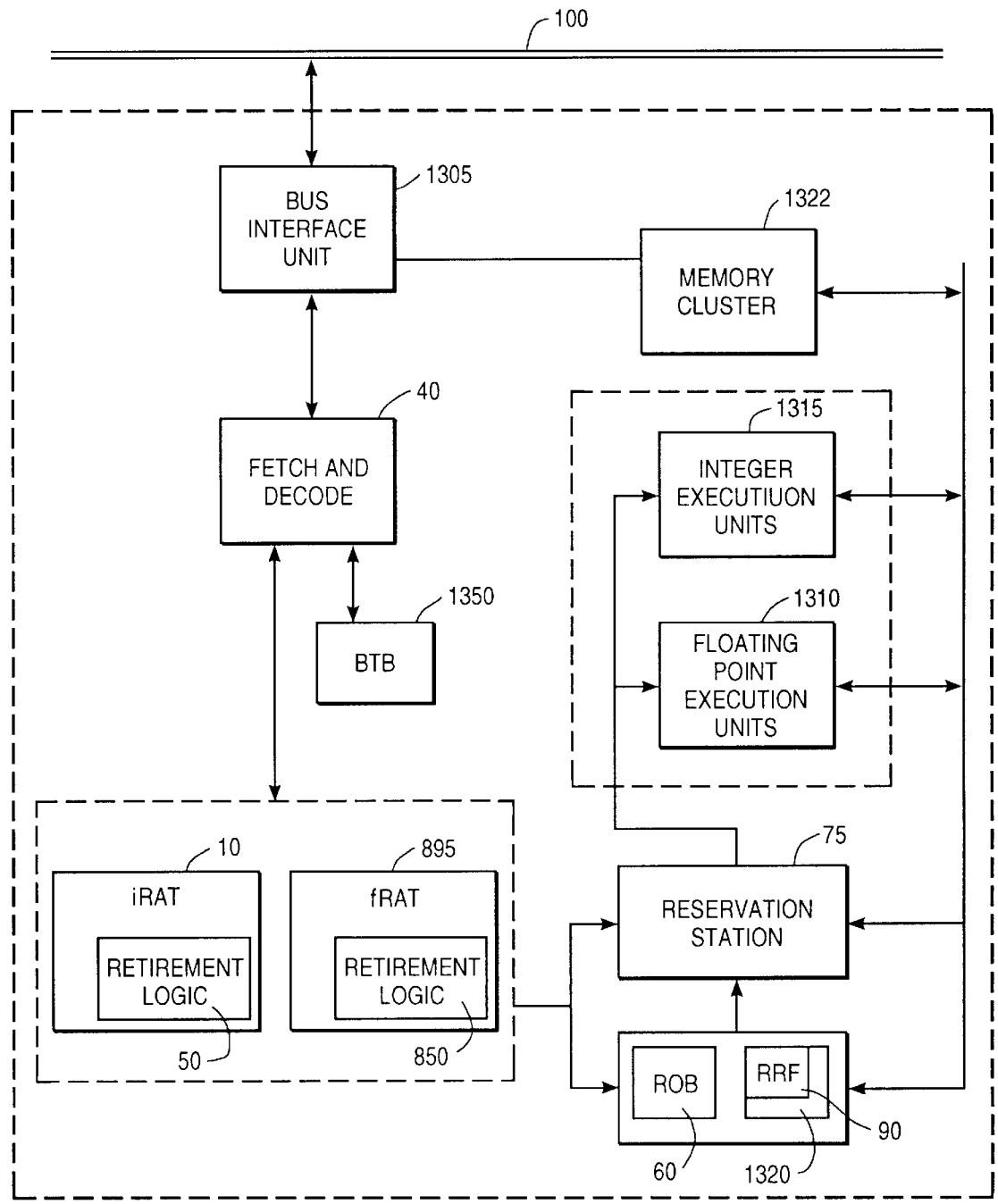
FIG_13

REGISTER ALIAS TABLE UPDATE TO INDICATE ARCHITECTURALLY VISIBLE STATE

This a continuation of application Ser. No. 08/563,359, filed Nov. 28, 1995, now abandoned, which is a continuation of application Ser. No. 08/201,566, filed Feb. 25, 1994, now abandoned which is a continuation-in-part of application Ser. No. 08/129,867 filed Sep. 30, 1993, now U.S. Pat. No. 5,548,776.

BACKGROUND OF THE INVENTION

(1) Field of the Invention

The present invention relates to the field of microprocessor architecture. Specifically, the present invention relates to the field of microprocessor architecture for increasing processing efficiency within microprocessors having limited numbers of registers by providing register renaming ability and handling source-destination data dependencies between operands of associated microprocessor operations.

(2) Prior Art

Microprocessors execute instructions and micro-operations ("uops") by reading source operands from registers and storing destinations or result operands into registers. A register is a temporary storage area within a microprocessor for holding arithmetic and other results used by microprocessor device. Different registers may be used for different functions. For example, some registers may be used primarily for storage of arithmetic results, while other registers may be used primarily for conveying status information via various flag bits (such as system status or floating point status). Registers are individually composed of bits. A bit is a binary digit and may adopt either a "0" value or a "1" value. A given register may contain various bit widths. For example, a 32 bit register may also contain separate 8 bit widths or a separate 16 bit width. Each of the above different register widths for a given 32 bit register may be separately addressable.

The register set of the well known Intel architecture has specially defined registers. For background information regarding the register set of the well known Intel macroarchitecture, reference is made to Chapter 2 of the *i486 Microprocessor Programmer's Reference Manual*, published by Osborne-McGraw-Hill, 1990, which is also available directly from Intel Corporation of Santa Clara, Calif. In terms of the Intel macroarchitecture register set, 32-bit arithmetic registers are called eax, ebc, ecx, and edx. With reference to eax, this register is composed of other registers of varying width; the low word 16 bits of the eax register are called the ax register. The low byte of the ax register is the al register. The high byte of the ax register is the ah register. Likewise in similar fashion, the other 32-bit registers, ebx, ecx, and edx individually contain separate registers of varying widths. The basic arithmetic registers for use within the Intel macroarchitecture register set include: eax, ebx, ecx, edx, edi, and esi (as well as the partial bit widths thereof). These are the logical registers.

The amount of registers available within the Intel architecture register set is adequate and advantageous within some microprocessor architectures that are not superscalar or that are superscalar but at most execute two instructions per instruction cycle. However, it would be advantageous to be able to expand the register set in some way. Superscalar microprocessor, as any other microprocessor, could take advantage of the increased register set to increase performance. Superscalar microprocessors can execute uops simultaneously that do not have data dependencies between them. For instance, consider the code below.

| uop0: mov | eax, 0x8A |
| uop1: add | eax, ebx |
| uop2: add | ecx, eax |

The uop1 may not execute simultaneously with uop0 because uop1 adds the value of eax with ebx and stores the result into eax. Therefore, uop1 requires the result of uop0 to perform its operation. Likewise, uop2 requires the result (e.g., eax) of uop1 and therefore may not execute simultaneously with uop1. When one uop requires as a source of information a register from a prior uop that is a destination register, this condition is referred to as a data dependency between the two uops. For instance, uop2 and uop1 are data dependent. Some data dependencies, like the above, are unavoidable and therefore impact on the performance of a superscalar microprocessor simply because some uops demand a particular execution order. These data dependencies are called true data dependencies.

However, other data dependencies of uops are not true data dependencies and are more the result of the limited size of a particular microprocessor's register set. Because a register set may be constrained in size, uops may tend to utilize the same registers as temporary storage locations (registers) rather than moving data to and from memory. This is the case because memory moves take quite a large amount of processing time and are very costly to processor overall performance. Therefore, a small register set may create a form of "bottleneck" in the performance stream of a superscalar microprocessor as multiple uops target the same register for temporary storage of data but really do not depend on the data of these registers for their own execution. For instance, consider the instruction code below:

| uop0: mov | bx, 0x8A |
| uop1: add | ax, bx |
| uop2: mov | bx, cx |
| uop3: inc | bx |

While uop1 is data dependent on the result of uop0 for the bx register, there are no data dependencies between uop2 and uop1. Although uop2 and uop1 both utilize the bx register, the source value of uop2 does not in any way depend on the outcome of the execution of uop0 or uop1 even though both uops in some way utilize the bx register. This is called a false dependency between uop1 and uop2. The same is true for uop3 in that uop3, while data dependent on uop2, does not depend on the results of either uop0 or uop 1. Therefore, a superscalar microprocessor should (in principle) be able to at least execute uop1 and uop2 simultaneously. However, since they both utilize the bx register, it would be advantageous to be able to provide a microprocessor architecture to allow the above uops (uop1 and uop2) to simultaneously execute.

Superscalar microprocessors execute several operations simultaneously and therefore, any process that removes data dependencies as discussed above must operate on a given set of operations simultaneously, the set being those operations that are simultaneously issued by the microprocessor within a given "cycle." Data dependencies may occur between operations of different sets or may occur within operations of the same set (e.g., intracyle). Therefore, it would be advantageous to be able to provide a system for reducing the amount of false data dependencies within program code sets by providing a larger register set which may be assigned information.

Microprocessors that have a front end unit with the ability to predict, ahead of time, the outcome of a branch within a program code can process program code instructions that are part of a mispredicted branch. Therefore, prior to a determination by the microprocessor that a particular predicted branch was predicted properly, the branch is speculative and therefore it would be advantageous to be able to account for the fact that certain data within the microprocessor is associated with speculative operations. It would also be advantageous to be able to account for the fact that certain other data within the microprocessor is associated with a properly predicted branch. Data associated with a properly predicted branch has the ability to become architecturally visible provided other conditions are also met. The present invention provides such advantageous result. Data is said to be architecturally visible when it is associated with a properly predicted branch and when it is proper to update the logical register file with that data. Of course, when the logical register file is updated, the data become available and is therefore "visible" to the outside of the microprocessor (e.g., visible to a programmer). Before that state, speculative data is processed internal to the microprocessor but not available for use outside the microprocessor.

It would be advantageous to provide, within the above stated system for reducing the amount of false data dependencies, a mechanism for indicating that data related to a particular logical register is architecturally visible. In this way, the system for reducing the amount of false data dependencies will have a mechanism for pointing to the most recently computed data. The present invention provides such advantageous result.

Accordingly, it is an object of the present invention to indicate when data becomes architecturally visible within a microprocessor that can speculatively execute information. It is an object of the present invention to provide a system for indicating when information within the microprocessor is associated with a segment of program code that has been properly predicted. It is further an object of the present invention to provide, within a system for reducing the amount of false data dependencies associated with program code, a mechanism for indicating that data related to a particular logical register is architecturally visible. It is further an object of the present invention to provide a mechanism for indicating when data associated with integer registers become architecturally visible within a microprocessor by updating a register alias table. It is further an object of the present invention to provide a mechanism for indicating when data associated with stack referenced registers become architecturally visible by updating a register alias table and wherein the stack referenced registers are floating point registers.

It is yet another object of the present invention to provide a mechanism for updating a register alias table to reflect that certain data is located within a real register file whose contents are architecturally visible. It is further an object of the present invention to provide the above advantageous objects in a system wherein the register ordering of the architecturally visible buffer may be altered due to register exchange operations.

It is another object of the present invention to provide the above functionality within a high performance superscalar microprocessor resulting in increased execution efficiency. It is another object of the present invention to provide a general purpose computer system having such high performance superscalar microprocessor as an integral component. These and other objects of the present invention not specifically stated above will become evident according to discussions of the present invention to follow.

(3) Related U.S. Application

The present invention is a continuation-in-part of Ser. No. 08/129,867 filed on Sep. 30, 1993 and entitled "N-Wide Bypass for Data Dependencies Within Register Alias Table," and assigned to the assignee of the present invention.

SUMMARY OF THE INVENTION

A device and method are provided for indicating, using a register alias table (RAT) that certain data has become architecturally visible so that the RAT contains the most recent location of the data. The device includes an architecturally visible buffer having a plurality of entries wherein individual entries correspond to individual logical registers. The device also has an architecturally invisible buffer that has a number of entries wherein individual entries correspond to individual addresses of the physical registers. An array memory is also included that has a plurality of individual entries for associating logical registers with assignable physical registers located within the architecturally invisible buffer. Also included is indication logic having individual entries of the array memory for indicating whether information associated with a given logical register is located within the architecturally invisible buffer or located within a corresponding entry of the architecturally visible buffer. Upon receiving the indication that data associated with a particular register is architecturally visible, if a subsequent operation uses a particular register as a source, the data will be supplied from the architecturally visible buffer instead from an internal buffer, i.e., not architecturally visible. When an instruction retires, the register alias table is searched for the retiring physical register and will indicate with the register alias table that the data associated with the retiring physical register is located within the visible buffer only if the register alias table has not already, or concurrently, reassigned a new physical register to the logical register associated with the retiring physical register. If the logical register associated with the retiring physical register has been reassigned by subsequent instructions, then no update of the register alias table is required. Also provided is an embodiment for providing the above features in a system wherein the register ordering of the buffers can be altered via register exchange operations.

BRIEF DESCRIPTION OF THE DRAWINGS

FIG. 1 illustrates an overall block diagram of the major components of the iRAT logic of the present invention.

FIG. 2 illustrates a timing diagram of a clock cycle and illustrates the time periods in which major iRAT logic functions are performed within the present invention.

FIG. 3 illustrates a sample iRAT array composed of 12 entries, and for each entry a register size field, a RRF valid field, and a physical register pointer field.

FIG. 4A illustrates the retirement override logic for the four possible logical source1 input values of a current set of uops processed by the iRAT logic of the present invention.

FIG. 4B illustrates the retirement override logic for the four possible logical source2 input values of a current set of uops processed by the iRAT logic of the present invention.

FIG. 4C illustrates a portion of the CAM match logic utilized by the present invention to generate the match signal for entry zero of the iRAT array.

FIG. 4D illustrates a portion of the CAM match logic utilized by the present invention to generate the eight output signals (for entry zero of the iRAT array) used to control the mux logic of FIG. 4A and FIG. 4B.

FIG. 5A illustrates the new PDest override logic of the present invention for processing the conditions when intra-cycle data dependencies occur between logical sources of a given uop and a logical destination of a prior uop for the logical source1 values of the current uop set.

FIG. 5B illustrates the new PDest override logic of the present invention for processing the conditions when intra-cycle data dependencies occur between logical sources of a given uop and a logical destination of a prior uop for the logical source2 values of the current uop set.

FIG. 7A represents a flow chart of the iRAT processes at retirement which determine if a particular entry of said iRAT array should be set to indicate that its data is stored in the architecturally visible RRF rather than in the architecturally invisible ROB.

FIG. 7B represents a flow chart of major processing tasks of the iRAT logic of the present invention.

FIG. 8A illustrates an overall block diagram of the major components of the fRAT logic of the present invention.

FIG. 8B illustrates the fRAT and rfRAT arrays of the present invention.

FIG. 8C is an illustration of a sample portion of the ROB of the present invention for floating point RAT functions.

FIG. 9 illustrates the stack-based logical register to absolute address translation unit of the present invention within the fRAT logic.

FIG. 10A is an illustration of a straight across mapping of the fRAT array and the retirement buffer for the present invention.

FIG. 10B illustrates an effective reordering of the retirement buffer as an FXCH consequence of the present invention.

FIG. 11A is a flowchart illustrating the major processing tasks of the rfRAT array retirement function of the present invention.

FIG. 11B is a flowchart illustrating the major processing tasks of the fRAT array retirement function of the present invention.

FIGS. 12A–21E illustrate results of the rfRAT and fRAT arrays for uop issuance in the fRAT logic of the present invention for a sample group of uops.

FIGS. 12F–12K illustrates results of the rfRAT and fRAT arrays for uop retirement in the fRAT logic of the present invention for a sample group of uops.

FIG. 13 illustrates a high performance microprocessor of the present invention utilizing register renaming units.

FIG. 14 is an illustration of a general purpose computer system utilizing a high performance processor of the present invention.

DETAILED DESCRIPTION OF THE INVENTION

Figure 6:
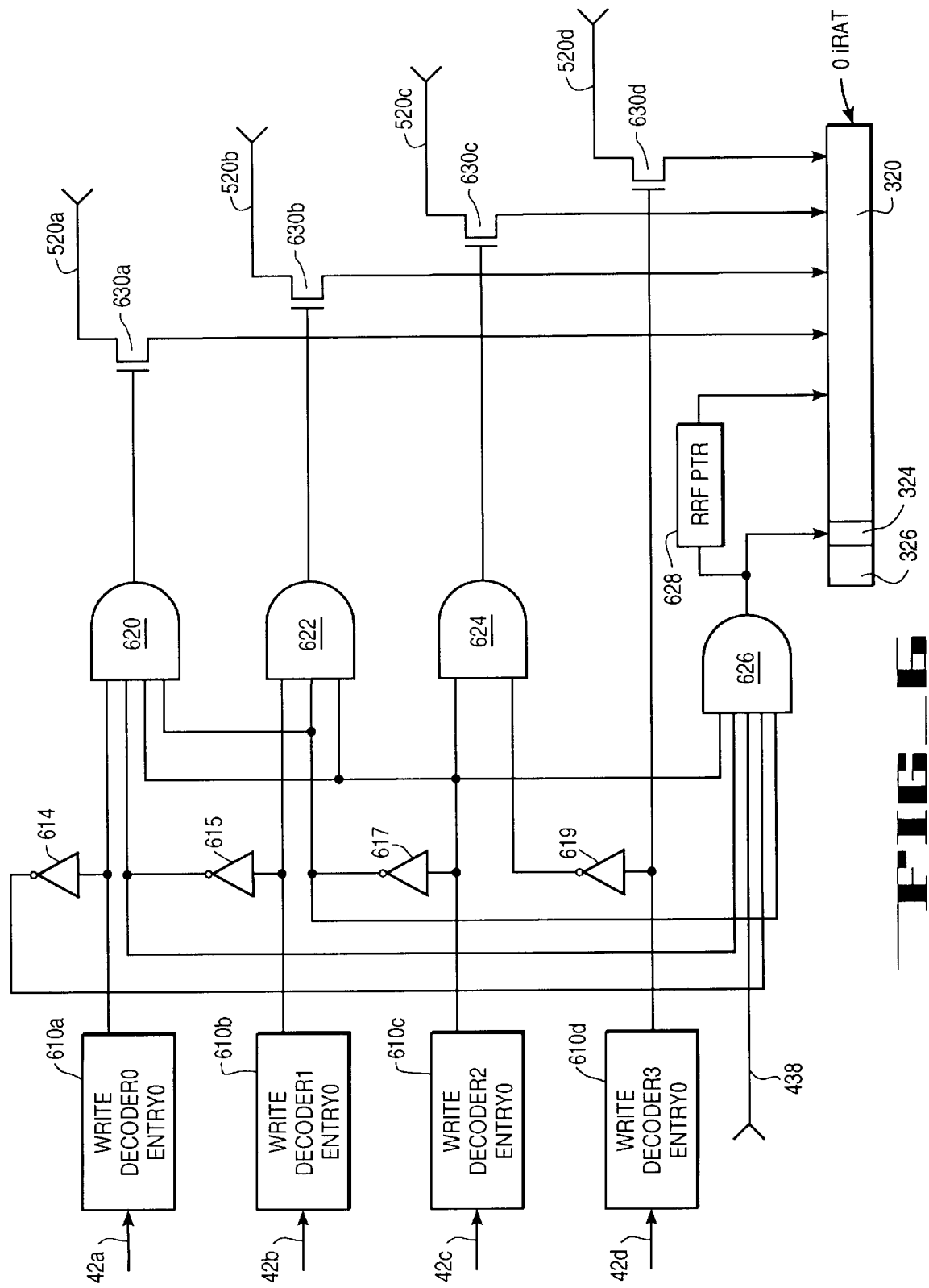
FIG. 6 illustrates the priority write logic utilized by the present invention to write the PDests supplied by the allocator into the proper entries of the iRAT array according to possible logical destination conflicts between uops of the current set.

The present invention includes a mechanism, within a register alias table (RAT), for indicating when data associated with certain renamed registers becomes architecturally visible. This is done so that the RAT can supply the location of the most recently placed data. Normally, the RAT array points to an architecturally invisible buffer, the reorder buffer, which contains physical registers that are the renames of logical registers. When a physical register of the ROB retires, its data is placed in a retirement register file and the entry of the RAT array indicating the retired physical register is updated so that the RAT array points to the retirement register file as the source of information, rather than the reorder buffer. If the RAT array does not contain the retired physical register then the RAT array is not updated. The present invention includes special mechanisms and procedures when the ordering of the logical registers can be altered due to speculative register exchange operation. This latter embodiment is explained in relation to stack referenced floating point registers, but may be applied to registers that are not stack referenced or floating point.

The present invention operates within a register alias table for renaming logical registers to physical registers in order to remove false dependencies within the uops of a high performance superscalar microprocessor. The register alias table of the present invention provides a separate integer register alias table ("RAT") for renaming integer registers and a separate floating point register alias table for renaming stack based floating point registers; although shown as separate the two arrays may be combined physically in an alternative embodiment. By utilizing the integer and floating point register alias tables, the registers of the relatively constrained Intel macroarchitecture register set may be renamed into an expanded set of physical registers which reside within a reorder buffer ("ROB") of a high performance superscalar microprocessor. By renaming the logical registers of the Intel macroarchitecture register set, not only are there more registers with which to work, but false data dependencies can be effectively removed from the program code thus increasing the number of uops that can be simultaneously executed by the high performance superscalar microprocessor. The above features become additionally advantageous coupled with a superscalar microprocessor that can execute uops out of program order. In such an out-of-order microprocessor, logical registers within uops having false data dependencies can be effectively renamed to registers of a physical register set thus removing the false dependencies and increasing possible execution throughput.

In the following detailed description of the present invention numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure the present invention.

Certain terminology is utilized in the following discussion of the present invention by way of example. Logical registers are those registers of the Intel macroarchitecture register set, e.g., eax, ebx, ecx, ah, bh, di, edi, and so on. The present invention RAT architecture is designed to operate associated with and within a superscalar microprocessor that can execute up to four uops per instruction cycle. The microprocessor is also capable of executing uops out-of-order when the case allows. Therefore, within a given instruction cycle (e.g., available clock cycle) one uop to four uops may be presented for processing to the integer RAT or floating point RAT simultaneously. The uops presented to the RAT arrays of the present invention, for any given clock cycle are called the "current set of uops" within a cycle. The clock cycle referred to is a single clock cycle within a pipeline of the microprocessor. The pipeline stage of the microprocessor covered within the present invention is the register renaming stage. The logical registers associated with this set of uops of a cycle are similarly referred to as the logical registers of a cycle or of the current set of uops. It is understood that any given set of uops within a cycle must be processed through the integer RAT or floating point RAT within a single clock cycle so by the start of the next clock cycle the RATs will be ready to process the next set of uops presented in a next clock cycle.

It is appreciated that while the Intel architecture microprocessor is illustrated by way of example only, the present invention may be advantageously utilized in a number of various microprocessor designs. For example, register renaming and an N-wide bypass capability of the present invention may operate within microprocessor systems such as the DEC Alpha and the PowerPC architectures. Therefore, while the Intel instruction set is described herein, it should be borne in mind that alternative microprocessor instruction sets and architectures are within the spirit, scope and discussion of the present invention. It is further appreciated that the present invention may be realized by manufacturing the entire circuitry and resulting microprocessor on a single chip or by manufacturing different sections on different and separation chips. Further the chip or chips, as the case may be, may be manufactured from silicon substrate or from gallium arsenide.

The RAT functions with a high performance superscalar microprocessor (see FIG. 13). The microprocessor of the present invention executes instructions speculatively utilizing a branch target buffer. The front end of the microprocessor may take an educated guess on the pathway of a program code at a particular branch instruction (based on the pathway previously taken by the microprocessor or based on a default pathway) and follows and executes a program path that may or may not actually be executed depending on the real results of the branch instruction. Until the checking hardware of the microprocessor actually determines that it took the right pathway (e.g., when the branch is reduced to architectural state), each instruction and uop executed and processed by the microprocessor after encountering the branch instruction will be speculative. Speculative instructions are not allowed to update certain portions of the microprocessor that hold "real results" or architecturally visible data which represent results of nonspeculative instructions. If the front end of the microprocessor guessed correctly, then the speculative instructions "retire" and their results may be updated into the architecturally visible buffers (e.g., retirement register buffers). The processing of the present invention prior to an operation's retirement is called issuance or issuing.

If the microprocessor took the wrong pathway, then the results of the speculative instructions are purged and the microprocessor is set along the correct pathway. Therefore, reference to an instruction "retiring" means that an instruction or uop has been determined to be nonspeculative and has actually updated the architecturally visible portions of the superscalar microprocessor. Upon each clock cycle up to four uops can retire; these retiring uops are referred to as the retiring set of uops. Therefore, according to the below discussion two sets of uops are discussed. The first set is the current set of uops that are supplied to the iRAT for renaming and other pre-retirement RAT processing (this set is being "issued") . The second set is an older set of retiring uops that has already been processed by the RAT and are used by the RAT operations to determine the proper location of source data for the current set of uops. It is appreciated that the precise details of the speculative execution of the microprocessor used by the present invention are not required to understand the operation of the RATs of the present invention. However, the interface between the RAT operations of the present invention and the microprocessor are described in detail where pertinent. It is sufficient to understand that the microprocessor will communicate to the RAT operations of the present invention when particular uops and their associated operands have "retired" and this retirement indication will impact the RAT operations, which will be explained below. At retirement, the data associated with the retiring uop is written into the retirement register file (RRF).

The RAT operations of the present invention function on both integer and floating point instructions separately. The integer RAT will be described first and then the floating point RAT will be discussed. It is appreciated that the microprocessor of the present invention is also pipelined.

I. Integer Register Alias Table

The integer RAT logic 10 of the present invention is illustrated with reference to FIG. 1. FIG. 1 illustrates the pertinent functional blocks required to realize the integer RAT functions and those blocks required for interfacing the integer RAT ("iRAT") to a high performance superscalar microprocessor as well as the major bus lines that couple the functional blocks. The iRAT array block 45 is essentially a table used for renaming logical registers that are supplied by the instruction fetch/decode unit 40 of the superscalar microprocessor. The logical registers associated with each uop output from block 40 represent those registers common to the Intel register set and are those registers that are used in the program code that is read and interpreted by the fetch/decode unit 40. The logical registers also refer to and include those registers that are internal to the microcode, such as the temporary storage registers. The logical registers are of limited number within the Intel instruction set and therefore it is a function of the iRAT to rename the input logical registers that are for integer functions to individual physical registers that reside within the Re-Order Buffer unit ("ROB") 60. The physical register set within the ROB is comparatively larger than the logical register set and contains greater than 32 entries; therefore a pointer into the physical registers of the ROB requires at least six bits of address width. The ROB 60 may contain speculative information and therefore is architecturally invisible in that the ROB is used internally by the iRAT logic 10. The ROB 60 is not directly accessible to the outside of the microprocessor.

Within the iRAT array 45 there is a separate entry (FIG. 3) for each and every logical register that may hold integer data. The iRAT array receives logical sources from block 40 and outputs physical sources (PSources) whose identity are contained in the array. Associated with each logical register entry is a pointer indicating a location within the ROB 60 to a particular physical register. When a pointer is within the entry (e.g., stored in the entry), that logical register associated with that entry has been renamed to the associated physical register. Any subsequent reference to the logical register will thereafter be directed to the physical register within the ROB 60 that actually holds the data for that logical register. It is appreciated that during the period in which an operand is associated with a speculative uop, the entry of the iRAT associated with that operand points to a physical register of the ROB 60. However, once the uop retires, the data for that operand is placed into the retirement register file or "RRF" 90 of which some of the registers are then architecturally visible. The RRF 90 contains only nonspeculative information and this data is said to be reduced to microarchitecture state. The iRAT array 45 has a special bit associated with each entry that indicates if the data associated with a logical register may be found (1) in the ROB 60 or (2) in the RRF 90. This bit, which will be explained in detail below, is called the RRF valid bit for each iRAT 45 entry. There is more detail associated with the iRAT array 45 and it will be developed in discussions presented further below.

The allocator unit 80 of FIG. I supplies the iRAT array 45 with a list of pointers that represent available physical registers ("PDests") via bus 520. These physical registers reside in the ROB 60 and become vacant for use by the current set of logical destination registers within the current clock cycle. The list of pointers supplied by the allocator unit 80 is in reality a set of 6-bit pointers used to index the ROB where the actual physical registers ("PDests") reside. A discussion of the precise operation of the allocator unit 80 is not required for a full understanding of the iRAT or of the floating point RAT operations. It is sufficient to note that the allocator 80 supplies the iRAT operations, for a given cycle, with a list of at most four vacant PDests for use by the current set of uops within that given cycle. The allocator supplies the iRAT with as many vacant PDests as there are uops in the current set. The instruction fetch and decode unit 40 is also coupled to the allocator 80 via bus 43. The allocator 80 is required to assign four vacant PDests (e.g., newly allocated PDests) to the RAT every cycle for RAT operation. If the resources are not available, the allocator 80 informs the instruction decoder 40 and the RAT 10 that they must delay all processing until sufficient vacant PDests are available. This is one form of a RAT stall.

Referring still to FIG. 1, the uops of a current set and their associated logical registers are supplied by the instruction fetch and decode unit 40 which is coupled to the iRAT array 45 via bus 41 and bus 42. The precise operation of such unit 40 is not pertinent to a full understanding of the present invention iRAT operations. It is sufficient to note that the instruction fetch and decode unit 40 fetches the instructions of the program code in program code order, decodes these instructions, and isolates the logical sources and logical destination for each uop. Any well known instruction fetch and decode unit 40 may operate to supply the iRAT with uops of a given cycle. It is important to note that since the microprocessor used in the present invention is superscalar, the instruction fetch and decode unit 40 must be able to fetch and decode at least enough instructions to supply 4 uops (with associated logical destinations and logical sources) for each clock cycle.

By definition each uop of a given set will have up to two source operands (e.g., two logical source registers) and will have an additional logical destination register. The logical sources of the current set are supplied to the iRAT array over bus 41 via eight separate bus lines, one for each possible logical source. The logical destinations are supplied over bus 42 via four separate bus lines, one for each possible logical destination. A special case exists with respect to the FXCH instruction that is pertinent for the floating point RAT in which both operands may be treated as sources and both operands may be treated as destinations; this will be further discussed later. A logical source register for a given uop is called a "LSource1" or "LSource2" where the 1 or 2 represents the source number (e.g., each uop may have as many as two sources) and a logical destination register for a given uop is called an "LDest." The below list illustrates a typical current set of uops and represents terminology used herein:

|       | Source1  | Source2  | Destination |
|-------|----------|----------|-------------|
| uop0: | LSource1 | LSource2 | LDest       |
| uop1: | LSource1 | LSource2 | LDest       |
| uop2: | LSource1 | LSource2 | LDest       |
| uop3: | LSource1 | LSource2 | LDest       |

The iRAT array 45 performs two important but distinct functions. First, it renames logical source registers to physical source registers of the ROB 60 and keeps track of the renaming processing. At any given time the iRAT must know the most recent physical location (rename) of a given logical source register in order to accurately track the uops that flow through the renaming process. Second, the iRAT array 45 updates its entry pointers of logical destination registers to the new physical destination registers within the ROB 60 assigned by the allocator. To perform the above, the iRAT basically must accomplish two major tasks. First, it must read the logical source registers of the current uop set and determine which physical source registers have been assigned to these logical source registers; this is a table read function. Second, it must interpret the logical destination registers associated with a given set and it must assign appropriate vacant physical destination registers "PDests" (which are supplied by the allocator 80) to these logical destination registers; this is a table write process.

The table write and table read functions must be performed within a clock cycle with the table read occurring for all uops of a given set in parallel during a first half clock cycle and the table write occurring in parallel for all uops of a given set within the second half of the clock cycle. Therefore several of the operations of the iRAT must occur simultaneously. There is simply not enough time to process each uop of a given set sequentially within a table read or write operation. All uops received must be processed (e.g., have table read operations and table write operations) simultaneously. Therefore, the write logic and the read logic of the present invention must accomplish and output in parallel that result which would have been accomplished if each uop was sequentially processed with respect to the RAT.

However, at least two possible cases complicate the operations of the iRAT which, in part, are due to the simultaneous operation of the iRAT functions. Within a given set of uops, the logical source of a later-in-time uop may be the same logical register as the logical destination register of a previous-in-time uop. This case requires special treatment in the table read operations of the iRAT and will be explained further below. Also, during a read operation, the physical source register assigned to a logical source register may be the same ROB pointer as associated with a uop that retires (e.g., a retiring PDest) during the given clock cycle. This case also requires special attention. In addition, during a table write operation, multiple uops of a given set may target the same logical destination register. This case requires special treatment by the iRAT table write operations. Also, during a table write process, a retiring uop's PDest may affect the outcome of the write function. These special cases will be further explained with reference to detailed discussions of the priority write block 65 and retirement override block 50 of the present invention.

The priority write block 65 of FIG. 1 receives the PDests generated by the allocator 80 over bus 520 and will determine which PDest values will be written into which entries of the iRAT array 45. The priority write block 65 prioritizes the array update of the newly allocated physical destinations according to the intra-cycle destination dependencies with the current set of uops. It is appreciated that the table write function of block 65 is not performed until after the iRAT table read function is complete. The table write function inputs the four logical destination registers of the current set and writes to each iRAT entry, defined by the logical destination registers, an appropriate PDest value which is merely a pointer to the ROB 60. The write priority block 65 also sets the RRF valid bit for a given iRAT entry if that entry is found to have retired within the current clock cycle.

The iRAT read functions are performed by the retirement overrides unit 50 and the new physical destinations overrides block 55 ("new PDest overrides") of FIG. 1. For a given cycle, the logical sources of the current set of uops are input into the iRAT array 45 over bus 41 and the iRAT array outputs the physical source registers that are associated with each entry of the iRAT corresponding to the logical sources. However, since retirement of uops may affect the proper location of these sources, the retirement overrides block 50 performs the determinations required to locate the proper source of data for each uop of the current set. The retirement overrides block 50 handles the case in which uops retire during the given cycle thus retiring certain PDests and the uops of the current set (of the same cycle) utilize the data of these retired PDests.

The iRAT array 45 receives pointers over bus 61 corresponding to the physical register destinations ("PDests") of the retiring uops from the ROB 60. Since there can be up to four retiring uops per cycle there are four possible retiring PDests fed from the ROB 60 over bus 61. The retirement override block 50, via a CAM matching circuit compares the retirement pointers ("retiring PDests") received over bus 61 against the iRAT entries and generates up to four match signals (e.g., one match line per possible retiring uop) which are then used internally by the retirement override block 50. The retirement overrides block 50 overrides the physical source registers that are output by the iRAT array 45 with pointers that point into entries of the real register file 90. The iRAT array 45 is coupled to the retirement overrides block 50 via bus 46. It is appreciated that bus 42 carries the four possible logical destination registers of the current set of uops.

Referring still to FIG. 1, the retirement overrides block 50 is coupled to the new PDest overrides block 55 via bus 51. Bus 42 and Bus 41 also couple the instruction fetch and decode unit 40 with the new PDest overrides block 55 to deliver the logical source and logical destination values for the current set. The allocator 80 is coupled to block 55 via bus 520. The new PDest overrides block 55 overrides retirement-bypassed physical sources to output the renamed physical sources, which reflect the intra-cycle data dependencies between uop destinations and sources of subsequent uops. The new PDest overrides block 55 is coupled to the ROB 60 via bus 56 and also coupled to the reservation station 75 via bus 57. The reservation station 75 receives the uops with renamed sources and destinations (e.g., physical sources and physical destinations) and queues the uops for execution to particular execution units (not shown) of the microprocessor. The ROB 60, via input from bus 56, keeps track of certain information regarding register renaming and iRAT data which will be described later.

Refer to the RRF block 90 and ROB block 60 of FIG. 1. It is important to realize that for the duration that a uop and its associated parameters are speculative, the data associated with the source and destination operands for the speculative uop may be found within the physical registers of the ROB 60 or in a reservation station, but it will not be found in the RRF 90. However, the ROB 60 is not visible to the programmer (e.g., the ROB physical registers are not architecturally visible). This is the case because the microprocessor is not sure that it went down the correct program path and therefore the data in the ROB 60 may not be valid. However, as soon as the checking hardware of the microprocessor determines that the front end guessed the correct program path, appropriate data of the ROB 60 that are processed (e.g., the PDests) may be retired and then are not speculative any longer. At this point, the PDest data of each retired uop is written from the ROB 60 to the RRF 90 (some registers of which are architecturally visible to the programmer) into the appropriate entry as defined by the original logical register which was renamed. The ROB remembers, for each PDest of each retiring uop, the original logical destination register that is associated with the retiring PDest. As with any well known register file, within the RRF 90 there is a unique entry for each register of the Intel macroarchitecture register set. For integer registers, these entry points do not vary. Therefore, data representing the eax register always has the same location within the RRF 90. Therefore, not only does the ROB 60 provide additional registers for use to the microprocessor in order to remove otherwise false dependencies between uops, but the ROB 60 also provides a temporary storage area in which the results of speculative uops may be placed until they retire into the RRF 90.

Timing of Major RAT Tasks

FIG. 2 illustrates the overall timing diagram of the major functions of the RAT logic 10. It is appreciated that the clock cycle 205 is but one clock cycle stage within a pipeline of stages required to completely fetch, decode, execute and "retire" a given set of uops. As the interfaces with the preceding and subsequent stages become pertinent to discussions regarding the RAT operations, they will be discussed at length. Regarding FIG. 2, one full clock stage is illustrated as 205. A current set of uops must be fully processed by the iRAT logic 10 within cycle 205. The retiring PDest data (over bus 61) associated with the retiring set of uops becomes available for use within period 207. During the first half 207 of the clock stage 205 there are two clock stages 210 and 215. At stage 210 the iRAT 45 is read by indexing the logical source registers as input and the corresponding source physical destination registers are output. During the period 210 CAM matching occurs simultaneously by block 418 (FIG. 4A) with respect to retiring PDests and the iRAT entries of array 45. At 215 the retirement override logic 50 is performed on the table read outputs. The next half clock cycle is 209 and is composed of duration 220 and overlapping 230. During period 220, the new PDest override logic 55 functions to handle the case of intra-cycle data dependencies between logical sources and logical destinations. During the period 230 the table write functions of block 65 and 45 occur which utilize the CAM match results of the retirement override block 50. As noted the table write functions occur during period 230, in part, simultaneously with the PDest override functions during 220. The typical duration of 205 is 6.7 nanoseconds in one mode.

iRAT Array Block 45

FIG. 3 illustrates a sample iRAT array 45. It is appreciated that the array 45 illustrated is a sample of the total array that exists within the present invention. However, in order to more clearly illustrate the present invention, a representative version of the iRAT table is shown in FIG. 3. The iRAT array 45 illustrates a table having 12 entries and three columns. Each entry in the table is associated with a separate logical register of the Intel macroarchitecture register set. The first column 326 of each entry indicates the size of the data represented by the entry; some logical registers may adopt individual sizes depending on their width. For instance, the size column 326 is two bits wide and will indicate either storage of a 32-bit width of data (i.e. eax), a 16-bit width of data (e.g., ax), an 8-bit width of data of the upper byte of the lower word (e.g., ah) and an 8-bit width of data of the lower byte of the lower word (e.g., al) for each of the 12 entries of the RAM array. It is appreciated that the above pointer sizes may be altered for configuration with other microprocessor architectures and are presented for illustration. The second column 324 of each entry is the RRF valid bit. If this bit is set then the data currently representing the integer logical register associated with the entry may be found in the RRF 90 and not in the ROB 60. The third column 320 for each entry represents a pointer to a particular physical register within the ROB 60 which has been assigned to contain the data for the logical register associated with the given entry of the pointer. Alternatively, the column 320 for each entry may indicate a location within the RRF 90 if the RRF valid bit (column 324) is set for a particular entry.

The iRAT array 45 is a multi-ported RAM and each entry of the RAM has eight read ports which can read the entry. Each entry will be read by associated sources used by the uops of the current set. These sources are fed via bus lines 41(a)–41(h) for each source for each uop of the current set. The logical source1 values for uop0–uop3 are input over bus 41(a)–41(d) and the logical source2 values for uop0–uop3 are input over bus 41(e)–41(h). The physical registers associated with the input bus lines 41(a)–41(h) for the initial read cycle are output over corresponding buses 46(a)–46(h). Since there are four uops for any given set within a cycle and since each uop of a set may have up to two integer sources, the iRAT array 45 must accommodate the condition when each and every source of each uop demands to read the same entry. For this reason, there are eight read decoder units per each iRAT entry that each recognize when that entry is to be read for a given source of the current uop set. Each read decoder unit for a given iRAT entry is coupled to an individual input bus of 41(a)–41(h). Each entry can similarly output its contents over buses 46(a)–46(h). Initial read outputs 46(a)–46(d) correspond to the iRAT array physical source outputs corresponding to inputs 41(a)–41(d) and initial read outputs 46(e)–46(h) correspond to the iRAT array physical source outputs corresponding to inputs 41(e)–41(h).

The instruction fetch and decoder unit 40 supplies up to eight logical source registers (via bus 41) to the iRAT array and the iRAT array 45 performs an initial read to output the physical register pointers associated with each entry referenced by each of the logical source registers. These eight physical source register outputs are sent via bus 46 to the retirement overrides block 50. Each of the eight input logical source registers fed to the iRAT table 45 is channeled via a separate port of the iRAT array so that all eight sources may be input to the table 45 at once. Therefore, the outputs (over bus 46) corresponding to the physical source registers of the table 45 are also simultaneously output over bus 46. Table 1 illustrates the input to the iRAT and the initial read output of the iRAT table 45 before any overrides take place to account for retirement and/or data dependency.

TABLE 1

|      | Input 41(a)–41(h) | | Output 46(a)–46(h) | |
|------|---------|---------|----------|----------|
| uop0 | LSource1 | LSource2 | PSource1 | PSource2 |
| uop1 | LSource1 | LSource2 | PSource1 | PSource2 |

TABLE 1-continued

|      | Input 41(a)–41(h) | | Output 46(a)–46(h) | |
|------|---------|---------|----------|----------|
| uop2 | LSource1 | LSource2 | PSource1 | PSource2 |
| uop3 | LSource1 | LSource2 | PSource1 | PSource2 |

As shown by Table 1, up to eight logical sources may be input to the iRAT for the current set of uops (uop0–uop3) and eight possible outputs may result. Each output is the physical source register pointer value found within the entries of the iRAT that are indexed by the logical source register inputs for a given set of uops.

The iRAT array 45 is logically separated into an upper portion 305 and a lower portion 310 for the integer registers that utilize partial width sizes. The upper portion 305 is implemented to account for the partial width portions that exclude the lower 8-bit portion of the lower word (such as al) and the lower portion 310 is implemented to account for the partial width portions that exclude the upper 8-bit portion of the lower word (such as ah).

For instance, entry 0 of the Table 45 corresponds to registers eax, ax, or ah. Also, entry 6 of the table corresponds to registers eax, ax, or al. Write operations to eax, or ax will be directed to both entry 0 and entry 6. However, write operations to the al register are solely directed to entry 6, while write operations to ah are directed solely to entry 0. The reason high and low bytes of the low word are separated is to eliminate RAT stalls upon renaming registers of partial widths. This will be discussed in more depth further below. The Table 2 below indicates the integer logical registers represented by the 12 entry table 45.

TABLE 2

| Entry | Logical Registers | | Entry | Logical Registers |
|-------|-------------------|---|-------|-------------------|
| 0 | eax, ax, ah | | 8 | eax, ax, al |
| 1 | ebx, bx, bh | | 9 | ebx, bx, bl |
| 2 | ecx, cx, ch | | 10 | ecx, cx, cl |
| 3 | edx, dx, dh | | 11 | edx, dx, dl |
| 4 | edi, di | | | |
| 5 | esi, si | | | |
| 6 | ebp, bp | | | |
| 7 | esp, sp | | | |

It is appreciated that the RAT array 45 also contains two banks of temporary storage registers and an integer flag storage area and a floating point flag storage buffer. These buffers are not particularly pertinent to the iRAT as discussed within the present invention therefore are not discussed in detail herein. In effect, they are not pertinent because they represent only the simplest renaming cases that do not have to deal with any size fields. It is appreciated, however, that the RAT may rename the registers of the temporary storage area analogously to the RAT discussions herein for the arithmetic registers.

Partial Width Stalls. Given the renaming functions of the iRAT, use of partial width registers may cause the iRAT operations to stall until the speculative instructions have all retired that precede the instruction causing a stall condition. For instance, if a partial width write is followed by a larger width read, then the data required by the larger width read must be an assimilation of multiple previous writes to different pieces of the register. For instance, consider the below sequence of uops that exist within a set for a given cycle:

```
uop0:   mov    eax, 0      ;eax gets value 0
uop1:   mov    al, 0xff    ;al register gets ff
uop2:   mov    ah, 0xb4    ;ah register gets b4
uop3:   push   ax          ;store ax on top of stack, inc sp
```

The iRAT logic 10 of the present invention will treat the eax register of uop0 as a destination register and the table write logic will assign a vacant PDest (say PDest 6) that is supplied from the allocator to entry 0 and entry 8 of the iRAT table 45 and set the size bit on both entries to 32 bit. Next, the iRAT write logic will assign another PDest (PDest 7) to entry 8 of the iRAT table corresponding to logical register al of uop1 and set the size bit of entry 8 to represent 8 bits. Next, the iRAT logic 10 will assign another PDest (PDest 8) to entry 0 of the iRAT table corresponding to logical register ah of uop2 and set the size bit of entry 0 to represent 8 bits. However, when the iRAT logic 10 encounters uop3 it encounters a read operation of the ax logical register. There is no single location where the ax logical register is stored. For instance, the lower portion, al, is pointed by entry 8 of the iRAT table which points to PDest 7 of the ROB. The upper portion, ah, is pointed by entry 6 of the iRAT table which points to PDest 8 of the ROB. Since there was a write to a smaller register portion (ah or al) followed by a read to a larger portion (ax) of the eax register, the RAT logic 10 must stall any further table write or table read functions until all pieces of the desired register retire, including those uops of previous and current cycles. It is appreciated that a write to a larger register portion (eax) followed by a read of a smaller register portion (ax) does not cause a RAT stall because the data of the smaller register portion (ax) can always be found as a subset of the larger register portion (eax).

However, by allowing data for the al and ah register to be separately stored within the iRAT table 45, the present invention iRAT logic 10 avoids a common partial write stall condition that occurs according to the below example which is characteristic of program code compiled for the 8086, or 8088 microprocessors supplied by Intel Corporation of Santa Clara, Calif. If only one alias is maintained for all four sizes of a general register access, then independent 8-bit register use would cause a tremendous number of false dependencies to occur. For example:

```
uop0    mov    al, 0xff
uop1:   mov    ah, 0xff
uop2    push   al
```

The above example illustrates partial register use that treats the ah and the al registers as separate but does not necessarily access the 16-bit or 32-bit registers (such as ax or eax) often. Given this scenario, the present invention iRAT logic 10 avoids the stall condition because iRAT contains a separate entry for the ah register renaming function and the al register rename. Two general integer register banks are maintained by the present invention. For 32-bit and 16-bit iRAT accesses, data is read only from the high (upper) bank but data is written into both banks identically. For 8-bit iRAT accesses, however, only the appropriate high or low bank is read or written, according to whether it was a high byte or low byte access. Thus, the high and low byte registers use different rename entries, and both can be renamed independently.

For instance, the PDest pointer for al will be written into the entry 8 of the iRAT array 45. The PDest pointer for ah will then be written into the entry 0 of the iRAT array 45. Later the PDest pointer for the al register will be read from entry 8 of the iRAT array 45 by the table read logic without causing any partial write stall because there are separate entries for each byte of the low word of the eax register. Any subsequent read to the al or ah registers will access the appropriate PDest from different entries of the iRAT table 45 thus avoiding a RAT stall in this common case. It is appreciated that the partial write stall is recognized and generated by block 70 (of FIG. 1).

In general, using the size bit of each entry, if a register read operation is requested of an entry of the iRAT and the register read operation requires more data size than indicated by the size bit of the entry, then the block 70 will issue a partial write stall on the iRAT logic 10. It is said that the uop causing the stall is an over-read condition because it attempted to read more data than present within the iRAT entry. The stall essentially stops any renaming processing until the retirement of the previous uop to the uop causing the over-read condition. The stall effectively prevents any new work from entering the execution engine of the microprocessor until all previous work retires.

iRAT Retirement Override Block 50

Retirement is the act of removing a completed uop from the ROB 60 and committing its state to the appropriate permanent architectural state in the microprocessor. The ROB 60 informs the iRAT logic 10 that the retiring uop's destination is no longer located in the ROB 60 but must be taken from the RRF 90. If the retiring PDest is found in the iRAT array 45, the matching entry (or entries) is reset to point to the RRF. However, if a current uop being translated happens to use the same logical registers as a source as one that is retiring, the data currently in the array is not valid and must be overridden with the entry's reset value. The retirement of uops takes precedence over the initial table read output values.

Refer to FIG. 4A which illustrates in block diagram form circuitry of the retirement override block 50. It is appreciated that up to four possible uops may retire during a clock cycle while the current set of uops are being processed by the table read and table write circuitry of the iRAT 45. Each retiring uop may have only one physical destination register (PDest) that retires. Therefore, there may be four possible retiring destination registers per clock cycle. These retiring destination registers (PDests) must be compared to those PDests of the source entries of the iRAT that are being indexed with respect to the current uop set by the retirement override block 50 in order to generate the proper values for the complete table read operation. The below list illustrates a sample retiring set of uops:

|         | Source1  | Source2  | PDest Retire |
|---------|----------|----------|--------------|
| uop_r0: | PSource  | PSource  | PDestRx      |
| uop_r1: | PSource  | PSource  | PDestRy      |
| uop_r2: | PSource  | PSource  | PDestRz      |
| uop_r3: | PSource  | PSource  | PDestRq      |

Within the same cycle as the current set of uops being processed, a retiring set of uops may retire as shown above. This retiring set comprises eight physical source operands (which are not of concern herein) and importantly, four possible physical destination registers "pointers" that retire (PDestRx, PDestRy, PDestRz, and PDestRq). These retiring physical destination pointers will be compared against the physical source pointers output from the iRAT array during the initial read operation of the iRAT array 45 which are output over buses 46(a)–46(h). The below discussion illustrates in detail how and why such is accomplished.

For clarity of presentation, the logic utilized by the present invention retirement override block for the source1 values of the current set of uops (e.g., for buses 46(a)–46(d)) is illustrated in FIG. 4A while the logic required for the source2 of each uop of the current set is (e.g., for buses 46(e)–46(h)) illustrated in FIG. 4B. It is appreciated that logic used to realize the retirement override functions for each source2 of the current set is analogous to the case for the source1 values and where different will be explained in detail. The basic object of the retirement override block 50 is to account for the true location of the source operands that are associated with the current set of uops (e.g., those received from block 40) and that may also have just retired within the same clock cycle. In other words, the data associated with these sources may not be found within the ROB, as the iRAT table may indicate, but rather within the RRF 90 at a known designated place for each integer logical register.

FIG. 4A illustrates four separate multiplexer devices 410, 412, 414, and 416. Each multiplexer corresponds to the source1 operand for a separate retiring uop. Input to one port of each multiplexer is the physical source register output from the iRAT array 45 for each uop of the current set by buses 46(a) to 46(d) for uop0 to uop3, respectively. For instance, bus 46(a) carries the pointer of the physical source register pointer output from iRAT 45 for the logical source1 input to the iRAT for uop0; this bus is input to mux 410. Line 46(b) carries the physical source register pointer output from the iRAT 45 for the logical source1 input to the iRAT for uop1; this bus is input to mux 412. Line 46(d) is the physical source pointer corresponding to the logical source register of source1 of uop3 of the current set and is fed to mux 416.

Also input to each port of the multiplexers is the pointer value of the logical source1 for each uop that points to the retirement register file (RRF) 90 entry for that uop; these are input as buses 47(a)–47(d) for uop0 to uop3, respectively. These pointers are generated based on the logical source inputs 41(a)–41(d). For each logical source input there is a unique location within the RRF corresponding to that logical source register. For instance, bus 47(a) is the pointer value that indicates the location within the RRF 90 of the data associated with the logical source1 register for uop0 of the current set; this bus is input to mux 410. Line 47(b) is the pointer value that indicates the location within the RRF 90 of the data associated with the logical source1 register for uop1 of the current set; this bus is input to mux 412. These buses are generated by the retirement override circuit 50 once the four input logical register source1 values are known (e.g., lines 41(a)–41(d)). It is appreciated that for a given logical register, its location (e.g., offset) within the RRF 90 is always constant. Therefore, the circuitry to generate the pointers over buses 47(a) to 47(d) needs only to output the proper pointer value to index the RRF 90 based on the given source1 values (buses 41(a)–41(d)) for each uop of the set.

Refer still to FIG. 4A. Input to each of the select line inputs of the multiplexers 410, 412, 414, and 416 are lines 62(a)–62(d), respectively. These are the match lines for each of the four retiring PDests against the physical source1 values. When asserted, each line indicates that the associated physical source1 value for a given uop is associated with a retiring PDest pointer. If this is the case, then the proper place to look for the data of the source1 is not from the physical register entry of the iRAT 45, but rather from the RRF 90 entry associated with that logical source1. For example, if line 62(a) is asserted, the output bus 51(a) will output the pointer value associated with bus 47(a) which is the pointer into the RRF 90 associated with the source1 of uop0, otherwise bus 51(a) will output the pointer of bus 46(a) which is the physical source register pointer of the iRAT 45 array associated with the logical source1 of uop0. Likewise, if line 62(b) is asserted, the output 51(b) will output the signal associated with bus 47(b) which is the pointer into the RRF 90 associated with the logical source1 of uop1, otherwise bus 51(b) will output the pointer of bus 46(b) which is the physical source pointer of the iRAT 45 array associated with the logical source1 of uop1. Therefore, the output buses 51(a)–51(d) indicate the true location of where the data is for each source operand of the logical source1 values of each uop of a given set of uops. These outputs 51(a)–51(d) are pointers that will be used to index the ROB 60 or the RRF 90 to locate the data for the source1 operand values of each uop.

Input to the CAM match logic 418 of FIG. 4A are four signal buses 61(a) to 61(d) that indicate the PDests of the four retiring uops. For instance, bus 61(a) indicates the retirement pointer of the PDest for the retiring uop0. Line 61(b) indicates the retirement pointer of the PDest for the retiring uop1. Line 61(d) indicates the retirement pointer of the PDest for the retiring uop3. The CAM match logic 418 compares the PDest pointers of the retiring uops against all physical register entries of the iRAT to determine if any entry (or entries) of the iRAT retired. Then the CAM match logic 418 determines if one of the retiring PDests is also used as a physical source by one of the uops of the current set within this clock cycle. If so, the source of data output by the retirement override logic 50 for the uop of the current set will be the RRF entry and not the ROB entry. In such way, the retirement overrides block 45 determines if any of the four physical sources1 associated with the current set of uops for a given cycle are associated with any of the retiring PDests of the retiring uops as indicated over bus 61. If this is the case then a match line is asserted for each source1 for each uop so that the retirement pointer to the RRF can be supplied instead of the PDest pointer to the ROB, as discussed above. It is noted that the CAM match logic 418 is executed during the first half clock cycle 207 (of FIG. 2) which is the "high" period. The CAM match logic 418 will be explained in detail to follow.

FIG. 4B illustrates the circuitry required to generate pointer values over 51(e)–51(h) which represents the output source pointer values for the source2 values for a separate retiring uop. The logic is similar to that of FIG. 4A. There are four mux devices 411, 413, 415, and 417 for routing the source2 pointer for uop0, uop1, uop2 and uop3. Input to one port of each mux is the pointer corresponding to the physical source pointer to the ROB 60 output from the iRAT array for the source2 value for each uop; these are buses 46(e)–46(h) for uop0 to uop3, respectively. For instance, bus 46(e) carries the pointer of the physical source register pointer output from iRAT 45 for the logical source2 that was input to the iRAT for uop0; this bus is input to mux 411. Line 46(f) carries the physical source register pointer output from the iRAT 45 for the logical source2 input to the iRAT for uop1; this bus is input to mux 413. Line 46(h) carries the physical source register pointer output from the iRAT 45 for the logical source2 input to the iRAT for uop3; this bus is input to mux 417.

Also input to each port of the multiplexers is the pointer of the logical source2 for each uop that point to the retirement register file (RRF) 90 entry for that uop; these are buses 47(e)–47(h) for uop0 to uop3, respectively. These pointers are generated based on the logical source inputs 41(*e*)–41(*h*), respectively. Bus 47(*e*) is the pointer value that indicates the location within the RRF 90 of the data associated with the logical source2 register for uop0 of the current set; this bus is input to mux 411. Line 47(*f*) is the pointer value that indicates the location within the RRF 90 of the data associated with the logical source2 register for uop1 of the current set; this bus is input to mux 413. These buses are generated by the retirement override circuit 50 once the four input logical register source2 values are known (e.g., lines 41(*e*)–41(*h*)). It is appreciated that for a given logical register, its location (e.g., offset) within the RRF 90 is always constant. Therefore, the circuitry to generate the pointers over buses 47(*e*) to 47(*h*) needs only to output the proper pointer value to index the RRF 90 based on the given source1 values (buses 41(*e*)–41(*h*)) for each uop of the set.

Refer still to FIG. 4B. Input to each of the select line inputs of the multiplexers 411, 413, 415, and 417 are lines 62(*e*)–62(*h*), respectively. These are the match lines for each of the four retiring PDests against the physical source2 values. When asserted, each line indicates that the associated physical source2 value for a given uop is associated with a retiring PDest pointer. If this is the case, then the proper place to look for the data of the source2 is not from the physical register entry of the iRAT 45, but rather from the RRF 90 entry associated with that logical source1. For example, if line 62(*e*) is asserted, the output bus 51(*e*) will output the pointer value associated with bus 47(*e*) which is the pointer into the RRF 90 associated with the source2 of uop0, otherwise bus 51(*e*) will output the pointer of bus 46(*e*) which is the physical source register pointer of the iRAT 45 array associated with the logical source2 of uop0. Likewise, if line 62(*f*) is asserted, the output 51(*f*) will output the signal associated with bus 47(*f*) which is the pointer into the RRF 90 associated with the logical source2 of uop1, otherwise bus 51(*f*) will output the pointer of bus 46(*f*) which is the physical source pointer of the iRAT 45 array associated with the logical source2 of uop1. Therefore, the output buses 51(*e*)–51(*h*) indicate the true location of where the data is for each source operand of the logical source2 values of each uop of a given set of uops. These outputs 51(*e*)–51(*h*) are pointers that will be used to index the ROB 60 or the RRF 90 to locate the data for the source2 operand values of each uop.

Input to the CAM match logic 418 of FIG. 4B are four signal buses 61(*a*) to 61(*d*) (which are the same four signals as for FIG. 4A) that indicate the PDests of the four retiring uops. For instance, bus 61(*a*) indicates the retirement pointer of the PDest for the retiring uop0. Line 61(*b*) indicates the retirement pointer of the PDest for the retiring uop1. Line 61(*d*) indicates the retirement pointer of the PDest for the retiring uop3. The CAM match logic 418 compares the PDest pointers of the retiring uops against all physical register entries of the iRAT to determine if an entry (or entries) of the iRAT retired. Then the CAM match logic 418 determines if one of the retiring PDests is also used as a physical source by one of the uops of the current set within this clock cycle. If so, the source of data output by the retirement override logic 50 for the uop of the current set will be the RRF entry and not the ROB entry. In such way, the retirement overrides block 45 determines if any of the four physical sources2 associated with the current set of uops for a given cycle are associated with any of the retiring PDests of the retiring uops as indicated over bus 61. If this is the case then a match line is asserted for each source2 for each uop so that the retirement pointer to the RRF can be supplied instead of the PDest pointer to the ROB, as discussed above. It is noted that the CAM match logic 418 is executed during the first half clock cycle 207 (of FIG. 2) which is the "high" period. The CAM match logic 418 will be explained in detail to follow.

CAM Match Logic 418. The CAM match logic 418 is illustrated in more detail in FIG. 4C. The match logic 418 is implemented using standard CAM match techniques. FIG. 4C illustrates the logic required to match the four retirement PDest pointers supplied from the ROB over buses 61(*a*)–61(*d*) against the zero entry of the iRAT array 45. It is appreciated that the below logic is replicated within the present invention for every entry (0–11) of the iRAT array 45.

In order to perform the matching of all four retiring PDests (PDestRx, PDestRy, PDestRz, PDestRq) at the same instant, the following logic technique is utilized. Each bit of the 6 bit physical register pointer value 320 for entry zero of the iRAT is output over a separate line which are lines 420–425, respectively. Each line is fed to an XOR logic circuit which are numbered 430 to 435, respectively. Also fed to each of the XOR logic device are the corresponding bits for each retirement PDest pointer of buses 61(*a*)–61(*d*). For example, fed to XOR logic block 430 via bus 440 are the bits of bit position 0 of each retirement PDest pointer of buses 61(*a*)–61(*d*). Fed to XOR logic block 431 via bus 441 are the bits of bit position 1 of buses 61(*a*)–61(*d*). Lastly, fed to XOR logic 435 via bus 445 are the bits of bit position 5 for buses 61(*a*)–61(*d*). The match lines 495, 496, 497, and 498 (corresponding to uop0–uop3) are precharged high at the start of each clock cycle. If any bits of the signals from the retirement PDest pointer do not equal the corresponding bit supplied from the iRAT entry, then the corresponding match line for that uop is brought low. Logically, for XOR device 430, line 420 is XNOR'd with bit0 of line 61(*a*), PDestRx, and the result output over line 495, line 420 is XNOR'd with bit0 of line 61(*b*), PDestRy, and the result output over line 496, line 420 is XNOR'd with bit0 of line 61(*c*), PDestRz, and the result output over line 497, and line 420 is XNOR'd with bit0 of line 61(*d*), PDestRq, and the result output over line 498.

If line 495 is high then PDestRx matched with entry zero of the iRAT. If line 496 is high then PDestRy matched with entry zero of the iRAT. If line 497 is high then PDestRz matched with entry zero of the iRAT. If line 498 is high then PDestRq matched with entry zero of the iRAT. When line 438 is high then one of the above four PDests matched with entry zero of the iRAT array 45.

For example, if the zero bit position of bus 61(*a*) does not match bit zero of the zero entry (e.g., line 420) then line 495 is brought low. If the zero bit position of bus 61(*b*) does not match line 420 then line 496 is brought low. If the zero bit position of bus 61(*c*) does not match line 420 then line 497 is brought low. If the zero bit position of bus 61(*d*) does not match line 420 then line 498 is brought low. The same is true for each of the other XOR logic blocks except block 431 processes the bit 1 positions, block 432 processes the bit 2 positions, block 433 processes the bit 3 positions, block 434 processes the bit 4 positions and block 435 processes the bit 5 positions; each block operates simultaneously. Therefore, if any match line should be left asserted after each XOR logic block has processed, then that match line indicates a match between the physical register pointer of entry zero of the iRAT table 45 and the PDest value of a particular retiring uop.

If match line 495 is asserted, the match was with respect to the PDest (PDestRx) of retiring uop0 and the physical register of entry zero. If match line 496 is asserted, the match was with respect to the PDest (PDestRy) of retiring uop1 and the physical register of entry zero. If match line 497 is asserted, the match was with respect to the PDest (PDestRz) of retiring uop2 and the physical register of entry zero. Or, if match line 498 is asserted, the match was with respect to the PDest (PDestRq) of retiring uop3 and the physical register of entry zero. All the match lines (495–498) are fed to OR gate 439 and the output 438 signifies that a match occurred for the zero entry of the iRAT for one of the PDests of the four retiring uops. It is appreciated that the logic of FIG. 4C is replicated for each entry of the iRAT 45 so that each entry of the iRAT array 45 generates its own OR'd match signal signifying, when asserted, that a match for that particular entry occurred with one of the retiring PDest values of the retiring uops for a given cycle. For each replicated circuit for each entry, the difference is that the bits of each entry (of column 320) replace the input lines 420–425 of entry zero. Since there are 12 entries in the iRAT 45 of FIG. 3, there are twelve separate OR'd match signals generated by the present invention which individually indicate whether a particular entry's physical destination matched a retiring PDest pointer.

Refer to FIG. 4D which illustrates the generation of the signals used to supply the select lines of the mux devices of FIG. 4A and FIG. 4B which originate from the CAM match logic 418 of the present invention for entry zero of the iRAT array 45. The circuitry of FIG. 4D illustrates the logic required to route the OR'd match signal for a given iRAT entry (here line 438 for entry zero) to the appropriate mux of FIG. 4A and FIG. 4B. FIG. 4D illustrates the eight read decoders associated with entry 0 of the iRAT 45 table. These are the read enable decoders 460–463 for source1 and 470–473 for source2. For respective uops (uop0 to uop3) and for respective sources (source1 to source2) the eight decoder units will output a signal corresponding to which of the eight sources read entry zero of the iRAT for the current set of uops. The logical source pointers of the current set are input to the read decoders via lines 41(a)–41(h) as shown.

It is noted that this circuitry of FIG. 4D is replicated within the present invention for each entry of the iRAT 45 and the logic for entry zero is shown for illustration. Match signal 438, when asserted, indicates that the physical source pointer of entry zero of the iRAT column 320 matched one of the retiring PDests for the set of retiring uops. Read decoders 460 to 463 generate the read enables for uop0 to uop3 for source1 (e.g., if source1 of uop0–uop3 read entry 0) and input signals from buses 41(a) to 41(d) while read decoders 470 to 473 generate the read enables for uop0 to uop3 for source2 (e.g., if source2 of uop0–uop3 read entry 0) and input signals from buses 41(e) to 41(h). It is appreciated that all eight read decoders for a given entry could output a valid read signal simultaneously if each source of each uop of a given set read that entry. For instance, read enable signal RE3_1 means that it is the read signal for the zero entry, for the source1 value of the third uop of the current set. Signal RE2_2 is the read signal for the zero entry of the iRAT for the source2 of the uop2.

There are eight AND gates which AND the match signal 438 for a given entry of the iRAT with the read enables to indicate if a particular source for a particular uop was: (1) read by a uop of the current source; and (2) also associated with a retiring PDest. For illustration, AND gate 481 receives RE2_1 and also signal 438. If the output 62(b) of AND gate 481 goes high, then uop1 of the current set refers to a physical source pointer has source1 that just retired. Also, AND gate 492 receives RE2_2 and also signal 438. If the output 62(g) of AND gate 492 goes high, then uop2 of the current set refers to a physical source having an associated source2 that just retired within the current clock cycle. It is appreciated that the match line 438 is common to the zero entry of the iRAT and therefore is fed to all AND gates of the logic of FIG. 4D.

For any given entry of the iRAT only one AND gate for a given uop and for a given source can be asserted at any one time. It is appreciated that for each entry of the iRAT the AND gate outputs for a given uop and a given source are all OR'd together and this OR'd result makes up the signals over buses 62(a)–62(h). For instance, consider the signal over line 62(h), output from AND gate 493, which corresponds to the source2 of uop3 for entry zero. Each AND gate output for all of the entries of the iRAT (0–11) for source2 of uop3 are all OR'd together to create the result signal over line 62(h). Also, the output of the AND gate associated with source1 and uop2 for entry 1 of the iRAT (not shown in FIG. 4D) is OR'd with the output of the AND gate 481 which is for source1, uop2, for entry 0 of the iRAT. The same is true for all AND gates of FIG. 4D across all entries of the iRAT. Using the above circuitry, the present invention generates signals over lines 62(a)–62(h) as output to the mux devices of FIGS. 4A and 4B. The Table 3 below illustrates the meaning of these signals when asserted.

TABLE 3

| Signal | Meaning |
| --- | --- |
| 62(a) | uop0 source1 of the current set retired in this cycle |
| 62(b) | uop1 source1 of the current set retired in this cycle |
| 62(c) | uop2 source1 of the current set retired in this cycle |
| 62(d) | uop3 source1 of the current set retired in this cycle |
| 62(e) | uop0 source2 of the current set retired in this cycle |
| 62(f) | uop1 source2 of the current set retired in this cycle |
| 62(g) | uop2 source2 of the current set retired in this cycle |
| 62(h) | uop3 source2 of the current set retired in this cycle |

As stated above, the mux devices of FIG. 4A and FIG. 4B utilize the signals of Table 3 to determine which pointer value to forward over bus 51 for each of the eight possible source values. Either the physical register pointer to the ROB 60 (e.g., from iRAT) will be forwarded or the pointer to the RRF 90 will be forwarded. It is appreciated that there are alternative ways in which to achieve the above functionality with much different circuitry. It is appreciated further that the spirit and scope of the present invention is not limited by the above circuitry.

New PDest Overrides Block 55

Refer to FIG. 5A. The new PDest overrides block 55 of the present invention (shown by FIGS. 5A and 5B) handles the case where a logical source of a given uop of a set is also the logical destination of a previous (preceding) uop of the same given set of uops for the current cycle. The new PDest Override Block 55 is also called the N-wide bypass because physical sources output from the iRAT array 45 during the initial read operation may be bypassed, under direction of the present invention, by certain physical destination registers. The processing of the block 55 of the present invention takes place during the period 220 of the current clock cycle (as shown in FIG. 2). For instance consider the following set of uops:

|  |  | Log. src1 | Logical src2 | Logical dest |
| --- | --- | --- | --- | --- |
| uop0: add | eax, ebx | eax | ebx | eax |
| uop1: add | ecx, eax | ecx | eax | ecx |
| uop2: inc | ecx | ecx |  | ecx |
| uop3: mov | [memory], ecx | ecx |  | [memory] |

The logical source registers of the add operation of uop1 are ecx and eax, the logical destination of uop1 is the ecx register. However, the logical destination of uop0 is the eax register, which is also the logical source of the uop1 register. If the iRAT write operations into the iRAT and the iRAT read operations were done in sequence (e.g., one uop at a time), then the physical register value read from the iRAT table for the eax source register of uop1 would be the same value as the PDest value written into the iRAT (by the priority write operation) for the eax register of uop0; this is the desired result. However, since all of the physical source pointer values for each of the logical sources of a given set of operations are read from the iRAT at once, the physical register value initially read from the iRAT for the eax source of uop1 is not the PDest value assigned for the eax destination of uop0 because the table write operations do not occur until after the table read operations are complete for a given set of operations within the present invention.

Therefore, the new PDest overrides block 55 is provided within the present invention to allow a bypass operation when naming logical sources that to account for the above intra-cycle data dependencies between logical source registers of an operation and logical destination registers of a preceding operation. Using the bypass logic, the physical source register value output by the iRAT logic 10 for the eax source of uop1 will be that same PDest pointer assigned for the eax destination of uop0 which is supplied from the allocator 80 and written into the iRAT array 45 by the priority write logic (below). Similarly, the physical source register value supplied by logic 10 for source ecx of uop2 will be the PDest pointer assigned for the ecx destination of uop1 that is supplied by the allocator 80. It is appreciated that if there were no intra-cycle data dependencies between sources of uops and destinations of preceding uops then the new PDest overrides block 55 of the present invention would not be required. It is further appreciated that the PDest overrides block 55 of the present invention is also required because the operations of a given set are processed simultaneously and, with respect to a given set of uops, an iRAT read operation for a given uop will take place before the occurrence of a relevant iRAT write operation.

Refer to FIG. 5A which illustrates the logic of the PDest overrides block 55 of the present invention required to implement the bypass functions for the source1 values. In operation, the fetch and decode unit 40 generates four logical source1 values 41(a) to 41(d) which index the iRAT array 45. In response, the iRAT array 45 initially outputs four physical source registers over the four buses 46(a)–46(d), one for each logical source1 value. The retirement override block 50 then determines if one of these physical register values of 46(a)–46(d) is also a PDest that retires within the current clock cycle. In effect, the retirement override block 50 decides, for each logical source1, if the pointer given from the iRAT table should be used or if the pointer to the RRF 90 for that logical source1 should be used. Once decided, the retirement override block 50 outputs the proper pointer over buses 51(a)–51(d) for the logical source1 values of the uops (uop0 to uop3) of the current set. It is appreciated that the four logical destination registers for each uop of the set of uops are transmitted via bus 42 to the new PDest override block 55. Bus 42(a) carries the logical destination register for uop0, bus 42(b) for uop1, bus 42(c) for uop2 and bus 42(d) carries the logical destination register for uop3.

At about the same time of the initial read operation of the iRAT array 45 and of the processing of the retirement override block 50, the allocator block 80 examines the state of the physical registers within the ROB to determine which are available for use and allocates them for new use by the iRAT logic 10. After a uop has retired and its results written into the RRF 90 (and the appropriate RRF valid bit set within the iRAT array 45), the retired PDest associated with the retired uop will be free for further use by the ROB. The allocator 80 will generate a list of at least four PDest pointers that are vacant for the iRAT logic 10 to assign (by the table write operation) to the logical destination registers of the current set of uops. For sake of terminology, the PDest values output by the allocator for a given cycle are: PDesta; PDestb; PDestc; and PDestd for uop0, uop1, uop2 and uop3, respectively. The pointer value for PDesta is output over bus 520(a), for PDestb over bus 520(b) and for PDestc over bus 520(c) and for PDestd over line 520(d). The bus 520(d) is not utilized the new PDest override block 55 of the present invention.

The three mux devices 510, 515, and 525 of FIG. 5A create the bypass logic required for intra-cycle data dependencies such as the case shown above when a logical destination of one uop is used as a logical source of a subsequent uop within a given set of uops. The input pointer values 51(a)–51(d) will either point to registers in the ROB 60 or the RRF 90, as discussed above, for each uop of the set. The pointer value 51(a) supplied from block 50 is associated with uop0 and since there are no preceding uops to uop0 within a given set, that signal goes straight out of block 55 and becomes signal 56(a). In other words, there can be no intracycle data dependency for the first uop of a given set. Therefore, signal 56(a) represents the register pointer to a register that holds or will eventually hold the actual data for logical source1 for uop0 that will be used by the other portions of the microprocessor to execute and retire this uop. The next signal, signal 51(b), is fed to mux 510 which represents the register pointer for source1 for uop1 supplied by block 50. Signal over bus 51(b) is a pointer either to the ROB 60 or to the RRF 90. The value of pointer PDesta is also fed to mux 510 over bus 520(a). A select circuit 508 for controlling the selection lines for mux 510 receives both the logical source1 register value for uop1 (signal 41(b)) and also the logical destination register value for uop0 via bus 42(a). These registers are compared by a comparison circuit and if these register values match, then the select logic 508 causes the mux 510 to route the pointer value PDesta from bus 520(a) to bus 56(b), otherwise mux 510 routes the signal from bus 51(b) to bus 56(b). If the values match, then the logical source1 for the uop1 is the same as the logical destination of the uop0 and the value renamed for source1 should be the same as that assigned by the iRAT array 45 for the destination of uop0 which is the PDesta from the allocator 80. The terms match and equals as used above will be further described below.

The signal 51(c) from block 50 is the next signal for uop2 and is fed to mux 515 of FIG. 5A. This signal represents the register pointer associated with source1 for uop2 (a pointer either to the ROB or to the RRF). The PDesta and PDestb values are also fed to mux 515 over buses 520(a) and 520(b), respectively. A select circuit 513 for controlling mux 515 receives the logical source1 value for uop2 (signal 41(c)) and also receives the logical destination values for both uop0 and uop1 from bus 42(a) and 42(b), respectively. The selection logic 513 compares, simultaneously, the signal over bus 41(c) with both values over buses 42(a) and 42(b) via two separate comparison circuits. According to the select logic 513 for mux 515, if the logical source1 for uop2 (the signal over 41(c)) equals the logical destination for uop1 (bus 42(b)) then the signal for PDestb is output over bus 56(c) irrespective of the value of the logical destination of uop0. If the logical source1 for uop2 (bus 41(c)) equals the logical destination for uop0 (bus 42(a)) and the logical source1 for uop2 does not equal the logical destination for uop1 (bus 42(b)), then the signal for PDesta is output over bus 56(c). If neither of the above is true, then the signal from bus 51(c) from block 50 is output over bus 56(c). The circuitry for this select logic 513 for mux 515 may be devised from a number of well known techniques according to the above logical description.

The next signal, signal 51(d) of FIG. 5A, is fed to mux 525 from block 50 which represents the register pointer associated with source1 for uop3 (a pointer either to the ROB or to the RRF). The PDesta, PDestb, and PDestc values are also fed to mux 525 over buses 520(a), 520(b), and 520(c), respectively. A select circuit 523 for controlling mux 525 receives the logical source1 value for uop3 (signal 41(d)) and also receives the logical destination values for uop0, uop1, and uop2 over buses 42(a), 42(b), and 42(c), respectively. Comparison circuits of block 523 compare the register pointer of bus 41(d) to each of the signals over buses 42(a), 42(b), and 42(c) simultaneously. According to the select circuit 523 for mux 525, if the logical source for uop3 (bus 41(d)) equals the logical destination for uop2 then bus 56(d) outputs PDestc (line 520(c)) irrespective of the logical destinations of uop1 or uop0. If the signal over 41(d) equals the logical destination for uop1 and 41(d) does not equal the logical destination of uop2 and 41(d) does not equal the logical destination of uop0 then bus 56(d) outputs PDestb. If the signal over 41(d) equals the logical destination for uop0 and 41(d) does not equal either the logical destination for uop1 and 41(d) does not equal the logical destination for uop2 then bus 56(d) outputs PDesta. If none of the above is the case, the bus 56(d) outputs the signal over bus 5l(d) directly. The circuitry for this select logic 523 for mux 525 of the present invention may be devised from a number of well known techniques according to the above logical description. The outputs 56(a) to 56(d) are fed to the reservation station and represent the final renamed physical registers that have been assigned to each of the source1 values for the current uop set. When the uops are executed, the data to execute the uops will be obtained from these physical source registers as renamed.

Recall that each uop may contain two source registers; the above logic is for source1 and the below logic is for source2. FIG. 5B illustrates the new PDest override circuitry 55 of the present invention for the source2 registers for each uop of the current set. The allocator 80 outputs are the same as for FIG. 5A, the PDest values output by the allocator for a given cycle are: PDesta; PDestb; PDestc; and PDestd. The pointer for PDesta is output over bus 520(a), for PDestb over bus 520(b) and for PDestc over bus 520(c) and for PDestd over line 520(d); however line 520(d) is not used by block 55.

The three mux devices 511, 516, and 526 of FIG. 5B create the bypass logic required for intra-cycle data dependencies for the cases when a destination register of one uop of a given set is used as a source2 of a subsequent uop of the given set. The pointer value 51(e) supplied from block 50 points to the location where data is or will be stored corresponding to the source2 register of uop0 and since there are no uops previous to uop0 within a given set, that signal goes straight out of block 55 and becomes signal 56(e). Signal 56(e) represents the register pointer to the data associated with source2 for uop0 that will be used by the other portions of the microprocessor to execute and retire this uop. The next signal, signal 51(f), is fed to mux 511 and represents the register pointer associated with source2 for uop1 and is supplied by block 50. Signal 51(f) is a pointer either to the ROB or to the RRF. The PDesta pointer is also fed to mux 511 over bus 520(a). A select circuit 509 for controlling mux 511 receives the logical source2 value for uop1 (signal 41(f)) and also receives the logical destination value for uop0 via bus 42(a). A comparison circuit within 509 compares the signal over bus 42(a) to the signal over bus 41(f). If these values match, then the select logic 509 causes mux 511 to route the pointer value PDesta from bus 520(a) to bus 56(f), otherwise the mux 511 routes the signal from 51(f) to bus 56(f). If the values match, then the logical source2 for the uop1 is the same as the logical destination of the uop0 and the value output from block 55 for source2 should be the same as that assigned by the iRAT for the destination of uop0, which is PDesta.

The signal 51(g) from block 50 is fed to mux 516 of the present invention which represents the register pointer associated with source2 for uop2 and is a pointer either to the ROB or to the RRF. The PDesta and PDestb values are also fed to mux 516 over bus 520(a) and 520(b) respectively. A select circuit 514 for controlling mux 516 receives the logical source2 value for uop2 (signal 41(g)) and also receives the logical destination values for both uop0 and uop1 from bus 42(a) and 42(b), respectively. Select logic 514 contains a comparison circuit to compare bus 41(g) with 42(a) and another comparison circuit to compare bus 41(g) with 42(b). The above comparisons are done simultaneously. According to the select logic 514 for mux 516, if the logical source2 for uop2 (the signal over 41(g)) equals the logical destination for uop1 then the signal for PDestb is output over bus 56(g) irrespective of the logical destination of uop0. If the signal for 41(g) equals the logical destination for uop0 and the signal for 41(g) does not equal the logical destination for uop1, then the signal for PDesta is output over bus 56(g). If neither of the above is the case, then the signal from bus 51(g) from block 50 is output over bus 56(g). The circuitry for this select logic 514 for mux 516 may be devised from a number of well known techniques according to the logical discussion above.

The signal 51(h) is fed to mux 526 of FIG. 5B from block 50 and represents the register pointer associated with source2 for uop3 and is a pointer either to the ROB or to the RRF. The PDesta, PDestb, and PDestc values are also fed to mux 526 over bus 520(a), 520(b), and 520(c), respectively. A select circuit 524 for controlling mux 526 receives the logical source2 value for uop3 (signal 41(h)) and also receives the logical destination values for uop0, uop1, and uop2 over buses 42(a), 42(b), and 42(c), respectively. The select circuit 524 contains three comparison circuits to simultaneously compare bus 41(h) to bus 42(a), bus 41(h) to bus 42(b) and bus 41(h) to bus 42(c). According to the select circuit 524 for mux 526, if the logical source2 for uop3 (the signal over 41(h)) equals the logical destination for uop2 then bus 56(h) outputs the PDestc pointer (from bus 520(c)) irrespective of the logical destinations of uop 1 or uop0. If the signal over 41(h) equals the logical destination for uop1 and 41(h) does not equal the logical destination of uop2 and 41(h) does not equal the logical destination of uop0 then bus 56(h) outputs the PDestb pointer. If the signal over 41(h) equals the logical destination for uop0 and 41(h) does not equal either the logical destination for uop1 or the logical destination for uop2 then bus 56(h) outputs the PDesta pointer. If none of the above is the case, bus 56(h) outputs its signal from bus 51(h). The circuitry for this select logic 524 for mux 526 of the present invention may be devised from a number of well known techniques according to the above logical descriptions.

It is appreciated that within the select logic for the mux circuits of FIG. 5A and FIG. 5B the circuitry is configured such that a logical source such as ax will match a logical destination of the same register of a larger width, such as eax. That is, a logical source of smaller width will match a logical destination of larger width of the same logical register. Therefore al, ah, and ax as logical sources match to ax as a logical destination while al, ah, ax, and eax as logical sources match to eax as a logical destination. However, the reverse situation is not true. If a subsequent uop utilizes a source of a larger width register than a destination register of a preceding uop of the same set, a partial write RAT stall may occur. In addition, it is appreciated that an additional special matching condition on all source2's exists, in that regardless of the logical destination, a uop may also write the flags register. If source2 is the flags register, it must be overridden by a previous uop that writes flags which is signaled by a separate bus.

The following is an example of the bypass circuitry 55 of the present invention. Assume the allocator 80 generated PDesta, PDestb, PDestc, and PDestd. Assume also that no retirement overrides are implicated with respect to these sources.

|      |     |        | Src1 | Src2 | Dest |        |
|------|-----|--------|------|------|------|--------|
| uop0 | mov | ax, bx | bx   |      | ax   | PDesta |
| uop1 | add | ax, bx | ax   | bx   | ax   | PDestb |
| uop2 | add | ax, bx | ax   | bx   | ax   | PDestc |
| uop3 | add | ax, cx | ax   | cx   | ax   | PDestd |

The example above illustrates that PDesta is assigned for the destination of uop0, PDestb for the destination of uop1, PDestc for the destination of uop2, and PDestd for the destination of uop3 by the allocator 80. The source1, bx, for uop0 (bus 56(a)) will output the iRAT physical register pointer output by the iRAT for the bx entry because there are no previous uops to consider. The logical source1, ax, of uop1 (bus 56(b)) will not output the iRAT physical register pointer for the ax entry because the logical destination of uop0 is also ax. The logical source1, ax, of uop1 is assigned PDesta and bus 56(b) will output the PDesta value. The logical source2 of uop1 (bx), bus 56(f), outputs the physical register pointer of the iRAT corresponding to the bx entry because there are no previous bx logical destinations used by uop0.

The logical source1, ax, of uop2, bus 56(c), does not take the iRAT physical register pointer for the ax entry because uop1 has a destination ax. The value assigned for source1 ax of uop2 is PDestb and this value is over bus 56(c), not PDesta because the uop1 takes priority over uop0. The source2 of uop2 (bx), bus 56(g), outputs the physical register pointer of the iRAT corresponding to the bx entry because there are no preceding bx destinations used by uop0 or by uop1. Lastly, the source1 ax of uop3, bus 56(d), does not take the iRAT pointer for the ax entry because uop2 has a logical destination ax. The value assigned for source1, ax, of uop3 is PDestc not PDesta nor PDestb because the uop2 takes priority over uop0 and uop1. The source2 of uop3 (cx), output over bus 56(h), outputs the physical register pointer of the iRAT corresponding to the bx entry because there are no preceding bx logical destinations used by uop0, by uop 1 or uop2. The new PDest override block 55 output for the above example is presented below and represents the values that would be available over buses 56(a) through 56(h) as shown:

|      | Source1           | Source2           |
|------|-------------------|-------------------|
| uop0 | 56(a) = PDest of iRAT | 56(e) = n/a       |
| uop1 | 56(b) = PDesta    | 56(f) = PDest of iRAT |
| uop2 | 56(c) = PDestb    | 56(g) = PDest of iRAT |
| uop3 | 56(d) = PDestc    | 56(h) = PDest of iRAT |

It is appreciated that the output pointers 56(a) to 56(h) are sent to the ROB 60 and also to the reservation station 75. The uops of a given set are sent to the reservation station when the location of their respective source operands are known. Although the data for these source operands may not be ready as of the time these signals become asserted, at this time the location of where the data is to be placed will be known by the present invention. The assignments of the physical destinations for these registers will be discussed below with respect to the table write logic 65 of the present invention. Within the reservation station 75 the uops wait until their source data is ready and then the uops will be executed and eventually retired. When retired, the value of the destination PDest is returned from the ROB 60 to the retirement override logic and also the priority write block 65 (see FIG. 1) which will be used by a subsequent set of uops.

The above discussion is a complete discussion of the integer PDest override mechanism 55. Note, however, that a given uop set can be a mixture of both integer and floating point operations having integer and floating point registers. This does not pose a problem. It is quite naturally the case that only like-types of sources and destinations can override each other, e.g., integer to integer and floating point to floating point. For example, a floating point destination cannot override an integer source. Therefore, any difference in the floating point mechanism (as described below) can be processed independently of the integer PDest override mechanism 55.

Example Case. Consider the following uops of a current set presented to the iRAT logic 10 for a given cycle:

|       |                 |
|-------|-----------------|
| uop0: | mov eax to ecx  |
| uop1: | mov ecx to ebx  |

The below chart illustrates the state of the iRAT array before these two uops are processed:

|     | SZ | RRF | PSrc |
|-----|----|----|------|
| EAX | 11 | 0  | 21   |
| EBX | 11 | 0  | 18   |
| ECX | 11 | 1  | 02   |

The initial contents of the iRAT for entry EAX is PSrc 21 and for ECX is PSrc 02. The ID logical sources and destinations are presented in time to be latched on the rising edge of the clock at the start of the current clock cycle. The iRAT array outputs are pre-charged high during the first clock phase and the logical sources are presented to the iRAT array 45 input. On the second clock phase, the contents of the array are output, around the same time that the allocator physical destinations (PDesta=22 and PDestb=23) become available. Finally, the array outputs pass through the override logic 55 to determine intra-cycle dependencies. Uop0 is never overridden, as it is the first of the current uops. However, uop1 uses uop0's result (cx) as a source. Therefore, uop1's source for cx (PSrc 02) is overridden by the allocator PDst for uop0 (PDest 22). The renamed sources are available over buses 56(a) and 56(b) late in the clock cycle. The below chart illustrates the output of the new PDests override circuitry for the given source registers after these two uops are processed by the override and priority write logic of the present invention:

|     | SZ | RRF | PSrc |          |
|-----|----|----|------|----------|
| EAX | 11 | 0  | 21   |          |
| ECX | 11 | 0  | 22   | ;Override |

Priority Write Logic 65

The mechanism of the present invention that updates the entries of the iRAT array 45 is the priority write logic block 65. This functions during the second half of the clock cycle during period 230 (as shown in FIG. 2). This block 65 retrieves the PDests allocated by allocator 80 (PDesta, PDestb, PDestc, and PDestd) and will place all or some into the entries of the iRAT array 45 that correspond to the logical destination registers of the current set of uops.

The priority write logic 65 of the present invention is illustrated for entry 0 of the iRAT with reference to FIG. 6. The priority write logic performs the iRAT array update function by assigning allocated PDests to their appropriate entry within the iRAT corresponding to the appropriate logical destination register. Because of intra-cycle logical destination conflicts, the priority write logic must determine which allocated PDest to assign to which entry of the iRAT. Further, information regarding retiring operrands supplied from the ROB must also be updated into the iRAT so that appropriate entries of the iRAT point to the RRF 90 instead of the ROB 60. For write operations that target the same entry of the iRAT, the priority write logic adopts the following priority scheme from highest priority write to lowest priority: current uop3's physical destination, current uop2's physical destination, current uop1's physical destination, current uop0's physical destination and lastly, any of the retiring uops' PDests. FIG. 6 illustrates the portion of the priority write logic for a particular entry of the iRAT for clarity. It is appreciated that this logic is replicated for each separate entry of the iRAT.

The priority logic for the integer mechanism of the present invention deals with the problem of several uops having the same logical destination register. For example:

|      |     | LSource1 | LSource2 | LDest | PDest  |
|------|-----|----------|----------|-------|--------|
| uop0 | add | ax, bx   | ax       | bx    | ax     | PDesta |
| uop1 | add | ax, bx   | ax       | bx    | ax     | PDestb |
| uop2 | inc | ax       | ax       |       | ax     | PDestc |

As shown above, each uop has the register ax as the logical destination. A separate PDest pointer is assigned for each uop and they are located on the far right column. The write operations into the iRAT must occur simultaneously for all uops. Therefore, the priority write logic of the present invention must accomplish in parallel that which would have been accomplished if each destination was written sequentially. For instance, the iRAT logic 10 for each logical destination, must assign a PDest supplied from the allocator. This is the renaming (or writeback) process wherein logical destination array entries are written with physical destination registers of the ROB ("PDests"). However, if more than one uop within a set targets the same logical destination register, the entry in the iRAT for that logical destination register would receive more than one PDest writeback. Since the uops of a given set are supplied to the iRAT in sequential order, the last received uop (of program code order) has highest priority to write to the iRAT and should be the uop used for writeback to a particular logical destination if two or more uop conflict. Consider the example above, if processed sequentially, uop0 would rename the ax entry to PDesta, then uop1 would rename the ax entry to PDestb, and finally, uop2 would rename the entry to PDestc. The iRAT always points to the latest location for a given logical register. Thus, after the processing of the three uops above, the iRAT must have placed "PDestc" pointer into the iRAT array entry for the ax logical register.

The present invention priority write logic must perform the above in parallel therefore a priority scheme is adopted and used. For the integer case, the priority write logic is closely associated with the write decoders of the iRAT array 45 and may be considered, in effect, a part of the iRAT array 45. FIG. 6 illustrates the priority logic associated with the 0 entry of the iRAT. Input to the priority write logic are four pointers over buses 42(*a*)–42(*d*) which represent the logical destinations of the four uops of a given set for uop0–uop3, respectively. Each pointer is fed into a separate decoder 610(*a*)–610(*d*) respectively. The decoder is programmed to output an asserted signal if the input logical destination pointer matches the pointer associated with the logical register of the zero entry (which is eax, ax, and ah in this discussion). Since the processing for uops of a set is done simultaneously and since all four possible uops of the current set may each address the same logical destination register, there needs to be four separate decoders for each iRAT entry (610(*a*)–610(*d*)). Also input is the match signal 438 that was generated during the first half clock cycle of the iRAT process that correspond to entry zero of the iRAT and when asserted indicates that one of the retiring PDests matches entry zero.

The iRAT array is a multi-ported RAM having multiple write ports for each entry. The priority write logic will determine, for each entry, the proper source of data to route to the entry, if any. The write port logic for entry zero of the iRAT array is shown. Therefore, also supplied to the ports of each entry of the iRAT are the values of the allocated PDests that originate from the allocator 80 of the present invention. PDesta arrives over bus 520(*a*), PDestb over bus 520(*b*), PDestc over bus 520(*c*) and PDestd over bus 520(*d*). The RRF pointer value is generated from unit 628. As discussed, the priority logic will determine which PDest pointer will be loaded into the associated entry of the iRAT, if any.

Refer still to FIG. 6. Since uop3 is the last received uop of a given set, it has the highest priority write of the set. Therefore, if bus 42(*d*) (the logical destination for uop3) indicates entry zero for its write operation then decoder 610(*d*) will assert and the write port 630(*d*) for uop3 will open and PDestd will be written into the column 320 for the zero entry of the iRAT array 45. Only one of the four ports 610(*a*)–610(*d*) can be open for any given set at a time for any given entry. If uop3 has priority then all other write operations to entry zero of all other uops are overridden. If bus 42(*c*) (the logical destination for uop2) indicates entry zero for its write operation then decoder 610(*c*) will assert and this will cause port 630(*c*) to open only if the output of inverter 619 is high which means that decoder 610(*d*) is also not asserted; port 630(*c*) is open via the output of AND gate 624. When port 630(*c*) is open, the pointer PDestc will be loaded into the zero entry of the iRAT array. Therefore, the destination of uop2 takes priority only when the destination for uop3 is not asserted. If uop2 has priority then all other write operations to entry zero of uop0 and uop1 are overridden.

Refer still to FIG. 6. If bus 42(*b*) (the logical destination for uop1) indicates the zero entry then decoder 610(*b*) will become asserted. However, the port 630(*b*) will not open if either of uop3 or uop2 targeted the zero entry. The outputs of inverters 617 and 619 are fed into the AND gate 622 along with the decoder output from decoder 610(*b*). When port 630(*b*) opens, the pointer for PDestb is loaded into entry zero of the iRAT 45. This will happen only if bus 42(*b*) indicates entry zero and bus 42(*c*) and 42(*d*) do not. If uop1 has priority then a write operation to entry zero of uop0 will be overridden. If bus 42(*a*) (the logical destination for uop0) indicates the zero entry then decoder 610(*a*) will become asserted. However, the port 630(*a*) will not open if either of uop3, uop2, or uop1 targeted the zero entry. The outputs of inverter 617, 619 and 615 are fed into the AND gate 620 along with the decoder output from decoder 610(*a*). Port 630(*a*) will open to load the zero entry of the iRAT with PDesta pointer only if uop0 is the only uop to target entry zero of the iRAT with its logical destination. Uop0 does not override any other uop write operation.

RRF Valid Bit Update. The priority write logic 65 of the present invention also updates the entries of the iRAT array 45 to indicate that data associated with certain entries of the iRAT array retired and the data is therefore available in the RRF 90 and not in the ROB 60. The iRAT array 45 indicates the latest location of data associated with the logical register set, therefore, it is important that the iRAT array 45 be updated in order to indicate that certain data related to the logical registers is located in the RRF 90 and no longer located in the ROB 60. This is the case because when an operation retires, the data associated with its physical destination register is loaded into the RRF 90 and becomes architecturally visible.

During a current cycle, when a physical destination register retires, and a match is found for that physical destination register within the iRAT array 45, a match signal 438 is generated for the entry that matched the retiring physical destination register. Provided no other uop is writing to that matched entry during the current cycle (e.g., during the priority write logic), the match entry's RRF valid bit 324 is set to indicate that the data for the logical destination register associated with the match entry is located in the RRF 90. Also, the match entry is updated with the appropriate RRF pointer. This process is explained below with reference to an exemplary entry, entry zero, of the iRAT array 45. However, it is appreciated that the process and logic of the present invention takes place for all pertinent entries of the iRAT array 45.

For example, if none of the uops of the given set target entry zero of the iRAT, then the retirement reset circuit may reset the entry if that entry retired; this is the last priority. The signal 438 was generated at the first half of the iRAT clock cycle and it indicates that one of the uops that retired during this clock cycle contained a destination operand (PDest) that matched the PDest of the zero entry. In such a case, the zero entry must be reset to indicate that the data for the zero entry is now located in the RRF and not in the ROB. However, this reset function is only allowed assuming another uop of the given set does not use a logical destination that targets the zero entry of the iRAT. The AND gate 626 receives input from inverters 614, 615, 617, and 619. When all of these inputs are high then no uop of the given set has a logical destination register that targets the zero entry of the iRAT (e.g., eax, ax, and ah). If line 438 is also asserted, then the RRF pointer register 628 will output a pointer indicating the location of the eax register for the RRF 90. This pointer is then loaded into the iRAT zero entry at column 320. Also, the RRF valid bit 324 for the zero entry is set to indicate the data for entry zero is now located in the RRF 90 and not the ROB 60. It is appreciated that an RRF valid bit for a particular entry of the iRAT will only be set if the PDest associated with that entry also is a retiring PDest within the same clock cycle. Therefore, the priority write logic sets each RRF valid bit for each retiring PDest located in an iRAT array entry, as long as that entry is not currently being written to by the other logic of the priority write function for the current uop set.

It is appreciated that after a particular PDest from the allocator 80 has been assigned to a logical register and written into the entry of the iRAT corresponding to that logical register, the logical register designation for which the physical register corresponds is also forwarded to the ROB 60 and is written into a ROB entry associated with the PDest. This is done so that at retirement the PDest entry will know which register of the RRF 90 to update.

Although shown for entry zero, the logic of FIG. 6 is replicated for each and every entry of the iRAT array 45. As discussed above there are 12 separate entries in the sample iRAT array 45. Also as discussed above, there are 12 unique match lines generated for the iRAT array, one for each entry. Each entry of the iRAT contains four separate write decoder blocks. Each match line of each entry and the outputs of the decoders for each entry are fed to the write priority logic for each iRAT entry. The values for PDesta over line 520(*a*), PDestb over line 520(*b*), PDestc over line 520(*c*), and PDestd over line 520(*d*) are common to all of the priority write logic blocks for each iRAT entry. Since each iRAT entry has five write ports they will individually allow any of the four PDests or the reset value to be written into them according to the outcome of the priority logic of the associated entry. The present invention will utilize the above logic to perform four priority write operations into the iRAT array simultaneously during the clock cycle time allotted.

In an alternative embodiment of the present invention, a CAM match of the retiring PDest against all entries of the iRAT array may be avoided. In such an embodiment, the retiring PDests (in the ROB) each contain a designation of the logical register that was renamed to the PDest. This embodiment of the present invention only checks the entries of the iRAT associated with the logical registers of the retiring PDests in order to locate a matching entry and generate an entry match signal. In this way, the entire iRAT array 45 does not have to be compared wholesale in order to determine if a retiring PDest is present. Only the logical registers of the retiring PDests are compared in order to locate a matching entry.

Allocator 80 Stalls. If the reservation station 75 or the ROB 60 are full, the allocator 80 will be unable to provide enough PDests to satisfy the current set of uops. When this table overflow condition occurs, the allocator 80 must stall the iRAT logic 10 until the ROB or reservation station releases the required set of resources. This stall will cause the iRAT logic 10 to clear all current uops' outgoing valid bits and cease the acceptance of new uops from the fetch and decode unit 50. While a uop's valid bit is reset, the iRAT logic 10 will not process the uop. When the valid bits are cleared for the current set of uops, then their iRAT processing still cease. When enough uops retire to allow the allocator 80 to allocate enough PDests, the stall is released. The uop valid bits are restored and the in-order uop issue continues.

Integer Recovery from Misprediction. When the front end of the microprocessor discovers that the branch target buffer mispredicted a program pathway, the microprocessor generates a clear signal which informs the iRAT logic 10 that any speculative data it processed must be discarded. Upon receiving the clear signal, the iRAT logic 10 ceases from actively processing the uops associated with the speculative program code. The microprocessor then allows all instructions along the proper pathway to retire in order to update the RRF array 90. In other words, all instructions previous to the mispredicted branch instruction are allowed to retire in order to update the RRF array 90. Once the RRF array 90 is updated with all properly retired instructions, the iRAT logic 10 is instructed to point to the RRF for all integer entries. In an alternative embodiment, the iRAT logic 10 then copies the data of the RRF array 90 into the corresponding entries of the iRAT array 45. After the RRF array 90 entries are copied into the iRAT array 45, for the alternative embodiment, the present invention sets all RRF valid bits of the iRAT array 45 to designate the RRF array entries as the data locations for all integer registers. The microprocessor then begins reading and decoding instructions along the proper program pathway and the iRAT logic 10 again operates normally to rename the logical integer registers to physical integer registers. By copying the RRF data into the iRAT array, the present invention is able to effectively purge the speculative data from the iRAT array 45.

Retirement Updating. When an operation retires within the present invention, several functions are performed when the contents of the retiring operation are made architecturally visible (e.g., loaded into the RRF 90) which impact the iRAT array 45. The overall processes to perform the above functions involve participation from the retirement override logic 50 and the priority write logic 65, as well as other functional blocks of the present invention. The functions of the present invention that perform the above retirement functions for integer registers are described below. Although described in pertinent parts elsewhere, the following description illustrates the interaction between the blocks of the present invention that perform functions related to retirement and updating of the iRAT array 45 and RRF 90.

When the checking logic the microprocessor determines that the branch prediction logic of the microprocessor selected the correct program section, an operation within that program section may retire once all of its data has been properly computed or determined and the operation is otherwise in condition for retirement. That is, once the physical source registers of the operation are available and the operation has been executed by the execution units, and the data has been placed into the assigned physical destination register, the operation is ready to retire, along with its physical destination register. At retirement, the operation's physical destination register is loaded into the RRF 90 at an entry corresponding to the pertinent renamed logical destination register. Once the data is placed into the RRF 90, it becomes architecturally visible. Data located in the physical registers of the ROB 60 are not architecturally visible because this data is speculative until retired. The data within the ROB 60 is used internally by the microprocessor, but it is not reported externally (via loading into the RRF 90) until the data retires.

Before an operation is executed and retired, it must be dispatched from the iRAT logic 10. It is appreciated that before an operation retires, the present invention utilizes the iRAT array to assign the operation's logical sources with physical sources and to assign the operation's logical destination with a physical destination. The operation is then placed into the reservation station for eventual execution. Once the operation is placed into the reservation station it has been "dispatched" but not yet executed.

However, there are situations in which subsequent to the dispatch of an operation and its associated physical destination register, the logical destination register of the iRAT that is associated with the above physical destination register may be reassigned by the iRAT (by subsequent speculative operations) before the physical destination register retires. For instance, assume operation1 is dispatched with physical destination register1 and is associated with logical destination register, ax. At some point later, before operation1 retires, a subsequent speculative operation, operation2, also targets the ax register and is dispatched. According to the procedures of the present invention, the iRAT logic 10 will assign the ax entry of the iRAT array 45 with a new physical destination register, say physical destination register2. During the cycle when operation1 retires, the present invention will perform a CAM match of the iRAT array 45 with the value of the physical destination register1 and since this value was overwritten by operation2, the CAM match will not find anything in the iRAT array 45. In this case, the subsequent and speculative program code (e.g., operation2 and operations following) did not need the results of the operation1 because its retiring physical destination register1 was no longer present in the iRAT array 45. However, the data associated with operation1 is still written into the RRF 90.

In this example, it is appreciated that subsequent uses of the logical register, ax, by the program code as a source will obtain the data not from the RRF 90, but from the newly assigned physical register2 since this is the latest rename of the ax logical register. Since the operation2 has not yet retired, it is speculative. If it is determined that operation2 is part of a mispredicted branch, the RAT array 45 will reset its entry for logical register, ax, to point to the RRF 90 because the current value of physical register2 contains invalid (mispredicted) data.

However, if the CAM match of the retiring physical destination register1 against the entries of the iRAT array 45 of the present invention determines that the retiring physical destination register1 is present within the iRAT array 45 at a particular entry (in this example the entry associated with the ax logical register), then the signal 438 for that matching iRAT array entry will be asserted by the present invention. This will cause the priority write logic 65 of the present invention to set the RRF valid bit of the particular entry (ax) and also load the value of the RRF associated with the ax logical register into the particular entry of the iRAT array 45. The present invention will set the RRF valid bit 324 for the particular entry (ax) of the array only if another PDest value of the current uop set is not being concurrently loaded into that particular entry by the priority write logic 65. That is to say, the RRF bit is set only if the entry is not being concurrently assigned to a new physical destination register supplied from the allocator 80.

The sequence followed by the present invention for setting the RRF valid bits 324 is illustrated in FIG. 7A. This sequence is done for each current set of uops for each given cycle. The procedure starts at block 1500 and continues to block 1510 where a set of retiring physical destination registers (PDests) pointers are received from the reorder buffer over bus 61 (of FIG. 1). The retiring physical destination registers pointers are received into a storage buffer at block 1510. This storage buffer may be implemented as set of four registers to hold the retiring physical destination register pointers. At block 1515 the CAM match function of each of the retiring PDest pointers ("PDests") is performed against the entries of the iRAT array 45. If there is a match for a particular entry, x, of the iRAT array 45 and a particular retiring PDest at block 1520 then at block 1530 the present invention updates the RRF valid bit for the matching entry x of the iRAT array to point to the RRF 90 and not the ROB 60, provided no other uop of the current set writes to entry x. Also, the present invention writes the RRF pointer into the matching entry to indicate the proper logical register. If another uop of the current set writes a newly allocated PDest to entry x, then the RRF valid bit will remain pointing to the ROB 60 because the newly allocated PDest resides in the ROB. By way of exemplary convention, bit state "0" indicates the ROB 60 and bit state "1" indicates the RRF 90, however these states could be reversed. Assuming no uop of the current set writes to entry x, the RRF valid bit for entry x is set to indicate that the data for the logical register associated with entry x must be found in the RRF 90 and not in the ROB 60 (where the PDests are located). If a match is not found at block 1520 then block 1535 is entered.

At block 1535 the present invention checks that each entry of the iRAT array 45 has been compared to each PDest value and returns to block 1515 if not. Block 1540 indicates that if no match was found for a particular PDest against the iRAT array 45, then no update is made to the RRF valid bits 324 of the iRAT array for that PDest. Each retiring PDest pointer points to a physical register within the ROB 60. At block 1545 the present invention loads the data values of the ROB 60 entries that are indicated by the retiring PDest pointers into their respective locations in the RRF 90 according to the logical registers that were assigned to the retiring PDest pointers. Any of a number of well known procedures may be utilized to load the data associated with the PDests into the RRF 90. At block 1550, the procedure of the present invention returns to process the next retiring PDests of the next cycle.

Since the present invention must search the iRAT array 45 for each retiring physical destination register before updating any of the RRF valid bits 324, the present invention updates the RRF valid bit 324 for a given entry of the iRAT array 45 only if that entry contains the retiring physical destination register value at the time of retirement. That is to say, the present invention only updates the RRF valid bit 324 for a given iRAT entry provided that, at retirement of a given physical destination register, that entry had not been reassigned to a new physical destination register prior to the retirement of the given physical destination register. However, if the entry was not assigned to a new physical destination register (either in a subsequent cycle or the current cycle), then the present invention indicates within the iRAT array 45 that the data associated with the particular entry can be found in the RRF and not in the ROB; this is done by setting the RRF valid bit 324 of the particular array and loading the RRF offset into the iRAT array instead of the ROB offset value (e.g., the physical destination register).

It is appreciated that the above discussion, for clarity, refers to the PDest values that are compared to the iRAT array 45 as "registers." However, in the present invention, the PDest values that are compared to the iRAT array are the pointer values into the ROB 60 where the actual registers are located. In this sense, the PDests, as described above, are register pointers (e.g., offsets into the ROB). One of ordinary skill in the art would acknowledge that a PDest, when discussed in the context above, refers to its offset value into the ROB and as such is a pointer into the physical registers of the ROB.

iRAT Summary of Operation. The major processing tasks 700 of the present invention iRAT logic 10 is illustrated in the flow chart of FIG. 7B and is summarized with respect to a current clock cycle and current set of uops. The start of the current clock cycle is at block 705. At the start of the first half clock cycle four uops of a current set are presented to the iRAT array from the instruction fetch and decode unit 40 at block 710. Also during block 710 four logical destination registers are supplied to the iRAT logic 10. The eight logical sources are used to initially read the entries of the iRAT array 45 and eight physical source registers are output from the array in response according to block 715. At block 720, early in the current clock cycle, the ROB 60 supplies a list of the PDests associated with the retiring set of uops. Still during the first half clock cycle, the retirement override logic 50 is performed at blocks 725 and 730. The iRAT logic compares the four retiring PDests associated with a retiring set of uops, that retires within the current clock cycle, against the physical register entries of the iRAT at block 725. For each match to a physical entry, the present invention iRAT logic then compares if this matched entry was also read by the set of uops during the initial read operation. If a matched entry was also read by a given uop and source value, then the present invention outputs the reset value of the corresponding iRAT array entry, instead of the iRAT physical source entry; this occurs at block 730. At this point there are eight output buses and each bus carries a pointer associated with each logical source register of the current uop set. Individual output buses, 51(a)–51(h), either indicate a register location within the ROB or within the RRF for each logical source of the current uop set.

Referring still to FIG. 7B, the output buses, 51(a)–51(h), are then fed the new PDest override logic 55 which functions during the second half of the current clock cycle during the same time as a portion of the priority write logic (described below). The new PDest override logic is represented by blocks 740 and 750. The second half of the current clock cycle begins at the start of block 740. The new PDest override logic 55 examines the logical sources for uop1–uop3 and compares them against the logical destinations for uops that came previously in order within the given uop set at block 740. The new PDest override logic also receives a list of the new PDest pointers supplied by the allocator 80 from block 735. If a match is found between a logical source value and an earlier logical destination then there is an intra-cycle data dependency; the new PDest override logic will output one of the newly received PDest values for the matched logical source register instead of outputting the pointer that was received from bus 51; this occurs at block 740 using the PDest data from block 735. The new PDest override logic outputs eight individual buses over 56(a)–56(h). These signals are fed to the ROB and also to the reservation station and indicate the true locations within the ROB or the RRF where the data will be placed for each renamed logical source of the current set.

Also during the second half of the current clock cycle, the priority read logic 65 is performed during blocks 755 and 760. The priority write logic 65 receives four PDests from the allocator 80 for writing into the iRAT array for the four logical destination registers of the current set; there is one PDest for each logical register. The priority write logic examines the four logical destinations of the current set to determine if there are logical destination conflicts between uops. The highest priority (e.g., the last in order) will write its PDest into the logical register entry of the iRAT; this is performed by block 755. If there are not intra-cycle logical destination conflicts then all four PDests will be written into different locations of the iRAT. For a particular iRAT entry, if no logical source writes to the location by block 755 and the physical register pointer within that location also retired, then the present invention sets the RRF valid bit and points to the RRF 90 for that entry; this is done by block 760. The information corresponding each PDest to a particular logical destination of a uop is then transferred to the ROB 60 and reservation station 75 as well as the renamed source information at the end of the clock cycle; this is done by block 765. It is appreciated for each used physical register of the ROB 60 the corresponding logical register represented by the physical register is also recorded for retirement use.

When the source data required to execute a particular uop is present within the identified physical register sources, the uop may be executed by execution units of the microprocessor. When complete, the data will be placed in the physical destination registers associated with the uop. The ROB, for each physical destination register, contains an entry corresponding to the logical register represented by the physical destination register. The microprocessor then stores the data of the physical destination register into its proper place within the RRF at the logical register designation. Then the uop is retired and forwarded, among other places, the iRAT logic 10 where the retirement override and priority write logic utilize the retirement data. If the PDest of the retiring register is still present in the iRAT, then its RRF valid bit will be set so that subsequent uops will access the RRF for the data.

At block 770 of FIG. 7B, a new clock cycle bring new uops for processing from the instruction fetch and decode unit 40 and also a new set of retiring uops. The process 700 is then repeated by returning to block 710. It is appreciated that if the allocator 80 does not have enough free PDests, block 735 may cause process 700 of the present invention to stall. It is appreciated that within any given cycle the microprocessor may generate a clear signal indicating a branch misprediction. According to the above flow, when the clear signal is detected the present invention waits until all instructions previous to the mispredicted branch retire. The contents of the RRF 90 are copied into the iRAT array 45 and all RRF valid bits of the iRAT array are set to designate the RRF 90.

Maximum Uops of the Current Set. As discussed above, the maximum number of uops processed by the iRAT logic of the present invention for a given clock cycle is four However, according to the description and circuitry as described above, the present invention may be implemented in an embodiment that processes a maximum of three uops for a given set. Such an embodiment would allow a reduction in the amount of logic required to realize the iRAT logic 10. Similar embodiments of the present invention may be realized according to this disclosure for executing a maximum of two uops within a current set. The disclosure of the present invention may be extended to cover embodiments where more than four uops may be executed within a given clock cycle. Specifically, one skilled in the art can extend the logic disclosed herein to realize an embodiment of the present invention that may process a maximum of five or more uops per clock cycle. All such embodiments are considered within the scope and spirit of the present invention.

II. Floating Point Register Alias Table

The present invention RAT logic also includes a separate RAT array and associated logic 895 as shown in FIG. 8A for floating point register renaming. This logic is called the fRAT logic 895. However, since the floating point unit of the macroarchitecture utilized within the present invention is a stack referenced system, added complexities are introduced into the present invention design for the floating point embodiment. It is appreciated that the major processing flow, including priority write 865, retirement override 850 and new PDest override 856, of the floating point RAT logic 895 ("fRAT logic") of the present invention are analogous to the iRAT logic 10 as described above. However, instead of processing integer registers the fRAT logic processes floating point registers. It is appreciated that while the individual units of the floating point logic 895 of FIG. 8B and the iRAT logic 10 of FIG. 1 while illustrated separately for reference may be considered as separate functional blocks (integer/ floating point) of the same functional unit. For example, the retirement override block (50 and 850) may be considered as one single unit that embodies the functionality of processing both integer logical registers (e.g., block 50) and floating point logical registers (e.g., block 850).

Therefore, where appropriate, reference will be made to functions already described above, such as retirement override, new PDest override, and priority write, which according to the fRAT logic 895 of FIG. 8A are similar in structure and function to the iRAT logic 10 functions. However, where these two RAT designs are dissimilar, unique aspects of the fRAT embodiment of the present invention will be fully detailed for a clear and precise understanding of the present invention. It is appreciated that if the details of a particular function or method are not specifically discussed herein with respect to the fRAT embodiment, then that function and/or method is implemented within the present invention in an analogous fashion utilizing analogous structure to the similar function and/or method of the iRAT embodiment as discussed above.

The floating point registers of the present invention do not have partial widths or variable sizes per register. Each register is a constant 86 bits. While this condition may simplify certain design aspects of the present invention, a complicating factor is that floating point registers are stack based. Each register is addressed (referenced) based on an offset from a top of stack (TOS) pointer, such as TOS+1, TOS+2, etc. rather than having a fixed reference name such as eax, bx, or edx. Another complicating factor is the floating point register exchange instruction, FXCH, which will be discussed further below. According to the present invention, there are eight registers within the logical register set of the Intel macroarchitecture that will require renaming, for similar reasons as discussed with reference to the iRAT (e.g., to remove false data dependencies from program code to allow more efficient parallel execution of instructions); these are called ST0–ST7 where ST0 refers to the zero offset from the current value of the TOS, which may change for each uop. As with the iRAT logic 10, the ROB 60 contains 64 physical registers of 86 bits each that may contain floating point register data. As to terminology, floating point registers used in the original assembly code are called logical floating pointer registers and renamed registers that are pointers into the ROB 60 are called physical floating point registers.

Refer to FIG. 8B which illustrates the fRAT array 800 and an additional array called the retirement floating point array 802 ("rfRAT") of the present invention that are shown in FIG. 8A. The rfRAT array 802 of the present invention is used to account for changes in the floating point register ordering of the RRF 90 that are caused by retiring FXCH instruction as implemented by the present invention. The fRAT array 800 contains eight entries designated 810–817, one for each logical floating point register of the Intel macroarchitecture and they having absolute addresses of 0 to 7. The fRAT array 800 maintains a register ordering based on speculative FXCH operations. The second column 806 is the RRF valid bit for each entry and, like the iRAT array 45, will indicate if the data for a given logical register is located in the ROB 60 or in the RRF 90. The third column 808 of the fRAT array contains the pointer into the ROB 60 to the physical floating point register that has been assigned to the logical register for each entry which is similar to the iRAT embodiment. Each entry of the second column 808 is 6 bits wide. The first column 805 for each entry is the data valid bit (or stack valid bit) which indicates if valid data has been placed onto the stack of registers. If an operation pushes data onto the stack to an entry having the stack valid bit set then a floating point stack overflow error will occur. If an operation attempts to read data from an entry not having the data valid bit set then a floating point stack underflow occurs. The data valid bit is set for an entry when data is pushed onto the stack into the entry and reset when data is popped off the stack from the entry. The fRAT also may simultaneously set all eight data (stack) valid bits to any desired value which is an ability mainly used when loading or storing the whole floating point machine state.

The fTOS 820 is a register that holds the current value of the top of stack pointer for the fRAT array 800. In order to address a register, the present invention will read the fTOS value 820, add the appropriate offset to the logical sources and destinations, and then read (or write) into the fRAT array 800. Therefore, the designation ST1, means the register pointed to by the current fTOS value 820 and offset by 1 address. It is appreciated that the addressing scheme of the present invention stack based registers wraps around from entry 817 back to 810. It is also appreciated that the fTOS index points to a stack entry having valid data, therefore any push instruction onto the stack to ST0 first updates the fTOS value by decrementing one and then places the data into the updated entry. A pop instruction from ST0 first reads the register pointed by fTOS then increments the fTOS value 820.

With reference to the fTOS array 800 of FIG. 8B, the fRAT array 800 is updated as the set of instructions are processed by the fRAT logic when renaming occurs. Therefore speculative FXCH operations may affect the register ordering of the fRAT array 800. However, the entries of the rfRAT array 802 are only updated upon retirement of the floating point uops. Therefore, the fRAT array 800 may be viewed as an array that holds information associated with speculative execution of certain uops while the rfRAT array 802 hold information regarding register renaming associated with only nonspeculative execution. Recall that only nonspeculative uops are allowed to retire and become committed to architecturally visible state by the microprocessor. Therefore, the rfRAT entries point only to the RRF 90 and not the ROB and since the rfRAT is not updated based on speculative FXCH operations, the rfRAT maintains a retirement register ordering of the floating point registers of the RRF 90.

The rfRAT array 802 contains eight entries, 830–837, and two columns 845 and 850 for non-speculative register information; the rfRAT array 802 of the present invention may not be altered as a result of an operation that remains speculative. The rfRAT array 802 is only updated based on retired floating point operations. A retired operation, as discussed above, is an operation that the checking unit of the microprocessor determines to belong to a properly predicted program branch and further that has been fully processed by the microprocessor in that the result of the retiring operation are ready to update the RRF 90. Regarding a register exchange operation, the rfRAT array is only updated based on retiring (e.g., nonspeculative) register exchange operations. Other retiring floating point operations (e.g., that may alter the stack pointer) may also update the rfRAT. It is important to realize that speculative FXCH operations may not update the rfRAT array 802. The first column 845 contains the stack valid bits for the rfRAT array and the second column 850 contains the offset pointer into the RRF 90 offset from the top of the FP stack bank in the RRF 90. For each entry the stack valid bit is a 1-bit field and the pointers in column 850 are 3-bits wide since they point into the RRF 90 and not the ROB 60. The bit field sizes given are exemplary only and may be altered (e.g., extended or reduced) within the scope of the present invention. The rfTOS 839 contains the non-speculative top of stack value for the rfRAT array 802. Each of the above values are updated as floating point uops retire. The above values of the rfRAT array 802 perform analogous functions as of the fRAT array 800. One reason the rfRAT array 802 is included within the present invention fRAT logic is a direct result of the manner in which the present invention implements the FXCH instruction.

Refer to FIG. 8C which illustrates a typical section of the ROB 60 used by both the iRAT logic 10 and the fRAT logic. Several entries of the ROB 60 are shown from 905*a* through 905*z*. For each entry there are four fields and an address index. The PDest field 910 is the address of the entry and as such is not a data field at all. The LDest field 920 is a multi-bit field and indicates the value of the logical register that is represented by the particular PDest entry. For the integer embodiment this value will be a designator for eax, ebx, ecx, etc., and for floating point iRAT logic this value will represent the absolute address of the fRAT array 800 of which the associated PDest was assigned. The LSource field 930 is a multi-bit field and is used to indicate an alternative fRAT entry which is used in the FXCH operations which will be described below. The FXCH field 940 is a 1-bit field and indicates if the associated PDest value is associated with an FXCH uop. Lastly, the data field 950 is a 86-bit field that holds the data for the entry.

Note that the rfRAT array 802 is needed for the floating point RAT design but not for the iRAT because the ordering of the integer registers within the RRF 90 is never altered because there is not a register exchange operation for integer registers that is implemented like the FXCH operation. For instance, the iRAT knows that if EAX currently resides in the RRF and not the ROB, then the EAX data can be found in the EAX register of the RRF at a known, invariant location. The fRAT cannot do this because the floating point registers could have been exchanged (by FXCH) which permanently changes where in the architecturally visible floating point stack one would find a given floating point register, for instance, the TOS+1 register. Hence, there is a copy of the fRAT array (rfRAT array) that is altered only when a floating point uop retires. This rfRAT is copied wholesale into the fRAT upon branch misprediction. This will be expanded on below. The functional operation of the ROB 60 with the fRAT array 800 and the rfRAT array 802 is disclosed below.

The fRAT Table Initial Read. The fRAT logic of FIG. 8A receives logical source addresses that are relative to the current top-of-stack and translates these relative logical addresses to absolute logical addresses in order to index the fRAT array and output the proper physical source register pointer. This translation process is done by adding the relative address to the current fTOS 820 pointer address for each stack referenced register to obtain an absolute address used to index the fRAT array 800. However, because the floating point register file is stack based, each floating point uop of a current set must use the most recent top-of-stack information based on any changes made to the fTOS 820 by previous uops in past sets and based on any changes made to the fTOS 820 by uops in the current set in order to index the proper source addresses within the fRAT array 800. The fRAT logic receives a fTOS 820 value at the beginning of a clock cycle and adjusts it for each uop in a given set to reflect any TOS changes by previous, but concurrent, uops within the given set and saves the final adjusted fTOS value 820 for the next uop set of the next cycle.

During the initial fRAT array 800 table read operation, the stack mechanism of the present invention does a pre-decrement push and a post-increment pop. Every FP uop carries a field of information that tells the RAT how to check for stack validity. In the event that the fRAT logic attempts to write a valid entry which microcode has instructed should be an invalid entry, or in the event that the fRAT logic attempts to read an invalid entry presumed to by the microcode to the valid, the appropriate fRAT overflow or underflow signals will be asserted by block 70 (of FIG. 1) for the uop. This will cause a machine exception. Data valid bits are written in the fRAT upon uop issue (e.g., upon processing by the fRAT logic).

The fRAT array 800 is a multiported RAM and each entry may be addressed by one of eight separate ports, one for each possible logical source of the current set, analogous to the integer embodiment. However, because the fTOS may be altered by uops within the current set, the initial table read of the floating point embodiment is more complex. The output of the initial fRAT array read operation is a set of PSources corresponding to the logical source registers input by the current uop set. The following is an example of a current set of uops and of the initial fRAT array 800 read operation:

|  |  | FP PSources |
|---|---|---|
| uop0 | push |  |
| uop1 | push |  |
| uop2 | fadd st0, st1 | entry 4, entry 5 |
| uop3 | pop | entry 4 |

The first push decrements the fTOS 820 and places data into ST0, the second push decrements the fTOS 820 and places data into the ST0, the third operation adds ST1 to ST0 and places the result into ST0 and does not change the fTOS. The last operation reads data from ST0 and then increments the fTOS 820. Assuming that before the above set of uops the fTOS 820 value was 6 (entry 816), uop0 has no floating point register source but a destination of entry 5 (815) in the fRAT array 800. And, uop1 has no floating point register source but has a destination of entry 4 (814) in the fRAT array 800. The uop1 has a source of entry 4 and entry 5 and a destination of entry 4. Lastly, uop 3 has a source of entry 4.

During the read operation, the fRAT array 400 is read and the physical source registers (PSources) corresponds to entry 4 and 5 are read out of the array and supplied to the retirement override block of the fRAT logic (see FIG. 1 generally). In order to perform the floating point initial read, the present invention receives a stack control field for each uop of the current set. The stack control field indicates how a given uop changes the fTOS. For instance the stack control field will indicate increment, decrement or no change. A value of the fTOS for each uop can then be assigned by the present invention and used as an offset to the values of the logical floating point registers of each uop in order to compute the true entry number (absolute address) of the fRAT array 800. For instance, the value of the FTOS at the start of uop0 is the initial value of 6. However, the push instruction decrements the fTOS by one to 5. The value of the fTOS at the start of uop1 is then 5 and it too decrements the value to 4. The value of the fTOS at the start of uop2 is 4 and the ST0 and ST1 sources are then obtained as entry 4 and entry 5, respectively. The value of fTOS at the start of uop3 is then 4 and the pop of ST0 is then from entry 4.

Refer to FIG. 9 which illustrates a translation logic 980 block of the present invention that is located as a front end block to the actual fRAT array 800. The translation block 980 receives eight input buses 962a–962h which indicate the logical floating point source designations in stack-based format. Inputs 962a–962h originate from the instruction fetch and decode block 40 of the fRAT logic 895. The translation block 980 also receives the value of the fTOS 820 from the previous cycle (e.g., the last set of uops processed by the fRAT logic). The translation logic also receives four stack control bus lines 960a–960d, for uop0 to uop3 of the current set, and each bus is two bits wide. Each bus indicates the effect on the fTOS value that a particular uop will have at issuance (e.g., increments, decrements, no change). All uop references to stack registers are done before the uop changes the TOS. The logical floating point sources over buses 962a–962h for the current uop set designate the offset from the current TOS for that uop to specify a particular register (e.g., ST0–ST7). The outputs 970a–970h indicate the absolute address of the eight input logical registers after translation by block 980. These values over bus 970a–970h will be used to address the fRAT array 800.

For each logical source register the translation logic 980 of FIG. 9 must perform three addition computations to arrive at the proper absolute address. First, the original fTOS value 820 must be obtained which represents the top-of-stack at the start of the current cycle. Second, for each uop, the sum of all the stack control values for the previous uops of the current set must be added. Lastly, the offset of the logical register supplied by the ID block 40 (e.g., ST0–ST7) must be added to the result. The translation logic 980 contains well known logic and adder units to accomplish these functions simultaneously for all eight logical sources. The below table indicates the logic implemented within block 980 for the eight output buses 970a–970h.

TABLE 4

| uop0: | Source1: | 970a = fTOS + 962a |
|---|---|---|
|  | Source2: | 970b = fTOS + 962b |
| uop1: | Source1: | 970c = fTOS + [960a] + 962c |
|  | Source2: | 970d = fTOS + [960a] + 962d |
| uop2: | Source1: | 970e = fTOS + [960a + 960b] + 962e |
|  | Source2: | 970f = fTOS + [960a + 960b] + 962f |
| uop3: | Source1: | 970g = fTOS + [960a + 960b + 960c] + 962g |
|  | Source2: | 970h = fTOS + [960a + 960b + 960c] + 962h |

The new fTOS will equal the old fTOS added with 960a+960b+960c+960d. Once the absolute addresses into the fRAT are computed according to the above procedures, the present invention may index the fRAT array 800 in substantially the same fashion and using substantially the same structure as described in the integer embodiment. These absolute addresses 970a–970h are applied to the inputs of the fRAT array 800 and the array generates eight output signals 846a–846h which represent the eight PSource values that correspond to the eight input values. The eight outputs 846a–846h from the fRAT array 800 are similar to the outputs 46(a)–46(h) of the integer embodiment and indicate the addresses of the physical source registers for the input logical floating point source registers. These outputs are fed to the retirement override logic block 850 (see FIG. 8A).

It is appreciated that the present invention includes translation logic 980 to translate the logical destination addresses to absolute addresses for a current set of uops in an analogous fashion as shown above. Buses 842a–842d contain the logical register designations for the four possible destinations of the current set for uop0 to uop3. These are fed to translation logic 980 which generates four outputs 971a–971d as shown which represent the absolute addresses of the four logical destinations for uop0–uop3. The basic procedure for computing the above output signals is shown below in Table 5.

TABLE 5

| | |
|---|---|
| uop0:Dest: | 971a = fTOS + 842a |
| uop1:Dest: | 971c = fTOS + [960a] + 842c |
| uop2:Dest: | 971e = fTOS + [960a + 960b] + 842e |
| uop3:Dest: | 971g = fTOS + [960a + 960b + 960c] + 842g |

It is also appreciated that the absolute address values 970a–970h and 971a–971d are also used by the PDest override block 855 of the floating point embodiment when testing for intra-cycle destination/source dependencies instead of the values on buses 962a–962h. Given the procedures of Table 4 and Table 5, one of ordinary skill in the art could realize the required circuitry to generate signals over buses 970a–970h and 971a–971d simultaneously based on the source and destination inputs.

FP Register Exchange Operation. The FXCH operation is a floating point register exchange operation and is used by the Intel macroarchitecture instruction set to swap the data between two stack referenced floating point registers. The technique of the present invention FXCH operation may be applied to a variety of register types including those that are not stack referenced and those that are not floating point. Within the present invention, the data of register ST0 and register ST1 may be swapped. The instruction always has two operands and they are both treated as sources and also both treated as destinations. The operation FXCH ST0, ST1 places the data of ST0 into the ST1 register and the data of ST1 into the ST0 register. Each floating point register of the Intel macroarchitecture is 86 bits wide. In order to swap data of two 86-bit registers the following functions three uops must be executed systems which perform the following steps: (1) the 86-bit data of a first register to be swapped is loaded into a temporary area; (2) the 86-bit data of the second register to be swapped is placed into the first register; and (3) the 86-bit data of the temporary area is loaded into the second register. While the above sequence may be accurate, it is not efficient enough to operate high speed microprocessors because of the time it takes to execute these three uops to route each bit of the 86-bit data.

The fRAT array 800 entries are indexed by logical floating point registers and contain essentially a 6-bit pointer value into the ROB 60 or into the RRF 90 where the actual physical register resides that holds the 86-bit floating point data. It is appreciated that the exact bit sizes are exemplary. In order to perform the FXCH rapidly, the present invention does not attempt to swap the physical location of the 86-bit data but rather swaps the 6-bit pointer values of the entries of the fRAT array 800 that correspond to the logical registers that are involved in the swap function. By swapping the 6-bit pointer values (or 3-bit value if the value points to the RRF) that point to the actual location of the 86-bit data, the present invention effectively performs a swap of the floating point registers. The present invention also alters the register ordering by performing such a swap operation.

For instance, with reference to FIG. 8B assume the fTOS 820 points to entry 2 (812) of the fRAT array 800. The FXCH operation of the present invention in order to swap ST0 and ST1 would swap the 6-bit pointer values of entries 2 and 3 (e.g., of entries 812 and 813) instead of swapping the 86-bit data registers of the ROB 60 to which the pointers indicate. This would effectively swap the ST0 and ST1 logical registers. In addition, since the RAT executes the FXCH, the uop is immediately ready to retire and takes essentially zero execution time. Because the fRAT array 800 is implemented as a multiported RAM, the present invention may perform a standard read and write into the memory locations that hold the pointers to be swapped. The present invention may also be implemented by shifter circuitry to shift the bits of the two pointers out of their original entry and into the new entry. Either implementation is within the scope of the present invention.

However, the fRAT array 800 processes speculative instructions including speculative register exchange operations. In other words, the fRAT array 800 processes instructions that may or may not retire, depending on the program flow order and whether or a not the correct program path was selected by branch prediction logic of the microprocessor (which is not entirely pertinent to the present invention). Therefore, the fRAT array 800 may process an FXCH operation that may become part of a mispredicted branch path (e.g., the path of a branch that never should have been executed by the microprocessor). In this case, the conditions of the fRAT logic affected by the FXCH instruction must be eliminated once the checking hardware of the microprocessor determines that an improper branch was predicted. The presence of speculative FXCH operations also complicates the retirement process of the fRAT logic and creates the requirement for the rfRAT array 802. For instance, with respect to the integer RAT operations, whenever a uop retired with a retiring PDest, the PDest always kept track of which location within the RRF in which to place its data because for a given logical register (such as eax) the position within the RRF 90, and within the iRAT array 45, was always constant. In other words, register eax always indexed entry zero for the RRF 90 and for the iRAT array 45 and this type of indexing is called constant designation for the retiring PDests.

However, the above is not the case with respect to the fRAT logic 895 because previously executed FXCH operations may swap the locations of particular registers within the fRAT array 800 thereby eliminating the constant designation of registers that is used by the iRAT logic 10. In order to account for the execution of speculative FXCH operations, the present invention fRAT logic 895 provides the rfRAT 802. The rfRAT 802 maintains the ordering of the floating point registers of the RRF 90 because the rfRAT is updated only upon uop retirement. This ordering maintained by the rfRAT array 802 is called the retirement register ordering because it represents the register ordering as affected only by retiring FXCH operations. Retiring FXCH uops then alter the entries of the rfRAT array 802 and therefore alter the true order (retirement register order) of the registers within the RRF 90. Therefore, the fRAT array 800 maintains a speculative register ordering because this ordering is affected by the presence of speculative FXCH operations. Upon detection of a branch misprediction, the microprocessor of the present invention will copy the contents of the rfRAT array 802 into the fRAT array 800 and purge all speculative information that was processed subsequent to the mispredicted branch.

FP Retirement Overrides 850. Refer to FIG. 11A. The following discussion describes the procedure utilized by the fRAT logic of the present invention to perform the floating point retirement override functions 850. Floating point retirement is broken down into two separate sections. First, there are the functions of the present invention to perform the fRAT array retirement and second the rfRAT array retirement will be detailed. The rfRAT retirement is discussed first.

The retirement procedure 1180 with respect to the rfRAT array 802 is described with reference to the flowchart of FIG. 11A. The rfRAT array 802 is only updated by the retirement logic 850 based on information from the retiring uops when the uop is guaranteed to be on the path of certain execution. The rfRAT array 802 contains only retired FXCH information so that it maintains the proper ordering of the floating point registers of the RRF 90 ("retirement register ordering"). Therefore, bus 62 from the ROB is also fed to the rfRAT array 802 (as shown in FIG. 8A). Every retiring uop has the fTOS stored with it in the ROB 60, regardless of whether the uop was FP or not. The rfTOS is updated on every retiring uop at block 1155. For a given set of retiring uops in a cycle, the present invention stores the fTOS of the latest retiring uop into the rfTOS in the register 839. The rfRAT valid bits of the rfRAT array 802 are updated by the present invention when retiring uops have stack registers as the logical source or logical destination. At block 1160, the rfTOS value is changed for every retiring uop, independent of the data (stack) valid bits being set or reset. At block 1165, the present invention tests if the retiring uop is an FXCH. If not, the processing continues to block 1175.

If the uop is an FXCH then the present invention at block 1170 reads the LDest and LSource values of the ROB corresponding to the PDest value associated with the retiring FXCH uop in order to receive the entries of the rfRAT to swap. The present invention at block 1170 then swaps the values of the rfRAT array 802 obtained above. If multiple FXCH operations retire, then the rfRAT retirement procedure results in a condition as if each retired sequentially. At block 1175 the present invention processes all retiring uops. It is appreciated that while FIG. 11A illustrates the functions performed for each retiring uop, the present invention simultaneously performs the rfRAT array retirement functions for all uops of a given retiring set. In other words, the present invention performs the updates to the rfRAT array 802 simultaneously for all retiring uops. It is appreciated that by updating the rfRAT array 802 at retirement, the rfRAT array 802 maintains the true register ordering within the floating point registers of the RRF array 90 as defined by the retiring FXCH operations.

Retirement of PDest Pointers in fRAT. Retirement of uops within the fRAT array 800 is similar to the retirement in the iRAT array 45. The valid retirement pointer (PDests) are used in a CAM match circuit against the contents of all the fRAT array entries (e.g., 810–817). For each matching fRAT entry found, the entry's RRF bit is set to indicate the data is found in the RRF 90. Each matching entry must also be given a retirement value for its 808 column field (which is the physical source pointer). However, because of the possibility of having executed FXCH instructions, the retirement value assigned is not a result of a constant designation within entries of the RRF 90, as will be explained.

In the integer array 45, each entry is assigned a single RRF register to always rename which is a constant designation. For example, as discussed above, entry 0 is only used to rename eax register, entry 1 to rename EBX, and so on. Therefore, at retirement of a PDest pointer that designates the iRAT array 45, if the PDest pointer is located within the iRAT array 45 (via the CAM match) then all that is required is that the RRF valid bit 324 be set for the matching entry because it is known as a constant condition that the integer data associated with the retiring PDest is located in the RRF 90 and will be found at the logical register designation corresponding to the matched entry. This is so because the ordering of the logical registers of the RRF 90 is constant for the integer registers. Therefore, the registers of the iRAT array 45 have a one-to-one fixed correspondence to the integer registers of the RRF 90.

However, the fRAT registers do not have any implied or fixed correspondence to entries in the RRF 90 because FXCH operations may occur which would reorder the floating point registers as they are in the RRF 90. If FXCH operations did not exist, this would not be the case within the present invention and each fRAT entry would always correspond to the same RRF entry for the floating point case. For instance, the system reset condition (when the present invention is initialized) of the fRAT array 800 is a "straight across" mapping with the RRF entries as show in FIG. 10A. Each entry of the fRAT array 800 corresponds to the straight across entry of the RRF 90. After executing an FXCH instruction, the pointers are switched in the fRAT to correctly represent where the data will be found within the RRF 90 as a result of the FXCH. Since the RRF 90 represents only data that has retired, the fRAT array cannot be used as an indicator to determined the current register ordering of the RRF because the fRAT contains information based on speculative operations, including speculative FXCH operations. Since the rfRAT is only updated based on retiring operations, it will be used by the present invention to maintain the retirement register ordering (e.g., the ordering of the RRF floating point registers at any given time).

FIG. 10B illustrates a condition where the pointer values of entries 813 and 814 of the fRAT array 800 are exchanged (as a result of either speculative or non-speculative FXCH operations). This implies that the present invention has "re-ordered" the floating point RRF 90 registers of these two entries; future reference to swapped registers of the RRF 90 must reflect this new RRF register ordering. Since fRAT array entries are updated upon retirement to indicate the new location of the data associated with the retiring PDest pointers, these entries must reflect the dynamic FXCH information; the retirement pointer to the RRF 90 must also be dynamic and can be found in the rfRAT array 802.

When an allocated PDest is written into an entry of the fRAT array 800 by the floating point priority write functions of unit 865 (as will be further described below), the absolute address of the fRAT entry is recorded into the ROB 60 and it is recorded in the ROB at a ROB array entry corresponding to the PDest value that is assigned to the fRAT entry. For example, refer to FIG. 8B and FIG. 8C, if PDest 14 was written into entry 813 of the fRAT 800 (e.g., allocated to entry 813), then associated with the PDest register 14 would be placed the address "3" which indicates the absolute address of the fRAT array 800 at the time the PDest pointer 14 was assigned. As shown in FIG. 8C, the PDest register 14 has a "3" inserted into the LDest column 920. Likewise, for any PDest pointer value written into the fRAT 800 (by the priority write logic 865), the absolute address entry of the fRAT receiving the PDest pointer will be written into the ROB 60.

Refer to FIG. 11B which illustrates the procedure 1100 executed by the present invention to determine the retirement pointer value (RRF pointer value) to load into the fRAT array 800 upon a PDest pointer retirement as well as to set the RRF valid bit 806 to indicate that the data corresponding to the retiring PDests is located in the RRF 90. The procedure of FIG. 11B is used by the present invention to determine where in the RRF 90 the data is located and to load this RRF location into the fRAT array 800. In order to do this, the present invention must account for the impact of FXCH operations that retire; this is because only retiring FXCH operations can effect the true ordering of the floating point registers of the RRF 90. Further, the determined retirement pointer value to the RRF 90 will be used as an override value by the retirement override unit 850 for the fRAT logic if the retirement PDest also happens to be a PSource of the current uop set as determined by the retirement override logic 850. This way, the fRAT array will supply the proper location of the retired source data which is in the RRF 90 and not the ROB 60.

The retirement procedure 1100 begins at block 1110 of FIG. 11B and flows to block 1120 where a CAM match is performed between each retiring PDest pointer and the entries (810–817) of the fRAT array 800. At block 1100 the retiring PDest pointers for floating point registers are received and stored in a temporary storage buffer. The CAM match performed by block 1120 is analogous to the CAM match technique as described with reference to the iRAT logic 10 and the iRAT array 45. Block 1125 tests if a particular retirement PDest pointer matches the fRAT entries. If no match is present for a given PDest pointer within any entries of the fRAT, then the flow continues back to block 1120 to test the next PDest pointer until each pointer is tested. It is appreciated that the CAM match procedure of block 1120 and block 1125 occur simultaneously for each retiring PDest pointer, as described in the integer embodiment. For instance, assume that a given retiring PDest pointer was physical register 14. The CAM match of the blocks 1120 and 1125 would recognize that entry 816 of fRAT array 800 (of FIG. 8B) matched PDest 14.

It is appreciated that since the retiring PDest pointer matched an entry of the fRAT, the present invention must update the matching entry of the fRAT in order to inform the fRAT table that the most recent data for this floating point register is now located in the RRF 90 and not the ROB 60. This process is accomplished by setting the RRF valid bit 806 for the matching entry and also determining which entry of the RRF 90 will receive the retiring data. In order to determine which RRF floating point register to use, the present invention must utilize information stored in the ROB and in the rfRAT array 802. The procedure of flow 1100 used to perform the above functions is discussed below. For each retiring PDest pointer that matches an entry of the fRAT array 800, block 1130 sets the matching fRAT entry's RRF valid bit (column 806) to point to the RRF 90 instead of the ROB 60. By way of exemplary convention, bit state "0" indicates the ROB 60 and bit state "1" indicates the RRF 90, however these states could be reversed. With the RRF bit set, column 806 of entry 816 would then be set to designate the RRF 90 and not the ROB 60 for the data associated with PDest 14. Next at block 1135, the present invention reads the ROB 90 indexed by the PDest 14 in order to locate an absolute address of the fRAT (column 920 from FIG. 8C) at the time the PDest 14 was assigned. This absolute address corresponds to the entry of the fRAT that was originally assigned the PDest 14. Subsequent FXCH operations may alter this entry subsequent to the original assignment. For example, since the matching PDest is physical register 14 as shown in FIG. 8C then the absolute fRAT address output from block 1135 would be the value "3" as indicated. The value "3" indicates that when the PDest 14 was originally allocated to the fRAT, it was assigned to absolute entry "3" of the fRAT. Next, the present invention at block 1140 uses the absolute fRAT address received from the ROB 60 to index the rfRAT array 802. The rfRAT array is indexed and the value of the entry indexed is output. By doing this, the present invention is able to account for FXCH operations that may have altered the ordering of the floating point registers within the RRF 90. This is the case because the rfRAT array is only affected by FXCH operations that retire (e.g. are associated with a properly predicted branch). Block 1140 then outputs the value of the rfRAT in column 850 that corresponds to the entry of the rfRAT that was indexed by the value ("3") output from the ROB. Following the above example block 1140 would output the value of column 850 of entry 833 (of FIG. 8B). It is appreciated that the value stored in the rfRAT is the RRF pointer value for the retiring PDest pointer.

Refer still to FIG. 11B. Next, the present invention at block 1145 copies the value read from the rfRAT entry into the column 808 of the fRAT array into the entry that matched the particular retiring PDest. Consistent with the example, the value stored in column 850 at entry 833 would be copied into column 808 at entry 816 of fRAT array 800 (as shown in FIG. 8B). By following the above procedure, the present invention uses the ROB to arrive at a value stored in the rfRAT to use as the retirement pointer (to the RRF) with which to update the fRAT. According to the retirement override logic of the fRAT logic, if a PSource output from the initial floating point read operation matched a retiring PDest, then the value output from the rfRAT (from the above procedure regarding the PDest) would be output from the retirement override unit in lieu of the value initially read from the fRAT table for that PSource. The value output from the retirement override logic would the be RRF pointer associated with the retiring PDest, instead of the PDest value. The fRAT table would also be updated at the same time. Subsequent operations that read the fRAT table entry 816 would get the source data from the RRF 90 instead of from the ROB 60.

In one embodiment, it is appreciated that the FP retirement override multiplexers have 5 inputs rather than the two inputs shown in the FIG. 4A (410–416). This is because there are 4 different possible retirement values instead of 1, as in the integer case. Signals equivalent to 495–498 (FIG. 4C) are used in the present invention to control the 5 input multiplexers.

FP New PDest Override 855. Refer to FIG. 8A. The new PDest override logic 855 of the present invention handles intra-cycle data dependencies between floating point logical sources and floating point logical destinations of preceding uops for a current uop set. The new PDest override function of the floating point logic is similar to the integer mechanism as described above with some exceptions. In order to perform the logical source and logical destination comparisons (as shown in FIG. 5A and FIG. 5B for the integer embodiment) in order to find intra-cycle data dependencies, the new PDest override block 855 utilizes the absolute address outputs from the translation logic 980 instead of the outputs over buses 41 and 42. The logical source register values are output over buses 970a–970h while the logical destination register values are output over buses 971a–971d. In other words, in order to compare logical source1 of uop1 to the logical destination of uop0 the present invention compares bus 970c(uop1 source1) against bus 971a(uop0 destination), and so on. The new PDest override function 855 is similar in structure and function to the override 55 of the iRAT logic 10 when there are no FXCH uops to consider.

Another exception to the floating point PDest override logic 855 involves the FXCH operation because the floating point RAT logic 895 of the present invention must consider that FXCH operations have two effective destinations instead of one. Therefore, additional logic is provided by the present invention to compare each logical source of a later uop to both logical destinations (which are actually the sources of the FXCH uop) of a prior FXCH operation. Therefore, both operands of an FXCH uop must be able to override subsequent uop sources that match. Furthermore, in the case of match between a logical source and a logical destination of an FXCH operation, the value used to override the logical source is not strictly always a newly allocated PDest, but rather may be the result of any prior override with respect to the matching register. This is the case because the operands of an FXCH, unlike any other operation, must be treated both as sources and also as destinations. Therefore, as a source, the FXCH register may be overridden by a preceding logical destination and further as a destination, the FXCH register may also override a subsequent logical source. The present invention provides a mechanism to process the above cases. For instance consider the below uops:

fTOS = 3:

|  |  |  | Translated Refs: |  |  |
|---|---|---|---|---|---|
|  |  |  | s1 | s2 | dest |
| uop0 | push | ST0 |  |  | FST2 |
| uop1 | FXCH | ST0, ST1 | FST2 | FST3 |  |
| uop2 | fadd | ST1 | FST3 |  |  |

Assume PDesta is assigned to destination ST0 for uop0 (which decrements fTOS). The uop1 logical source ST0 and the location for ST0 (of uop0) are matched as the same entry of fRAT array 800 (because fTOS was decremented) and PDesta therefore overrides for the register ST0 for uop1. The register ST1 of the FXCH is treated as a source. However, the source ST1 of uop2 also matches with the operand ST1 of uop1 (FST3). The result is that PDesta also overrides for ST1 for uop2. In this case ST1 of the FXCH is treated as a destination. Therefore, an additional logic stage is supplied within the present invention for the floating point new PDest override unit 855 to account for the dual source/destination registers of the FXCH uop.

The circuitry of the present invention to process the FXCH operation will output one of three possible values over buses 851*a*–851*h* (one for each of the eight possible sources) for a given uop. First, the value initially read from the fRAT array 800 may be output for a source; this is the case if the FXCH operands do not match any preceding destination registers or subsequent source registers. Second, the allocated PDest for the given uop from the allocator 80, such as PDesta, may be output for a source; this is the case if the FXCH operands match a preceding destination register but do not match a subsequent source register. Lastly, an allocated PDest from a preceding uop may be output for a source; this is the case if the FXCH operands match a preceding destination register and also match a subsequent source register. For the case of no FXCH uops in a current uop set, the above PDest override description is utilized (e.g., it is similar to the integer case).

For discussion, assume that only three uops are in a given uop set and the FXCH is the middle uop. Table 6 below illustrates the outputs from the PDest override block 855 for the first source (source1) of each of the three possible uops of a set assuming PDesta is allocated for uop0, PDestb for uop1, and PDestc for uop2 given the below uop set. The FXCH operands acts as both destinations and sources.

| uop0 | S1 | S2 | D |  |
| uop1 | S1 | S2 |  | ;FXCH |
| uop2 | S1 | S2 | D |  |

TABLE 6

| Output for: | Output is: |
|---|---|
| source 1 uop0: | PSource from fRAT for S1 of uop0 for all cases. |
| source 1 uop1: | PSource from fRAT for S1 of uop1 if S1 of uop1 not equal to D of uop0. PDesta if S1 of uop1 is equal to D of uop0 |
| source 1 uop2: | PSource from fRAT for S1 of uop2 if S1 of uop2 is not equal to S1 of uop1 and is not equal to S2 of uop1 and is not equal to D of uop0. PDesta if S1 uop2 equals S1 of uop1 and S2 of uop1 equals D of uop0. PDesta if S1 uop2 equals S2 of uop1 and S1 of uop1 equals D of uop0. PDesta if uop2 S1 does not equal either uop1 S1 or uop1 S2 and uop2 S1 equals uop0 D. PSource of fRAT for S1 of uop1 if S2 of uop1 equals S1 of uop2 and S1 of uop1 does not equal D of uop0. PSource of fRAT for S2 of uop1 if S1 of uop2 equals S1 of uop1 and S2 of uop1 does not equal D of uop0. |

It is appreciated that the logic for the source2 for each uop is analogous to the above procedures in Table 6. It is further appreciated that an extension of the above logic may be formulated by one skilled in the art when four uops are present in a given set.

Assume now that only three uops are in a given uop set for discussion and the FXCH is the first uop. Table 7 below illustrates the outputs from the PDest override 855 for the source1 cases assuming PDesta is allocated for uop0, PDestb for uop1, and PDestc for uop2 given the below uop set. The FXCH operands are treated only as destinations, but they do not override with allocated PDests, but rather override with PSource values from the fRAT array 800.

| uop0 | S1 | S2 |  | ;FXCH |
| uop1 | S1 | S2 | D |  |
| uop2 | S1 | S2 | D |  |

TABLE 7

| Output for: | Output is: |
|---|---|
| source 1 uop0: | PSource from fRAT for S1 of uop0 for all cases. |
| source 1 uop1: | PSource from fRAT for S1 of uop1 if S1 of uop1 not equal S1 or S2 of uop0. PSource for S1 of uop0 if S1 of uop1 equals S2 of uop0. PSource for S2 of uop0 if S1 of uop1 equals S1 of uop0. |
| source 1 uop2: | PSource from fRAT for S1 of uop2 if S1 of uop2 not equal S1 or S2 of uop0 and is not equal to D of uop1. PDestb if S1 of uop 2 is equal to D of uop1. PSource for S1 of uop0 if S1 of uop2 equals S2 of uop0 and S1 of uop2 not equal to D uop1. PSource for S2 of uop0 if S1 uop2 equals S1 uop0 and S1 uop2 does not equal uop1 D. |

It is appreciated that the logic for the source2 for each uop is analogous to the above procedures in Table 7. It is further appreciated that an extension of the above logic may be formulated by one skilled in the art when four uops are present in a given set. In the case when the FXCH is the last uop of the set, then the operands are treated only as sources and may not override subsequent operands. Any combination of up to four FXCH can be processed by the present invention and from the above such logic can be realized.

According to the above procedures, when a source of a uop matches with an operand of a preceding FXCH uop (e.g., sources of FXCHs are treated as destinations) the PSource from the fRAT table corresponding to the other, unmatched, FXCH source is selected unless that other source of the FXCH was itself overridden by a preceding uop destination of the same cycle. In the case of two FXCH uops within a given cycle, each source of the last FXCH must be compared against each source of the prior FXCH and if a match is determined then the output for the matched source of the last FXCH is the other, unmatched, PSource value for the source of the matching prior FXCH unless that source was overridden by a prior destination. In the case where the sources of the FXCH are the same and a subsequent concurrent source matches both, then either PSource is given, since they are the same.

It is appreciated that the outputs generated by the floating point PDest override block 855 and the integer PDest override block 55 are multiplexed together to generate the resultant signals over bus 56. The integer override block 55 generates eight output signals (two for each uop) and the floating point override block 855 also generates eight signals (two for each uop). For each logical source, the RAT logic will designate that the source is either an integer or a floating point register and this designation is fed, for each source, to the override block 855 and block 55. Using these signals as select inputs to multiplexers, the present invention is able to channel either the signal generated by the integer PDest override block 55 or the floating point PDest override block 855, for a given source, onto bus 56 to the remainder of the microprocessor. There is a separate multiplexer for each source and they individually receive an input signal from block 55 and from 855. If the designation for a given source is integer, the multiplexer for that source selects the result from block 55 and if the designation is floating point then the signal from block 855 is selected. In the above fashion the results of the iRAT logic 10 and of the fRAT logic 895 merge.

FP Priority Write 865. Refer to FIG. 8A. In addition to the general priority write operation as described in the integer embodiment of the present invention (block 65), the priority write unit 865 of the fRAT logic 895 also performs additional functions. During the priority write operation, in order to determine logical destination conflicts, the priority write logic 865 utilizes the outputs 971a–971d corresponding to the LDests of uop0 to uop3 to determine the stack adjusted absolute addresses of the fRAT corresponding to the LDests. Therefore, instead of using the LDest designations supplied by the instruction decode and fetch unit 40, as does the iRAT logic 10, the floating point write unit 865 utilizes the translated values from the translation block 980 (of FIG. 9). Also, the priority write block 865 computes the new value of the fTOS 820 by summing the effects of the stack control signals 960a–960d for the current of uops. This is accomplished by summation circuitry and the result is written into the register 820 of the fRAT array 800. The fRAT stack valid bits (of column 805) are set/cleared by the priority write logic 865 as indicated by the stack control signals for the individual uops of a given set. If an FXCH uop is one of the uops issued then the PSource (column 808) fields of the affected fRAT registers are swapped by the floating point priority logic 865. As with the iRAT logic, the fRAT priority write 865 performs all write operations of all uops simultaneously.

At FP priority write 865, the new PDest values supplied by the allocator 80 are written into their respective fRAT array entries corresponding to the PDests' associated logical registers. As the PDests are written to (assigned to) a particular fRAT array entry, the entry number is recorded into the ROB 60 and is associated with the PDest pointer value for future use at retirement. Further, at FP priority write 865, if no operation of the current set of operations writes to a given entry of the fRAT array, then that entry's RRF valid bit may be set to indicate the RRF 90 provided that entry's PDests retired (e.g., the entry is a matching entry). Also, as discussed, the rfRAT 802 will be used to provided a retirement RRF pointer value to store into the matching entry.

FP Recovery from Misprediction. When the checking hardware of the microprocessor discovers that the branch target buffer mispredicted a program pathway, it generates a clear signal which informs the fRAT logic 895 that any speculative data it processed must be discarded. Upon receiving the clear signal, the fRAT logic 895 ceases from actively processing the uops associated with the speculative program code. The microprocessor then allows all instructions along the proper pathway to retire in order to properly update the rfRAT array 802. In other words, all instructions previous to the mispredicted branch instruction are allowed to retire in order to update the rfRAT array 802. Once the rfRAT array 802 is updated with all properly retired instructions up to the mispredicted branch, the fRAT logic 895 then copies the data of the rfRAT array 802 (e.g., all 12 entries) into the corresponding entries of the fRAT array 800. At this point the fRAT array 800 points only to the RRF 90 entries and not the ROB 60. The present invention also copies the rfTOS 839 into the fTOS 820 register. The present invention also copies the data valid bits (column 845) of the rfRAT array 802 into the data valid bits of the fRAT array 800. After the rfRAT array 802 entries are copied into the fRAT array 800, the present invention sets all RRF valid bits 806 of the fRAT array 800 to designate the RRF array entries as the data locations for all integer registers. Once the above has been done to the fRAT array 800, the fRAT array 800 contains only information regarding retired uops. The microprocessor then begins reading and decoding instructions along the proper program pathway and the fRAT logic 895 again operates normally to rename the logical floating point registers to physical integer registers. By copying the rfRAT 802 data into the fRAT array 800, the present invention is able to effectively purge the speculative data from the fRAT array 800 and recover from a misprediction.

It is appreciated that the fRAT logic 895 copies the contents of the rfRAT array 802 into the fRAT array 800 rather than copying the RRF entries because of the manner which the present invention performs the FXCH instruction. When an FXCH operation retires, the FXCH instruction of the present invention performs an effective reordering of the RRF entries by reordering the pointers within the rfRAT array that are involved in the FXCH operation. Therefore, the rfRAT array 802 entries, not the RRF 90 entries, record the reordering data resulting from the FXCH operations. Since there are no similarly performed FXCH operations in the iRAT logic 10, the integer registers of the RRF 90 are never reordered and therefore the iRAT logic 10 may recover from branch misprediction using solely the RRF array 90 entries (by reverting to a hardwired pattern). The present invention utilizes the data of the rfRAT array 802 to recover from a branch misprediction rather than using the RRF 90.

Operational Example

The following discussion is an operational example that describes the functions of the floating point RAT logic 895 for a given set of uops. FIGS. 12A–12K illustrate the state of the fRAT array 800 and the rfRAT array 802 as the uops are issued and as they retire. It is appreciated that the below discussion of the present invention is described as if the uops issue and retire sequentially in order to illustrate the interaction and functions of the present invention. However, it should be appreciated that for a given set of uops, the priority write block 865, the retirement override block 850, the new PDest override block 855 and the initial fRAT array read operate on the uops of a given set simultaneously. Assume the following uops are to be issued and will retire along with the PDest allocation for each uop:

|  |  | PDest Allocation |
|---|---|---|
| uop0: | fpush | 10 |
| uop1: | fpush | 11 |
| uop2: | fpush | 12 |
| uop3: | faddp st(1), st | 13 |
| uop4: | fxch | 14 |
| uop5: | fadd st, st(1) | 15 |

FIG. 12A frame 1205 illustrates the state of the fRAT array 800 and rfRAT array 902 before any of the instructions are issued by the RAT logic. The fTOS 820 points to entry zero as well as the rfTOS 839. The three fpush uops are processed as a current set by the fRAT logic 895 of the present invention. The floating point priority write logic 865 updates the fRAT array 800 according to frame 1210 and the rfRAT array 802 of frame 1210 remains unchanged as no instructions have yet retired. The fTOS 820 has been decremented three times and points to entry 5. The three PDests allocated for uop0–uop2 (e.g., 10, 11, and 12) have been assigned to entries 7, 6 and 5 respectively by logic 865 and the data valid bits for entries 7,6, and 5 have been set and the RRF bits have been reset to designate the ROB 60. When the PDests 10, 11 and 12 are assigned to their entries of the fRAT array 800, the ROB 60 is also informed of the absolute address of the fRAT into which these PDests are placed. Therefore, the ROB 60 is fed the entries 7, 6 and 5 for the PDests 10, 11 and 12, respectively and they are placed into column 920 of the ROB 60 in each appropriate entry (see FIG. 8C).

Frame 1215 of FIG. 12C illustrates the result of the issuance of uop3 which performs an add function (results placed in ST1) followed by a pop function, the pop will increment the fTOS 820. Before the instruction issues the fTOS 820 points to entry 5. As shown, the PDest, 13, assigned to uop3 is placed into entry 6 which represents ST1 (5+1) and the fTOS 820 is then incremented to indicate entry 6 which clears the data valid bit of entry 5. Nothing in the rfRAT 802 is altered. The ROB 60 is informed (e.g., column 920 is updated) that PDest 13 is placed into absolute address 6 of the fRAT array 800. Frame 1220 of the FIG. 12D illustrates the result of uop4's issuance. The entries of the fRAT 800 for ST0 and ST1 are exchanged. Therefore, the PDests of entries 6 and 7 are exchanged but the ROB 60 still maintains their original placement information. The exchange operation does not affect the value of the fTOS 820 nor does it affect the data valid bits for entries 6 and 7. Nothing in the rfRAT 802 is altered. PDest 14 was assigned to the exchange uop, however it is never actually written into the fRAT array 800 because the FXCH has no destination data; its sources are swapped in the fRAT array 800. The ROB 60 is informed that PDest 14 corresponds to an exchange operation and column 940 is set for PDest entry 14 of the ROB 60 (see FIG. 8C). Also, the two entries involved in the exchange operation are written into the ROB 60 to LDest column 920 and LSource column 930 for the PDest 14 entry; the values written are 6 and 7, respectively.

Frame 1225 illustrates the result of uop5's issuance by the fRAT logic 895. PDest 15 is assigned to entry 6 (ST0) and the ROB 60 is updated to reflect that 15 was assigned there. The rfRAT array 802 as of yet has not been altered by the present invention because no instructions have retired. Table 8 below illustrates the partial contents of the ROB 60 after the above instruction have issued.

TABLE 8

| PDest (910) | LDest (920) | LSource (930) | FXCH? (940) |
|---|---|---|---|
| 10 | 7 |  | 0 |
| 11 | 6 |  | 0 |
| 12 | 5 |  | 0 |
| 13 | 6 |  | 0 |
| 14 | 6 | 7 | 1 |
| 15 | 6 |  | 0 |

The frame of FIGS. 12F–12K illustrate the effect of the present invention fRAT logic 895 when the above uops retire. Frame 1230 indicates the result after uop0 retires having associated retirement PDest 10. For the fRAT array 800, a CAM match for PDest 10 against the fRAT array 800 yields nothing so no further activity occurs to the fRAT array 800. For the rfRAT array 802, the rfTOS 839 is decremented and the data valid bit for entry 7 of the rfRAT is set. Frame 1235 indicates the result after uop1 retires having associated retirement PDest 11. Again, a CAM match for PDest 11 against the entries of the fRAT array 800 yields nothing so no further activity occurs to the fRAT array 800. For the rfRAT array 802, the rfTOS 839 is decremented once more and the data valid bit for entry 6 of the rfRAT is set.

Frame 1240 of FIG. 12H illustrates the result of uop2's retirement (fpush) having associated PDest 12. For the fRAT array 800, a CAM match against the entries of fRAT array 800 yields a match at entry 5 of the fRAT array 800. The present invention then reads the LDest column 920 of the ROB 60 corresponding to PDest 12 (the matching PDest); from the above, a value of 5 is output from the ROB. The value of 5 is used as an absolute address index into the rfRAT array 802 where the present invention locates a value 5 at entry 5 of the rfRAT array (by coincidence). The present invention then writes the value of entry 5 of the rfRAT array (which is also 5) into the matching entry 5 of the fRAT array 800. The present invention then sets the RRF bit corresponding to entry 5 of the fRAT array 800. Regarding the rfRAT array 802, the present invention decrements the rfTOS 839 and sets the data bit for entry 5.

Frame 1245 of FIG. 12I illustrates the result of uop3's retirement (faddp) having associated PDest 13. For the fRAT array 800, the CAM match of PDest 13 yields a match at entry 7 of the fRAT. The present invention then examines column 920 of the ROB for PDest 13 and discovers a value of 6. This represents that PDest 13 was originally placed into fRAT entry 6. The present invention then indexes the rfRAT at the absolute address of 6 and within that entry is the value 6. Therefore, the present invention writes a value of 6 into the entry 7 of the fRAT array 800 and also sets the RRF valid bit for entry 7 of the fRAT array 800. For the rfRAT array 802, the present invention increments the rfTOS 839 and resets the data valid bit for entry 5 of the rfRAT array 802.

Frame 1250 of FIG. 12J illustrates the result of uop4's retirement (fxch) having associated PDest 14. For the fRAT array 800, the CAM match of PDest 14 does not find a match in the entries of the fRAT; this is expected because uop4 is an exchange operation. No other activity occurs with respect to the fRAT. For the rfRAT array 802, the present invention reads the entries of the ROB 60 for PDest 14 and column 940 and discovers the uop is an FXCH uop. The LDest column 920 and LSource column 930 are read which yield entries 6 and 7. The present invention then swaps the data of these entries in the rfRAT array 802.

Frame 1255 of FIG. 12K illustrates the result of uop5's retirement (fadd) having associated PDest 15. For the fRAT array 800, the CAM match of PDest 15 against the entries of the fRAT array 800 locates a match at entry 6. The ROB 60 is indexed at PDest and LDest value 6 is output indicating that PDest 15 was originally placed at entry 6. The rfRAT array 802 is then indexed at entry 6 and within entry 6 of the rfRAT array is the value 7. The value of 7 is then placed into the matching entry 6. The RRF valid bit is then set for entry 6 of the fRAT array 800. For the rfRAT array 802, the present invention does not update the rfTOS 839 nor update any data valid bits of the rfRAT array 802.

It is appreciated that the above example covers the case when only one FXCH uop is present in a given set of retiring uops. It is appreciated that, within the procedures of the present invention, more than one FXCH uop may retire within the same retiring set. It is also appreciated that the above example illustrates the procedure of the present invention as if the uops were issued and retired sequentially in order to better described the functionality of the fRAT logic 895. However, it should be understood that for any given set of retiring uops the present invention simultaneously processes the uops.

Microprocessor

The iRAT logic 10 and fRAT logic 895 of the present invention are implemented within a superscalar pipelined microprocessor. By increasing the size of the effective register set and by eliminating false data dependencies from program code, a high performance microprocessor 101 having increased executed throughput may be constructed utilizing the present invention RAT units. An example microprocessor 101 of the present invention is illustrated with respect to FIG. 13. It is appreciated that the present invention RAT units may operate advantageously within a number of well known superscalar microprocessor architectures. Therefore, the present invention should not be considered limited to a particular microprocessor architecture as a result of the following discussion.

Figure 14:
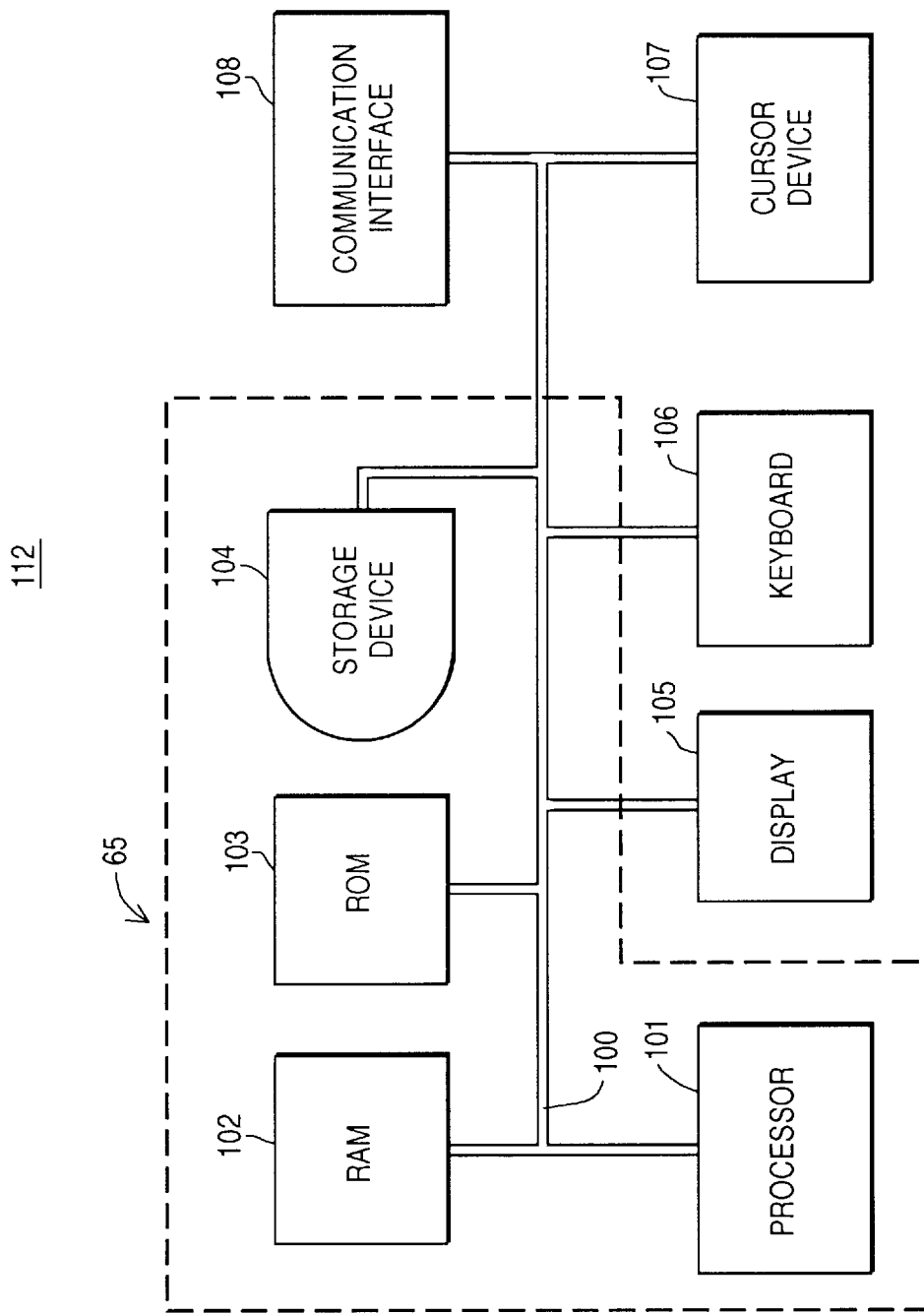

FIG. 13 illustrates major component blocks of a microprocessor 101 of the present invention. Instructions to be executed and data for processing (via a RAM and ROM of FIG. 14) over line 100 to a bus interface unit or BIU 1305 which may or may not contain a data cache and instruction cache unit. Instructions are fed to the fetch and decode unit 40 which decodes the instructions and fetches them from the RAM in program code order. Since the microprocessor is superscalar, several instructions may be processed simultaneously. The unit 40 also arranges the logical sources and logical destinations for a current set of instructions. The fetch and decode unit 40 is coupled to the iRAT logic 10 and fRAT logic 895. For the fRAT logic, the fetch and decode unit 40 generates the stack control bits for a given set of instructions (uops). Instructions interpreted by the fetch and decode unit 40 are based on a logical set of registers as sources and destinations. This logical set is typically of a limited size. A branch target buffer (BTB) 1350 is utilized by the microprocessor for branch prediction. The BTB 1350 may contain data indicating a program pathway actually taken in response to an individual branch instruction. The BTB uses this information for predicting the pathway to take when encountering the branch again, however, other algorithms may also be used. When it is detected that the front end of the microprocessor mispredicted a branch, the microprocessor asserts a clear signal and the speculative data from the mispredicted code is purged from the system and the iRAT array 45 and the fRAT array 800 are reset. The fetch and decode unit 40 and the BTB, as well as other components, may be collectively called an instruction fetch cluster.

The iRAT unit 10 renames the logical registers into a larger set of physical registers that are used by the execution units 1315 and 1310. After the execution units are complete, the data stored in the physical destination registers will become transformed back into logical registers when placed into the retirement register file 90 which is located within the retirement block 1320. The same is true for the fRAT unit 895. The iRAT logic 10 and fRAT logic 895 are both coupled to a reorder buffer (ROB) which holds the physical registers and also to a reservation station 75. Once the operands for a given uop have been properly renamed to physical registers, the uop is placed into the reservation station. The reservation station 75 will then dispatch a particular uop to an appropriate execution unit (e.g., integer execution unit 1315 or floating point execution unit 1310) when the uop is ready to execute and when an execution unit is available for use. It is appreciated that the microprocessor 101 does not necessarily execute uops in program code order, however, executed uops are retired in program code order. Once a uop has retired, the data is written into an appropriate entry of the retirement register file 90 (within the retirement unit 1320). Also at retirement, the retirement unit 1320 informs the ROB 60 that certain physical registers are no longer being used. The ROB 60 is then read by an allocator which determines the free physical registers for use in the renaming of other logical registers. Also during retirement, the RAT logic units are informed of physical register retirement so that particular entries within the iRAT 45 array and fRAT array 800, and rfRAT array 802 can be updated. Processed data may then be fed back via bus 100 out of the microprocessor.

The retirement circuitry 50 for the iRAT and the retirement circuitry 850 for the fRAT are illustrated which perform the updates to the integer and floating point RAT arrays to indicate that certain data is architecturally visible within the RRF 90. A memory cluster unit 1322 is also supplied to perform memory interface functions. It is appreciated that superscalar and pipelined microprocessors are well known in the art and may be advantageously utilized in conjunction with the iRAT logic 10 and fRAT logic 895 of the present invention including microprocessors of the PowerPC and Alpha generations and as such, the present invention should not be construed as limited in any way to the Intel architecture.

Computer System

The high performance microprocessor 101 of the present invention may be added to a general purpose computer system in order to increase processing speed of the computer system. Generally, the computer system 112 of the present invention of FIG. 14 comprises a bus 100 for communicating information, a central processor 101 coupled with the bus for processing information and command instructions, a random access memory 102 coupled with the bus 100 for storing information and instructions for the central processor 101, a read only memory 103 coupled with the bus 100 for storing static information and command instructions for the processor 101. Also available for interface with the computer system 112 of the present invention is a data storage device 104 such as a magnetic disk or optical disk drive which may be communicatively coupled with the bus 100 for storing information and command instructions.

The display device 105 utilized with the computer system of the present invention may be a liquid crystal device, cathode ray tube, or other display device suitable for creating graphic images and alphanumeric characters recognizable to the user. The computer system 112 may also contain an alphanumeric input device 106 including alphanumeric and function keys coupled to the bus 100 for communicating information and command selections to the central processor 101, a cursor control device 107 coupled to the bus for communicating user input information and command selections to the central processor 101 based on a user's hand movement. The cursor control device 107 allowing the network user to dynamically signal the two dimensional movement of a visible symbol (pointer) on a display screen of the display device 105 which may be used to select a particular station as a target address. Many implementations of the cursor control device are known in the art including a trackball, mouse, joystick or special keys on the alphanumeric input device 105 capable of signaling movement of a given direction or manner of displacement.

The computer system 112 also contains an input and output device 108 coupled to the bus 100 for communicating information to and from the computer system. The communication device 108 may be composed of a serial or parallel communication port or may be a communication modem. It is appreciated that such communication device 108 may provide an interface between the bus 100 and the user interface devices (keyboard 106, cursor 107, display 105) of the computer system. In this case, the user interface devices will reside within a terminal device this is coupled to the communication device 108 so that the processor 101, the RAM 102, the ROM 103 and the storage device 104 may communicate to the terminal and vice-versa. Components 101, 102, 103, 104, may be implemented on a single board or computer chassis 65 which is then coupled, via bus 100, the other components of the computer system, such as units 105, 106, 107 and 108.

The preferred embodiment of the present invention, an apparatus and method for updating a register alias table to indicate, upon retirement of certain data, that this certain data is located within the real register file whose contents are architecturally visible rather than located in an architecturally invisible buffer, wherein the step of updating the register alias table is only performed provided the logical registers associated with the certain data have not been reassigned prior to the retirement of the certain data, is thus described. While the present invention has been described in particular embodiments, it should be appreciated that the present invention should not be construed as limited by such embodiments, but rather construed according to the below claims.

What is claimed is:

1. A register alias table apparatus comprising:

an architecturally visible buffer comprised of a plurality of entries wherein individual entries correspond to individual logical registers;

an architecturally invisible buffer comprised of a plurality of entries wherein individual entries correspond to individual physical registers of said set of physical registers;

a Register alias table comprising a plurality of individual entries for associating logical registers with assignable physical registers located within said architecturally invisible buffer;

a physical register pointer associated with particular data to be made architectural visible;

a comparer for determining if said physical register pointer is located within a matching entry of said array memory;

indication logic within individual entries of said array memory for indicating if information associated with a given logic register is located within said architecturally invisible buffer or located within a corresponding entry of said architecturally visible buffer, the indicating logic indicating that information associated with a given logic register is located in a corresponding entry of the architecturally visible buffer if said physical register pointer is located within said matching entry; and loading circuitry for loading said particular data into an entry of said architecturally visible buffer, said entry corresponding to a particular logical register which was associated with said physical register according to the array memory.

2. A register alias table apparatus as described in claim 1 wherein said indication logic is a bit.

3. A register alias table apparatus as described in claim 1 wherein said individual entries of said array memory contain most recently assigned physical registers to said logical registers.

4. A register alias table apparatus as described in claim 3 further comprising logic for setting said indication logic for a given entry of said array memory upon retirement of a physical register that is stored within said given entry.

5. In a mechanism for renaming a set of logical registers that are associated with a set of operations to a set of physical registers, an apparatus for indicating that certain information is contained in an architecturally visible buffer, said apparatus comprising:

an architecturally visible buffer comprised of a plurality of entries wherein individual entries correspond to individual logical registers;

an architecturally invisible buffer comprised of a plurality of entries wherein individual entries correspond to individual physical registers of said set of physical registers;

array means comprising a plurality of individual entries for associating logical registers with assignable physical registers;

means for receiving a physical register pointer associated with particular data to be made architecturally visible;

comparing means for determining if said physical register pointer is located within a matching entry of said array means;

means for indicating, within said matching entry of said array means, if any, that said particular data is located within said architecturally visible buffer if said physical register pointer is located within said matching entry;

means for loading said particular data into an entry of said architecturally visible buffer, said entry corresponding to a particular logical register which was associated with said physical register according to said array means; and means for loading a retirement pointer, indicating said logical register of said architecturally visible buffer, into said matching entry.

6. An apparatus for indicating that certain information is contained in said architecturally visible buffer as described in claim 5 wherein said means for indicating indicates that said particular data is located within said architecturally visible buffer only if an operation of said set of operations does not concurrently write another physical register pointer into said matching entry.

7. An apparatus for indicating that certain information is contained in said architecturally visible buffer as described in claim 5 wherein said means for indicating comprises means for setting a bit corresponding to said matching entry to indicate that said particular data is located within said architecturally visible buffer and not in said architecturally invisible buffer.

8. An apparatus for indicating that certain information is contained in said architecturally visible buffer as described in claim 5 wherein said architecturally invisible buffer and said array means may both contain speculative information and wherein said architecturally visible buffer does not contain any speculative information.

9. In a mechanism for renaming a set of logical registers associated with a set of operations to a set of physical registers, an apparatus for indicating that certain information is contained in an architecturally visible buffer, said apparatus comprising:
   array means containing a plurality of individual entries for associating logical registers with assignable physical registers;
   memory for receiving a physical register pointer associated with particular data to be made architecturally visible;
   comparison means for determining if said physical register pointer is located within a matching entry of said array means; and
   means for indicating, within said matching entry of said array means, if any, that said particular data is located within said architecturally visible buffer only if said comparison means determines that said physical register pointer is located within said matching entry;
   wherein said means for indicating indicates that said particular data is located within said architecturally visible buffer within particular buffer entry corresponding to said particular logical register.

10. An apparatus for indicating that certain information is contained in an architecturally visible buffer as described in claim 9 wherein said physical register pointer is associated with a particular logical register which has been renamed by said array means.

11. An apparatus for indicating that certain information is contained in an architecturally visible buffer as described in claim 10 further comprising means for loading said particular data into said particular buffer entry of said architecturally visible buffer corresponding to said particular logical register.

12. An apparatus for indicating that certain information is contained in an architecturally visible buffer as described in claim 9 wherein said means for indicating indicates that said particular data is located within said architecturally visible buffer only if no other operation of said set of operations writes a register pointer into said matching entry.

13. An apparatus for indicating that certain information is contained in an architecturally visible buffer as described in claim 9 wherein said physical register pointer points to a particular physical register of a buffer that is not architecturally visible and contains speculative information.

14. An apparatus for indicating that certain information is contained in an architecturally visible buffer as described in claim 9 a wherein said means for indicating comprises means for setting an indicia corresponding to said matching entry of said array means and wherein said bit, when set, points to said architecturally visible buffer.

15. An apparatus for indicating that certain information is contained in an architecturally visible buffer as described in claim 9 wherein said array means is a register alias table and wherein said architecturally visible buffer contains no speculative information.

16. In a mechanism for renaming a set of logical registers associated with a set of operations to a set of physical registers, an apparatus for indicating that certain information is contained in an architecturally visible buffer, said apparatus comprising:
   an architecturally visible buffer containing a plurality of entries wherein individual entries correspond to individual logical registers, said architecturally visible buffer containing no speculative information;
   an architecturally invisible buffer containing of a plurality of entries wherein individual entries correspond to individual physical registers of said set of physical registers, said architecturally invisible buffer containing speculative information;
   array memory containing a plurality of individual entries for associating logical registers with assignable physical registers;
   receiving memory for receiving a physical register pointer associated with particular data to be made architecturally visible;
   matching logic for determining if said physical register pointer is present in a matching entry of said array memory;
   setting logic for indicating, within said matching entry of said array memory, if any, that said particular data is located within said architecturally visible buffer provided said matching logic determines that said physical register pointer is located within said matching entry.

17. An apparatus for indicating that certain information is contained in said architecturally visible buffer as described in claim 16 wherein said setting logic indicates that said particular data is located within said architecturally visible buffer only if an operation of said set of operations does not concurrently write a pointer value into said matching entry.

18. An apparatus for indicating that certain information is contained in said architecturally visible buffer as described in claim 16 wherein said setting logic comprises logic for setting an idicia corresponding to said matching entry to indicate that said particular data is located within said architecturally visible buffer and not located within said architecturally invisible buffer.

19. An apparatus for indicating that certain information is contained in said architecturally visible buffer as described in claim 16 wherein said array memory is configured as a register alias table and wherein said matching logic comprises CAM match logic circuitry.

20. A microprocessor comprising:
   a bus interface unit for interfacing with a bus means;
   instruction decode and fetch means coupled to said bus interface unit for decoding a current set of speculative operations for a given cycle;
   execution units for simultaneously executing operations;
   an architecturally visible buffer comprised of a plurality of entries wherein individual entries correspond to individual logical registers;
   an architecturally invisible buffer comprised of a plurality of entries wherein individual entries correspond to individual physical registers of said set of physical registers; and
   logic means for indicating that certain information is contained in said architecturally visible buffer, said logic means comprising:
      array means comprising a plurality of individual entries for associating logical registers with assigned physical registers;
      means for receiving a physical register pointer associated with particular data to be made architecturally visible;

comparing means for determining if said physical register pointer is located within a matching entry of said array means;

means for indicating, within said matching entry of said array means, if any, that said particular data is located within said architecturally visible buffer if said matching entry contains said physical register pointer; and means for loading said particular data into an entry of said architecturally visible buffer said entry corresponding to a particular logical register associated with physical register.

21. A microprocessor as described in claim 20 wherein said means for indicating indicates that said particular data is located within said architecturally visible buffer only if an operation of said set of operations does not concurrently write a pointer value into said matching entry.

22. A microprocessor as described in claim 20 wherein said means for indicating comprises means for setting an indicia corresponding to said matching entry to indicate that said particular data is located within said architecturally visible buffer.

23. A microprocessor as described in claim 20 wherein said architecturally visible buffer contains no information associated with speculative operations and wherein said architecturally invisible buffer may contain information associated with speculative operations.

24. A computer system comprising:

bus means for providing communication interface;

memory means coupled to said bus means for storing instructions and computer data;

interface means coupled to said bus means for providing data input and data output to interface with a user; and microprocessor means capable of branch prediction coupled to said bus means for executing instructions and processing computer data, said microprocessor means further comprising retirement means for indicating that certain information associated with a register alias table is contained in an architecturally visible buffer, said retirement means for indicating comprising:

an architecturally visible buffer comprised of a plurality of entries wherein individual entries correspond to individual logical registers, said architecturally visible buffer not containing any speculative information;

an architecturally invisible buffer comprised of a plurality of entries wherein individual entries correspond to individual physical registers of said set of physical registers, said architecturally invisible buffer containing speculative information;

array means comprising a plurality of individual entries for associating logical registers with assignable physical registers;

means for receiving a physical register pointer associated with particular data to be made architecturally visible;

comparing means for determining if said physical register pointer is located within a matching entry of said array means;

means for indicating, within said matching entry of said array means, if any, that said particular data is located within said architecturally visible buffer if said physical register pointer is located within said matching entry;

means for loading said particular data into an entry of said architecturally visible buffer, said entry corresponding to a particular logical register which was associated with said physical register according to said array means; and means for loading a retirement pointer, indicating said logical register of said architecturally visible buffer, into said matching entry.

25. In a mechanism for renaming logical registers wherein a register ordering may become altered, an apparatus for indicating that certain information is contained in an architecturally visible buffer, said apparatus comprising:

means for receiving a retiring physical register pointer;

first array means for renaming registers, said first array means providing a speculative register ordering of said logical registers;

second array means for providing a retirement register ordering of said registers of said architecturally visible buffer, said second array means not updated based on speculative register exchange operations; and update means for updating an entry of said first array means to indicate that data associated with said entry is located within said architecturally visible buffer, said entry containing said retiring physical register pointer, said update means further comprising:

means for reading said second array means to obtain a pointer value to said registers of said architecturally visible buffer;

means for recording said pointer value into said entry of said first array means; and means for setting an indicia corresponding to said entry of said first array means to indicate that said data associated with said entry is stored in said architecturally visible buffer.

26. An apparatus for indicating that certain information is contained in an architecturally visible buffer as described in claim 25 wherein said means for reading said second array means further comprises:

memory means for supplying a value of an entry of said first array means that was originally assigned said physical register pointer when said physical register pointer was last allocated; and means for using said value of said entry supplied from said memory means to index said second memory array to generate said pointer value to said registers of said architecturally visible buffer.

27. An apparatus for indicating that certain information is contained in an architecturally visible buffer as described in claim 25 further comprising means for swapping values of a first entry and a second entry of said first array means in order to perform a speculative register exchange operation.

28. An apparatus for indicating that certain information is contained in an architecturally visible buffer as described in claim 25 further comprising means for swapping values of a first entry and a second entry of said second array means in order to perform a retirement register exchange operation.

29. In a mechanism for renaming a set of logical registers associated with a set of operations to a set of physical registers, an apparatus for indicating that certain information is contained in an architecturally visible buffer containing a plurality of registers, said apparatus comprising:

means for receiving a retiring physical register pointer;

a register alias table comprising a plurality of individual entries for associating logical registers with assigned physical registers, said register alias table containing speculative information;

a retirement register alias table for maintaining a register ordering of said plurality of registers, said retirement register alias table not containing speculative information;

means for recording values of entries of said register alias table when individual physical registers are allocated to said entries; and indicating means for indicating that information associated with a particular entry of said register alias table is architecturally visible, said particular entry containing said retiring physical register pointer, said means for indicating comprising:

means for reading said means for recording to obtain a first absolute value corresponding to said retiring physical register pointer;

means for obtaining a pointer value from said second array based on said first absolute value, said pointer value indicating a register of said architecturally visible buffer;

means for updating said particular entry of said first array with said pointer value; and means for setting an indicia corresponding to said particular entry to indicate that said architecturally visible buffer contains said information associated with said particular entry.

30. An apparatus for indicating that certain information is contained in an architecturally visible buffer as described in claim 29 wherein said register alias table contains a speculative register ordering of said logical registers and wherein said speculative register ordering is based on results from speculative register exchange operations.

31. An apparatus for indicating that certain information is contained in an architecturally visible buffer as described in claim 30 wherein said retirement register alias table represents a retirement register ordering of said registers of said architecturally visible buffer and wherein said retirement register ordering is not based on results from speculative register exchange operations.

32. In a mechanism for renaming a set of logical registers associated with a set of operations to a set of physical registers, a method of indicating that certain information is contained in an architecturally visible buffer, said method comprising the steps of:

providing a plurality of entries within an architecturally visible buffer wherein individual entries of said architecturally visible buffer correspond to individual logical registers;

providing a plurality of entries within an architecturally invisible buffer wherein individual entries of said architecturally invisible buffer correspond to individual physical registers of said set of physical registers;

providing array means comprising a plurality of individual entries for associating logical registers with assigned physical registers;

receiving data from a retiring operation that includes a physical register pointer associated with particular data to be made architecturally visible;

comparing said physical register pointer to locate a matching entry of said array means;

indicating, within said matching entry of said array means, if any, that said particular data is located within said architecturally visible buffer if said matching entry contains said physical register pointer; and loading said particular data into an entry of said architecturally visible buffer, said entry corresponding to a particular logical register associated with said physical register by said array means.

33. A method of indicating that certain information is contained in said architecturally visible buffer as described in claim 32 wherein said step of indicating indicates that said particular data is located within said architecturally visible buffer only if an operation of said set of operations does not concurrently write a register pointer into said matching entry.

34. A method of indicating that certain information is contained in said architecturally visible buffer as described in claim 32 wherein said step of indicating comprises the step of setting an indicia corresponding to said matching entry to indicate that said particular data is located within said architecturally visible buffer.

35. A method of indicating that certain information is contained in said architecturally visible buffer as described in claim 32 wherein said array means is a register alias table and wherein said step of comparing is implemented using CAM match logic.

36. In mechanism for renaming registers wherein a register ordering can be altered, a method of indicating that certain information is contained in an architecturally visible buffer, said method comprising the step of:

receiving a retiring physical destination register pointer;

providing first array for renaming registers, said first array providing a speculative register ordering of registers of said logical registers, said speculative register ordering affected by speculative register exchange operations;

providing second array for maintaining a retirement register ordering of said registers of said architecturally visible buffer, said retirement register ordering not affected by speculative register exchange operations; and updating an entry of said first array, if any, that contains said retiring physical destination register pointer to indicate that data associated with said entry is located within said architecturally visible buffer, said step of updating further comprising the steps of:

reading said second array to obtain a pointer value to said registers of said architecturally visible buffer;

recording said pointer value into said entry of said first array; and setting an indicia corresponding to said entry of said first array to indicate data associated with said entry is stored in said architecturally visible buffer.

37. A method of indicating that certain information is contained in an architecturally visible buffer as described in claim 36 wherein said step of reading said second array further comprises the steps of:

recording an original entry of said first array that was assigned said retiring physical register pointer when said retiring physical register pointer was last allocated;

reading said original entry value recorded by said step of recording, and using said absolute entry value as an index to said second memory array to obtain said pointer value.

38. A method of indicating that certain information is contained in an architecturally visible buffer as described in claim 36 further comprising the step of swapping values of a first entry and a second entry of said first array in order to perform a speculative register exchange operation.

39. A method of indicating that certain information is contained in an architecturally visible buffer as described in claim 36 further comprising the step of swapping values of a first entry and a second entry of said second entry of said second array in order to perform a retirement register exchange operation.

40. A method for indicating that certain information is contained in an architecturally visible buffer as described in claim 36 further comprising the steps of:

determining if said retiring physical register pointer contains a matching entry of said first array, if any;

providing an entry number of said first array that was assigned said retiring physical register when said retiring physical register pointer was last allocated if a matching entry is located provided said step of determining locates said matching entry; and supplying said entry number of said first array to said step of reading said second array to obtain said pointer value.

* * * * *